US012120314B2

(12) United States Patent
Zhang et al.

(10) Patent No.: US 12,120,314 B2
(45) **Date of Patent: *Oct. 15, 2024**

(54) MOTION CANDIDATE LIST CONSTRUCTION USING NEIGHBORING BLOCK INFORMATION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,994

(22) Filed: Feb. 6, 2023

(65) Prior Publication Data

US 2023/0188729 A1 Jun. 15, 2023

Related U.S. Application Data

(63) Continuation of application No. 17/538,947, filed on Nov. 30, 2021, now Pat. No. 11,575,911, which is a (Continued)

(30) Foreign Application Priority Data

Jun. 4, 2019 (WO) ................ PCT/CN2019/089970
Sep. 7, 2019 (WO) ................ PCT/CN2019/104810

(51) Int. Cl.

*H04N 19/00* (2014.01)
*H04N 19/105* (2014.01)

(Continued)

(52) U.S. Cl.

CPC ......... *H04N 19/159* (2014.11); *H04N 19/105* (2014.11); *H04N 19/107* (2014.11); *H04N 19/176* (2014.11)

(58) Field of Classification Search

CPC ..................................................... H04N 19/00

See application file for complete search history.

(56) References Cited

U.S. PATENT DOCUMENTS 8,879,632 B2 11/2014 Joshi
9,008,182 B2 4/2015 Tsai (Continued)

FOREIGN PATENT DOCUMENTS

CN 101415121 A 4/2009
CN 101822064 A 9/2010

(Continued)

OTHER PUBLICATIONS

Non Final Office Action from U.S. Appl. No. 17/572,785 dated Mar. 30, 2022.

(Continued)

*Primary Examiner* — Maryam A Nasri
(74) *Attorney, Agent, or Firm* — Conley Rose, P.C.

(57) ABSTRACT

A visual media processing method includes determining, for a conversion between a first video block of a visual media data and a bitstream representation of the visual media data, an availability of a second video block of the visual media data using a rule; and performing the conversion based on the determining, wherein the rule is at least based on a coding mode used for coding the first video block into the bitstream representation, wherein the rule specifies disallowing motion information of the second video block from being used in a merge list construction of the first block by treating the second video block as unavailable.

20 Claims, 29 Drawing Sheets

Related U.S. Application Data continuation of application No. PCT/CN2020/094310, filed on Jun. 4, 2020.

(51) Int. Cl.

| | |
|---|---|
| ***H04N 19/107*** | (2014.01) |
| ***H04N 19/159*** | (2014.01) |
| ***H04N 19/176*** | (2014.01) |

(56) References Cited

U.S. PATENT DOCUMENTS

| | | | |
|---|---|---|---|
| 9,088,770 | B2 | 7/2015 | Zhang |
| 9,357,214 | B2 | 5/2016 | Zhang |
| 9,432,685 | B2 | 8/2016 | Chon |
| 9,491,461 | B2 | 11/2016 | Chen |
| 9,538,180 | B2 | 1/2017 | Zhang |
| 9,549,180 | B2 | 1/2017 | Chen |
| 9,609,347 | B2 | 3/2017 | Thirumalai |
| 9,699,450 | B2 | 7/2017 | Zhang |
| 9,716,899 | B2 | 7/2017 | Thirumalai |
| 9,749,645 | B2 | 8/2017 | Li |
| 9,800,895 | B2 | 10/2017 | Thirumalai |
| 9,924,168 | B2 | 3/2018 | Zhang |
| 9,948,953 | B2 | 4/2018 | Zhang |
| 10,045,014 | B2 | 8/2018 | Zhang |
| 10,057,574 | B2 | 8/2018 | Li |
| 10,057,594 | B2 | 8/2018 | Xiu |
| 10,165,252 | B2 | 12/2018 | An |
| 10,171,818 | B2 | 1/2019 | Peng |
| 10,200,719 | B2 | 2/2019 | Zhang |
| 10,218,975 | B2 | 2/2019 | Chien |
| 10,264,271 | B2 | 4/2019 | Li |
| 10,326,986 | B2 | 6/2019 | Zhang |
| 10,362,330 | B1 | 7/2019 | Li |
| 10,397,603 | B1 | 8/2019 | Li |
| 10,448,010 | B2 | 10/2019 | Chen |
| 10,462,439 | B2 | 10/2019 | He |
| 10,469,847 | B2 | 11/2019 | Xiu |
| 10,484,686 | B2 | 11/2019 | Xiu |
| 10,506,230 | B2 | 12/2019 | Zhang |
| 10,523,963 | B1 | 12/2019 | Ye |
| 10,560,704 | B2 | 2/2020 | Peng |
| 10,560,718 | B2 | 2/2020 | Lee |
| 10,567,789 | B2 | 2/2020 | Chen |
| 10,567,799 | B2 | 2/2020 | Liu |
| 10,687,079 | B2 | 6/2020 | Liu |
| 10,721,469 | B2 | 7/2020 | Zhang |
| 10,721,489 | B2 | 7/2020 | Chen |
| 10,735,749 | B2 | 8/2020 | Li |
| 10,778,974 | B2 | 9/2020 | Karczewicz |
| 10,785,494 | B2 | 9/2020 | Chien |
| 10,855,985 | B2 | 12/2020 | Zhang |
| 11,128,884 | B2 | 9/2021 | Liu |
| 11,159,793 | B2 | 10/2021 | Ahn |
| 11,463,687 | B2 | 10/2022 | Zhang |
| 11,509,893 | B2 | 11/2022 | Zhang |
| 11,575,911 | B2 | 2/2023 | Zhang |
| 2005/0111545 | A1 | 5/2005 | Prabhakar |
| 2008/0163383 | A1 | 7/2008 | Kumar |
| 2009/0196342 | A1 | 8/2009 | Divorra Escoda |
| 2010/0124286 | A1 | 5/2010 | Wang |
| 2011/0176613 | A1 | 7/2011 | Tsai |
| 2011/0200110 | A1 | 8/2011 | Chen |
| 2011/0228854 | A1 | 9/2011 | Shin |
| 2012/0177114 | A1 | 7/2012 | Guo |
| 2012/0207227 | A1 | 8/2012 | Tsai |
| 2013/0107973 | A1 | 5/2013 | Wang |
| 2013/0188733 | A1 | 7/2013 | Van der Auwera |
| 2013/0294513 | A1 | 11/2013 | Seregin |
| 2013/0329007 | A1 | 12/2013 | Zhang |
| 2013/0336406 | A1 | 12/2013 | Zhang |
| 2014/0050266 | A1 | 2/2014 | Zhang |
| 2014/0071235 | A1 | 3/2014 | Zhang |
| 2014/0092978 | A1 | 4/2014 | Bugdayci |
| 2014/0294067 | A1 | 10/2014 | Li |
| 2015/0078457 | A1 | 3/2015 | Hendry |
| 2015/0085929 | A1 | 3/2015 | Chen |
| 2015/0271515 | A1 | 9/2015 | Pang |
| 2015/0373359 | A1 | 12/2015 | He |
| 2016/0100186 | A1 | 4/2016 | Gisquet |
| 2016/0100189 | A1 | 4/2016 | Pang |
| 2016/0105670 | A1 | 4/2016 | Pang |
| 2016/0212438 | A1 | 7/2016 | Andersson |
| 2016/0219278 | A1 | 7/2016 | Chen |
| 2016/0234492 | A1 | 8/2016 | Li |
| 2016/0337661 | A1 | 11/2016 | Pang |
| 2017/0013269 | A1 | 1/2017 | Kim |
| 2017/0054976 | A1 | 2/2017 | Li |
| 2017/0094311 | A1 | 3/2017 | Chou |
| 2017/0150186 | A1 | 5/2017 | Zhang |
| 2017/0238020 | A1 | 8/2017 | Karczewicz |
| 2017/0289566 | A1 | 10/2017 | He |
| 2017/0332075 | A1 | 11/2017 | Karczewicz |
| 2018/0041778 | A1 | 2/2018 | Zhang |
| 2018/0041779 | A1 | 2/2018 | Zhang |
| 2018/0048909 | A1 | 2/2018 | Liu |
| 2018/0063543 | A1 | 3/2018 | Reddy |
| 2018/0184127 | A1 | 6/2018 | Zhang |
| 2018/0205946 | A1 | 7/2018 | Zhang |
| 2018/0234701 | A1 | 8/2018 | Zhang |
| 2018/0255295 | A1 | 9/2018 | Lee |
| 2018/0343463 | A1 | 11/2018 | Xiu |
| 2018/0352223 | A1 | 12/2018 | Chen |
| 2019/0052886 | A1 | 2/2019 | Chiang |
| 2019/0075328 | A1 | 3/2019 | Huang |
| 2019/0104303 | A1 | 4/2019 | Xiu |
| 2019/0116374 | A1 | 4/2019 | Zhang |
| 2019/0208225 | A1 | 7/2019 | Chen |
| 2019/0238845 | A1 | 8/2019 | Zhang |
| 2019/0306502 | A1 | 10/2019 | Gadde |
| 2019/0349599 | A1 | 11/2019 | Li |
| 2020/0007864 | A1 | 1/2020 | Li |
| 2020/0029073 | A1 | 1/2020 | Chiang |
| 2020/0145674 | A1 | 5/2020 | Peng |
| 2020/0195959 | A1 | 6/2020 | Zhang |
| 2020/0236384 | A1 | 7/2020 | Xu |
| 2020/0267381 | A1 | 8/2020 | Vanam |
| 2020/0322628 | A1 | 10/2020 | Lee |
| 2020/0336748 | A1 | 10/2020 | Li |
| 2020/0344494 | A1 | 10/2020 | Hu |
| 2020/0366891 | A1 | 11/2020 | Hu |
| 2020/0374542 | A1 | 11/2020 | Zhang |
| 2020/0389655 | A1 | 12/2020 | Seregin |
| 2020/0404263 | A1 | 12/2020 | Hu |
| 2020/0413038 | A1 | 12/2020 | Zhang |
| 2020/0413044 | A1 | 12/2020 | Zhang |
| 2021/0006787 | A1 | 1/2021 | Zhang |
| 2021/0006788 | A1 | 1/2021 | Zhang |
| 2021/0006790 | A1 | 1/2021 | Zhang |
| 2021/0021811 | A1 | 1/2021 | Xu |
| 2021/0021856 | A1 | 1/2021 | Zheng |
| 2021/0029374 | A1 | 1/2021 | Zhang |
| 2021/0051324 | A1 | 2/2021 | Zhang |
| 2021/0076029 | A1 | 3/2021 | Han |
| 2021/0084325 | A1 | 3/2021 | Lim |
| 2021/0092379 | A1 | 3/2021 | Zhang |
| 2021/0092436 | A1 | 3/2021 | Zhang |
| 2021/0105482 | A1 | 4/2021 | Zhang |
| 2021/0120242 | A1 | 4/2021 | Nam |
| 2021/0127129 | A1 | 4/2021 | Zhang |
| 2021/0136407 | A1 | 5/2021 | Aono |
| 2021/0152846 | A1 | 5/2021 | Zhang |
| 2021/0160529 | A1 | 5/2021 | Zhang |
| 2021/0160532 | A1 | 5/2021 | Zhang |
| 2021/0176501 | A1 | 6/2021 | Chen |
| 2021/0185342 | A1 | 6/2021 | Zhang |
| 2021/0195216 | A1 | 6/2021 | Peng |
| 2021/0195234 | A1 | 6/2021 | Zhang |
| 2021/0211647 | A1 | 7/2021 | Liu |
| 2021/0235073 | A1 | 7/2021 | Liu |
| 2021/0235108 | A1 | 7/2021 | Zhang |
| 2021/0250602 | A1 | 8/2021 | Zhang |
| 2021/0258575 | A1 | 8/2021 | Zhang |
| 2021/0266537 | A1 | 8/2021 | Zhang |

(56) References Cited

U.S. PATENT DOCUMENTS

2021/0266562 A1 8/2021 Zhang
2021/0281859 A1 9/2021 Zhang
2021/0281875 A1 9/2021 Liu
2021/0281877 A1 9/2021 Liu
2021/0297659 A1 9/2021 Zhang
2021/0314614 A1 10/2021 Zhang
2021/0314623 A1 10/2021 Chang
2021/0314628 A1 10/2021 Zhang
2021/0321092 A1 10/2021 Zhang
2021/0321095 A1 10/2021 Zhang
2021/0321121 A1 10/2021 Zhang
2021/0329227 A1 10/2021 Zheng
2021/0337232 A1 10/2021 Zheng
2021/0352312 A1 11/2021 Zhang
2021/0368171 A1 11/2021 Zhang
2021/0377524 A1 12/2021 Zhang
2021/0385446 A1 12/2021 Liu
2021/0385451 A1 12/2021 Zhang
2021/0392333 A1 12/2021 Paluri
2021/0392381 A1 12/2021 Wang
2021/0409684 A1 12/2021 Wang
2021/0409720 A1 12/2021 Meng
2022/0007053 A1 1/2022 Hanhart
2022/0014791 A1 1/2022 Liu
2022/0030226 A1* 1/2022 Lee ...................... H04N 19/105
2022/0053186 A1 2/2022 Paluri
2022/0086433 A1 3/2022 Zhang
2022/0094914 A1 3/2022 Zhang
2022/0132118 A1 4/2022 Zhang
2022/0132119 A1 4/2022 Zhang
2022/0224897 A1 7/2022 Zhang

FOREIGN PATENT DOCUMENTS

CN 103081467 A 5/2013
CN 103636225 A 3/2014
CN 103942793 A 7/2014
CN 104094605 A 10/2014
CN 104126302 A 10/2014
CN 104205838 A 12/2014
CN 104838657 A 8/2015
CN 105141957 A 12/2015
CN 105308960 A 2/2016
CN 105325003 A 2/2016
CN 105379282 A 3/2016
CN 105794206 A 7/2016
CN 106464874 A 2/2017
CN 106797476 A 5/2017
CN 106797477 A 5/2017
CN 106961606 A 7/2017
CN 107079161 A 8/2017
CN 107211154 A 9/2017
CN 107211156 A 9/2017
CN 107690810 A 2/2018
CN 108028939 A 5/2018
CN 108141605 A 6/2018
CN 108353184 A 7/2018
CN 108370441 A 8/2018
CN 108449599 A 8/2018
CN 108462873 A 8/2018
CN 108605126 A 9/2018
CN 108713320 A 10/2018
CN 108886620 A 11/2018
CN 109076218 A 12/2018
CN 109076236 A 12/2018
CN 109479139 A 3/2019
CN 109496430 A 3/2019
CN 109743576 A 5/2019
CN 109792515 A 5/2019
EP 2173100 A2 4/2010
GB 201509938 6/2015
JP 2013085234 A 5/2013
JP 2017535180 A 11/2017
JP 2018530249 A 10/2018
JP 2020017970 A 1/2020
TW 201201526 A 1/2012
TW 201820872 A 6/2018
WO 2012097740 A1 7/2012
WO 2013159643 A1 10/2013
WO 2015038877 A1 3/2015
WO 2015106121 A1 7/2015
WO 2015180014 A1 12/2015
WO 2016061245 A1 4/2016
WO 2016138854 A1 9/2016
WO 2017082670 A1 5/2017
WO 2017162911 A1 9/2017
WO 2017197126 A1 11/2017
WO 2018155986 A2 8/2018
WO 2018161954 A1 9/2018
WO 2018166357 A1 9/2018
WO 2019001734 A1 1/2019
WO 2019004283 A1 1/2019
WO 2019077197 A1 4/2019
WO 2019079611 A1 4/2019
WO 2019107927 A1 6/2019
WO 2020184555 A1 9/2020

OTHER PUBLICATIONS

Non Final Office Action from U.S. Appl. No. 17/572,833 dated Apr. 28, 2022.

Examination Report from Indian Patent Application No. 202127056150 dated May 10, 2022.

Examination Report from Indian Patent Application No. 202127056138 dated May 10, 2022.

Extended European Search Report from European Patent Application No. 20840562.1 dated Jul. 25, 2022 (9 pages).

Partial European Search Report from European Patent Application No. 20817785.7 dated Sep. 21, 2022 (16 pages).

Ku et al. "CE8-Related: Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 1114th Meeting: Geneva, CH, Mar. 19-27, 2019, documentJVET-N0843, 2019.

Ex Parte Quayle Office Action from U.S. Appl. No. 17/540,068 dated Feb. 22, 2022.

Non Final Office Action from U.S. Appl. No. 17/538,947 dated Feb. 17, 2022.

Non Final Office Action from U.S. Appl. No. 17/705,509 dated Jun. 27, 2022.

Extended European Search Report from European Patent Application No. 20817785.7 dated Jan. 2, 2023 (19 pages).

Document: JVET-P0325-v1, Wang, Z., et al., "Non-CE4: Construction of spatial merge candidates," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.

Foreign Communication From A Related Counterpart Application, European Application No. 20818357.4, Extended European Search Report dated May 11, 2023, 15 pages.

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001 (v7 and v2), 2019.

https://vcgit.hhi.fraunhofer.de/jvet/VVCSoftware_VTM/tags/VTM-5.0, Feb. 28, 2022.

Nam et al. "CE8: Block Vector Prediction for CPR {Test 8.1.1a and Test 8.1.1b)." Joint Video Exploration Team of ISO/IEC JTC 1/SC 29/WG 11 and ITU-T SG 16, Jan. 9-18, 2019, document JVET-M0332, 2019.

Wang et al. "CE4-Related: An Improved Method for Triangle Merge List Construction," Joint Video Experts Team JVET) of ITU-T SG 16 WP 3 and 1SO/IEC JTC 1/SC 29/WG 1114th Meeting: Geneva, CH, Mar. 19-27, 2019, document JVET-N0340, 2019.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.

Chiang et al. "CE10.1.1: Multi-Hypothesis Prediction for Improving AMVP Mode, Skip or Merge Mode, and Intra Mode," Joint

(56) References Cited

OTHER PUBLICATIONS

Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.
Bross et al. "Versatile Video Coding (Draft 5)," Joint Video Experts Team (JVET) of ITU-T SG 16 WP 3 and ISO/IEC UTC 1/SC 29/WG 11 14th Meeting: Geneva, CH, Mar. 19-27, 2019, document JVET-N1001 (v7 and v2), 2019.
Sethuraman et al. "CE9: Results of DMVR Related Tests CE9.2.1 and CE9.2.2," Joint Video Experts Team (JVET) of ITU-T SG 16 WP 3 and 1SO/IEC JTC 1/SC 29NvG 1113th Meeting: Marrakech, MA, Jan. 9-18, 2019, document JVET-M0147, 2019.
"Information Technology—High Efficiency Coding and Media Delivery in Heterogeneous Environments—Part 2: High Efficiency Video Coding" Apr. 20, 2018, ISO/DIS 23008, 4th Edition.
Rosewarne et al. "High Efficiency Video Coding (HEVC) Test Model 16 (HM 16) Improved Encoder Description Update 7," Joint Collaborative Team on Video Coding (JCT-VC)of ITU-T SG16 WP3 and ISO/IEC JTC1/SC29/WG1125th Meeting: Chengdu, CN, Oct. 14-21, 2016, document JCTVC-Y1002, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2011.
JEM-7.0: https://jvet.hhi.fraunhofer.de/svn/svn_HMJEMSoftware/tags/ HM-16.6-JEM-7.0, Feb. 28, 2022.
Zhao et al. "Non-CE6: Configurable Max Transform Size in WC," Joint Video Experts Team (JVET) of ITU-T SG 16 WP 3 and ISO/IEC JTC 1/SC 29/1/VG 11 15th Meeting: Gothenburg, SE, Jul. 3-12, 2019, document JVET-00545, 2019.
Gao et al. "CE4: CE4-1.1, CE4-1.2 and CE4-1.14: Geometric Merge Mode (GEO)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0068, 2019.
Kiu et al. "CE9-Related: Complexity Reduction and Bit-Width Control for Bi-Directional Optical Flow {BIO)," Joint Video Experts Team (JVET) of ITU-T SG 16 WP 3 and 1SO/IEC JTC 1/SC 29NvG 11 12th Meeting: Macao, CN, Oct. 3-12, 2018, document JVET-L0256, 2018.
Chujoh et al. "Non-CE9: An Improvement of BDOF," Joint Video Experts Team (JVET) of ITU-T SG 16 WP 3 and SO/IEC JTC 1/SC 29/WG 1113th Meeting: Marrakech, MA, Jan. 9-18, 2019, document JVET-M0063, 2019.
Kiu et al. "CE9.1: Simplifications on Bi-Directional Optical Flow {BDOF)," Joint Video Experts Team (JVET) of ITU-T S, SG 16 WP 3 and ISO/IEC JTC 1/SC 29/1/VG 11 13th Meeting: Marrakech, MA, Jan. 9-18, 2019, document JVET-M0487, 2019.
Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
Zhang et al. "Non-CE8: Fixes of IBC BV Candidate List," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0574, 2019.
Zhang et al. "Non-CE8: Simplified IBC BV Candidate List Construction Process," Joint Video Experts Team (JVET) of ITU-T SG 16 WP3 and ISO/IEC JTC 1/SC 29/WG 11 15th Meeting: Gothenburg, SE, Jul. 3-12, 2019, document JVET-O0626, 2019.
Nam et al. "CE8-related: Default Candidates for IBC Merge Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0460, 019.
Nam et a. "CE8-1.1: Block Vector Prediction for IBC," Joint Video Experts Team (JVET) of ITU-T SG 16 WP 3 and ISO/IEC JTC 1/SC 29/WG 1114th Meeting: Geneva, CH, Mar. 19-27, 2019, document JVET-N0457, 2019.
Zhao, et al., "CE2: History Based Affine Motion Candidate (Test 2.2.3)," Joint Video Experts Team (JVET) of ITU-T SG 6 WP 3 and ISO/IEC JTC 1/SC 29/WG 11 13th Meeting: Marrakech, MA, Jan. 9-18, 2019, document JVET-M0125, 2019.
Ju et al. "CE4-Related: On MVP Candidate List Generation for AMVP," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0117, 2019.
Gao et al. "Non-CEB: IBC Merge List Simplification," Joint Video Experts Team (JVET) of ITU-T SG 16 WP 3 and ISO/IEC JTC 1/SC 29/WG 1114th Meeting: Geneva, CH, Mar. 19-27, 2019, document JVET-N0176, 2019.
Zhang et al. "Non-CE4: Cleanups on Syntax Design for Sub-Block Coding Tools," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0263, 2019.
Chen et al. "Non-CE4/8: On Disabling Blending Process in TPM," Joint Video Experts Team {JVET) of ITU-T SG 16 WP 3 and ISO/IEC JTC 1/SC 29/WG 11 15th Meeting: Gothenburg, SE, Jul. 3-17, 2019, document JVET-O1172, 2019.
Chubach et al. "CE5-Related: On the Syntax Constraints of ALF APS," Joint Video Experts Team (JVET) of ITU-T S, SG 16 WP 3 and ISO/IEC JTC 1/SC 29/WG 11 15th Meeting: Gothenburg, SE, Jul. 3-12, 2019, document JVET-O0288, 2019.
Paluri et al. "AH17 Simplification of ALF Coefficients in the APS," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0302, 2019.
Huang et al. "Non-CE4: Merge Modes Signaling," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0249, 2019.
Esenlik et al. "BoG Report on CE9 Decoder Motion Vector Derivation Related Contributions," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1100, 2019.
Blasi et al. "Non-CE4: CIIP Using Triangular Partitions," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0522, 2019.
Chen et al. "BoG Report on CE4 Inter Prediction with Merge Modifications," Joint Video Experts Team (JVET) of ITU-or SG 16 WP 3 and ISO/IEC JTC 1/SC 29/WG 1115th Meeting: Gothenburg, SE, Jul. 3-17, 2019, document JVET-O1039, 2019.
Esenlik et al. "BoG Report on CE9 Decoder Motion Vector Derivation Related Contributions," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0815, 2019.
Chen et al. "Crosscheck of JVET-N0150 (AHG12: One CTU Delay Wavefront Parallel Processing)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0646, 2019.
Chien et al. "Methodology and Reporting Template for Tool Testing," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2005, 2019.
Sarwer et al. "AHG9: Transform and Transform-Skip Related HLS Clean-Up," Joint Video Experts Team (JVET) of ITU-T SG 16 WP 3 and ISO/IEC JTC 1/SC 29/WG 11, 18th Meeting, by teleconference, Apr. 15-24, 2020, document: JVET-R0097, 2020.
Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting, Geneva, CH Mar. 19-27, 2019, document JVET-N1002, 2019.
JVET-N0362-v2, Zhao, X., et al., "Non-CE6: Configurable max transform size in VVC," Joint Video Experts Team (JVET) of ITU-T SG 16 WP 3 and ISO/IEC JTC 1/SC 29/WG 11 14th Meeting: Geneva, CH, Mar. 19-27, 2019, 24 pages.
Document: JVET-N1001-v10, Bross, B., et al., "Versatile Video Coding (Draft 5)," Joint Video Experts Team (JVET) of ITU-T SG

(56) References Cited

OTHER PUBLICATIONS

16 WP 3 and ISO/IEC JTC 1/SC 29/WG 11 14th Meeting: Geneva, CH, Mar. 19-27, 2019, 407 pages.
Document: JVET-P0405, Deng, Z., et al., "Non-CE6: Cleanups of maximum transform size related syntax elements," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
International Search Report and Written Opinion from International Patent Application No. PCT/CN2020/094305 dated Sep. 10, 2020 (16 pages).
International Search Report and Written Opinion from International Patent Application No. PCT/CN2020/094306 dated Aug. 31, 2020 (13 pages).
International Search Report and Written Opinion from International Patent Application No. PCT/CN2020/094310 dated Sep. 3, 2020 (13 pages).
International Search Report and Written Opinion from International Patent Application No. PCT/CN2020/101805 dated Oct. 13, 2020 (11 pages).
International Search Report and Written Opinion from International Patent Application No. PCT/CN2020/101819 dated Oct. 15, 2020 (9 pages).
International Search Report and Written Opinion from International Patent Application No. PCT/CN2020/101820 dated Oct. 20, 2020 (10 pages).
Intemational Search Report and Written Opinion from International Patent Application No. PCT/CN2020/118293 dated Dec. 30, 2020 (10 pages).
Non Final Office Action from U.S. Appl. No. 17/538,916 dated Feb. 16, 2022.
Document: JVET-N0024-v1, Yang, H., "CE4: Summary report on inter prediction and motion vector coding," Joint Video Experts Team (JVET) of ITU-T SG 16 WP 3 and ISO/IEC JTC 1/SC 29/WG 11 14th Meeting: Geneva, CH, Mar. 19-27, 2019, 21 pages.
Document: JVET-O2002-v1, Chen, J., "Algorithm description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 82 pages.
JCTVC-AA1002-v1, Rosewarne, C., "High Efficiency Video Coding (HEVC) Test Model 16 (HM 16) Improved Encoder Description Update 8," Joint Collaborative Team on Video Coding (JCT-VC) of ITU-T SG16 WP3 and ISO/IEC JTC1/SC29/WG11, 27th meeting: Hobart, AU, Mar. 31-Apr. 7, 2017, 16 pages.
Document: JVET-N1001-v6, Bross, B., et al., "Versatile Video Coding(Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 379 pages.
Document: JVET-L0266-v2, Zhang, L., et al., "CE4: History-based Motion Vector Prediction (Test 4.4.7)," Joint Video Experts Team (J.T) of ITU-T SG 16 WP 3 and ISO/IEC JTC 1/SC 29/WG 11 12th Meeting: Macao, CN, Oct. 3-12, 2018, 6 pages.
Document: JVET-M0405-v1, Xu, X., et al., "CE4-related: Simplified merge candidate list for small blocks," Joint Video Exploration Team (JVET) of ITU-T SG 16 WP 3 and ISO/IEC JTC 1/SC 29/WG 11 13th Meeting: Marrakesh, MA, Jan. 9-18, 2019, 3 pages.
Murakami, A., et al., "High-efficiency image symbolization technology," HEVC/H.265, Software Information Center, Nose, May 26, 2022, 39 pages.
Non-Final Office Action from U.S. Appl. No. 18/173,306 dated Feb. 1, 2024, 67 pages.
Document: JVET-N1001-v8, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 400 pages.
Document: JVET-O0309, Ko, G., et al., "Non-CE4: Merge mode signalling overhead reduction," Joint Video Experts Team (JVET) of ITU-T SG 16 WP 3 and ISO/IEC JTC 1/SC 29/WG 11 15th Meeting: Gothenburg, SE, Jul. 3-12, 2019, 7 pages.
Document: JVET-O0660-r1, Panusopone, K., et al., "Simplification of MV storage for blending blocks in triangle mode," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-O0288-v1, Chubach, O., et al., "CE5-related: On the syntax constraints of ALF APS," Joint Video Experts Team (JVET) of ITU-T Sg 16 WP 3 and ISO/IEC JTC 1/SC 29/WG 11 15th Meeting: Gothenburg, SE, Jul. 3-12, 2019, 5 pages.
Japanese Office Action from Japanese Application No. 2023/117437 dated Apr. 23, 2024, 12 pages. With English Translation.
Korean Office Action from Korean Application No. 10-2022-7000455 dated Feb. 16, 2024, 12 pages. With English Translation.
Chinese Office Action from Chinese Application No. 202080068176.4 dated Apr. 9, 2024, 33 pages. With English Translation.
Notice of Allowance from U.S. Appl. No. 18/171,818 dated Apr. 10, 2024, 16 pages.

* cited by examiner (b)second PU of 2NxN (a) second PU of Nx2N

MOTION CANDIDATE LIST CONSTRUCTION USING NEIGHBORING BLOCK INFORMATION

CROSS REFERENCE TO RELATED APPLICATIONS

This application is a continuation of U.S. application Ser. No. 17/538,947, filed on Nov. 30, 2021, which is a continuation of International Patent Application No. PCT/CN2020/094310, filed on Jun. 4, 2020, which claims the priority to and benefits of International Patent Application No. PCT/CN2019/089970, filed on Jun. 4, 2019, and International Patent Application No. PCT/CN2019/104810, filed on Sep. 7, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments to perform coding or decoding of video bitstreams using non-rectangular partitioning such as a triangular partitioning mode.

In one example aspect, a method of visual media processing is disclosed. The method includes determining, for a conversion between a first video block of a visual media data and a bitstream representation of the visual media data, an availability of a second video block of the visual media data using a rule; and performing the conversion based on the determining, wherein the rule is at least based on a coding mode used for coding the first video block into the bitstream representation, wherein the rule specifies disallowing motion information of the second video block from being used in a merge list construction of the first block by treating the second video block as unavailable.

In one example aspect, a method of visual media processing is disclosed. The method includes determining, for a conversion between a first video block of a visual media data and a bitstream representation of the visual media data, an availability of a second video block of the visual media data using a rule; and performing the conversion based on the determining, wherein the rule specifies to use an availability check process on the second video block at one or more positions of the visual media data.

In one example aspect, a method of visual media processing is disclosed. The method includes determining, for a conversion between a current video block of a visual media data and a bitstream representation of the visual media data, two positions used for constructing an intra block copy motion list for the current video block; and performing the conversion based on the intra block copy motion list.

In one example aspect, a method of visual media processing is disclosed. The method includes determining, for a conversion between a current video block of a visual media data and a coded representation of the visual media data, an availability of a neighboring block for deriving one or more weights for a combined intra-inter prediction of the current video block based on a rule; and performing the conversion based on the determining, wherein, the one or more weights include a first weight which is assigned to an inter prediction of the current video block and a second weight which is assigned to an intra prediction of the current video block; wherein the rule excludes use of a comparison of coding modes of the current video block and the neighboring block.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

Figure 1:
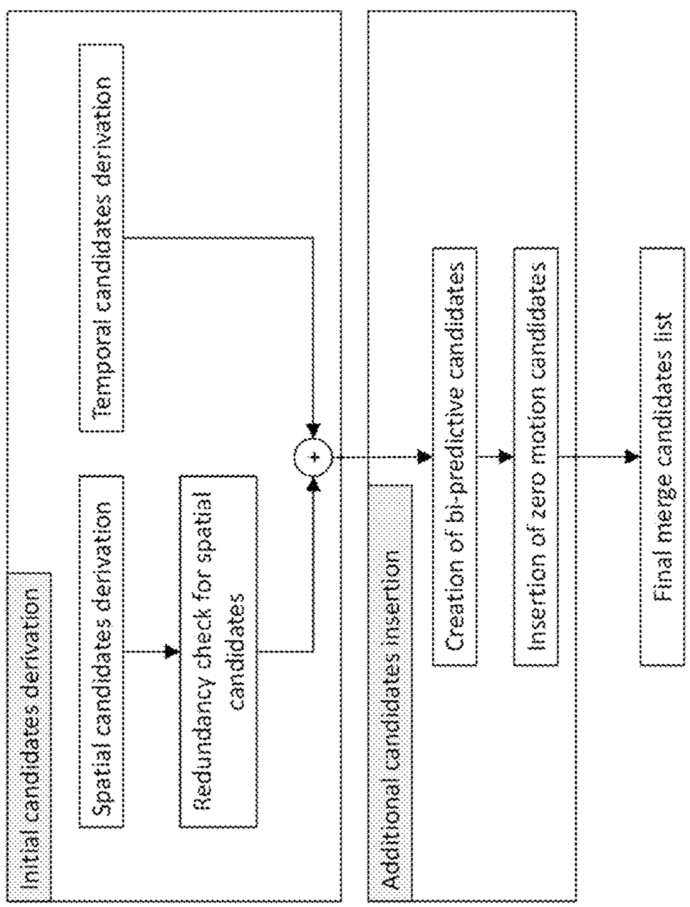
FIG. 1 shows a derivation process for merge candidate list construction.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Brief Summary

This document is related to video coding technologies. Specifically, it is related to merge coding including triangular prediction mode. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) [3][4]. In April 2018, the Joint Video Expert Team (JVET) between VCEG (Q6/16) and ISO/IEC ITC1 SC29/WG11 (MPEG) was created to work on the VVC standard targeting at 50% bitrate reduction compared to HEVC.

The latest version of VVC draft, i.e., Versatile Video Coding (Draft 5) could be found at: http://phenix.it-sudparis.eu/jvet/doc_end_user/documents/14_Geneva/wg11/JVET-N1001-v7.zip.

The latest reference software of VVC, named VTM, could be found at: https://vcgit.hhi.fraunhofer.de/jvet/VVCSoftware_VTM/tags/VTM-5.0.

2.1 Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices [2].

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

- Step 1: Initial candidates derivation
  - Step 1.1: Spatial candidates derivation
  - Step 1.2: Redundancy check for spatial candidates
  - Step 1.3: Temporal candidates derivation
- Step 2: Additional candidates insertion
  - Step 2.1: Creation of bi-predictive candidates
  - Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 2:
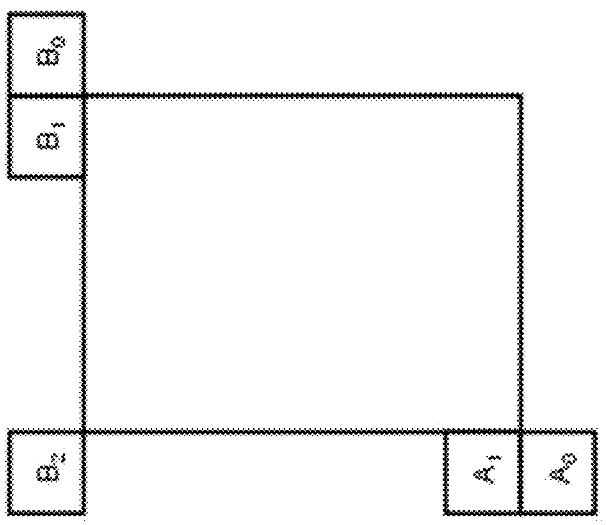
FIG. 2 shows an example of positions of spatial merge candidates.
Figure 3:
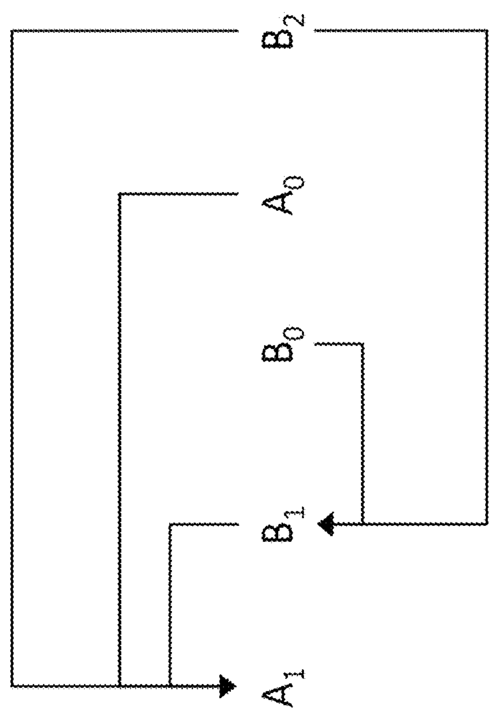
FIG. 3 shows an example of candidate pairs considered for redundancy check of spatial merge candidates.
Figure 4:
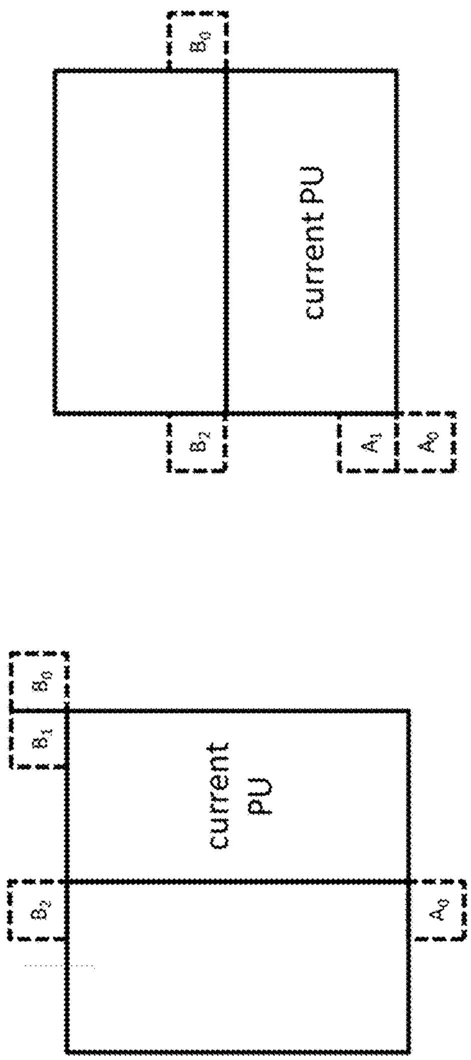
FIG. 4 shows an example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

Figure 5:
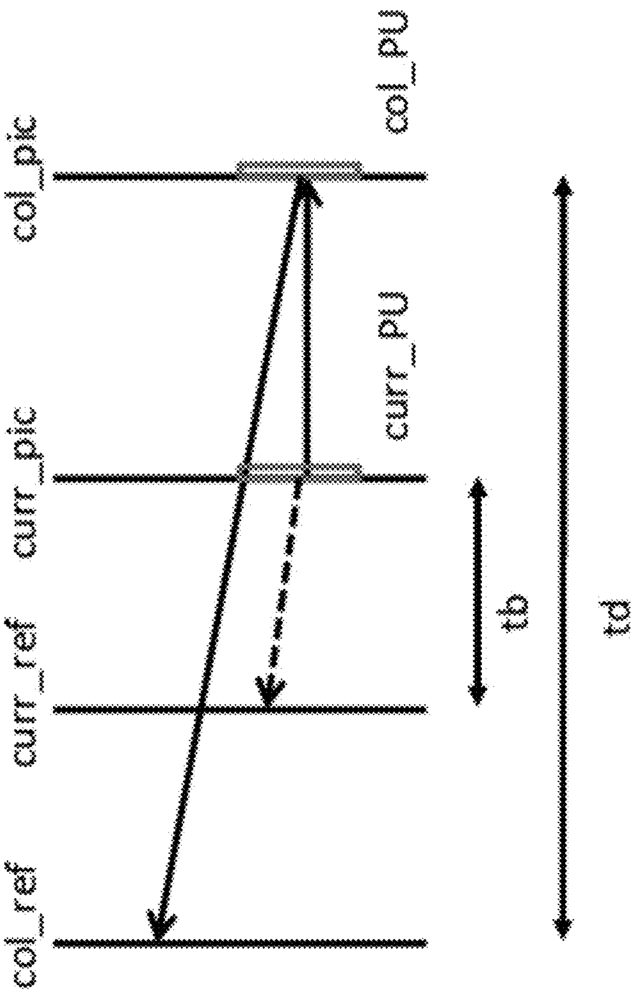
FIG. 5 shows examples of illustration of motion vector scaling for temporal merge candidate.

In this step, only one candidate is added to the list. Particularly, in the derivation of this temporal merge candidate, a scaled motion vector is derived based on co-located PU in a co-located picture. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification [1]. For a B-slice, two motion vectors, one is for reference picture list 0 and the other is for reference picture list 1, are obtained and combined to make the bi-predictive merge candidate.

2.1.2.4 Co-Located Picture and Co-Located PU

When TMVP is enabled (i.e., slice_temporal_mvp_enabled_flag is equal to 1), the variable ColPic representing the col-located picture is derived as follows:

- If current slice is B slice and the signalled collocated_from_10_flag is equal to 0, ColPic is set equal to RefPicList1[collocated_ref_idx].
- Otherwise (slice_type is equal to B and collocated_from_10_flag is equal to 1, or slice_type is equal to P), ColPic is set equal to RefPicList0[collocated_ref_idx].

wherein collocated_ref_idx and collocated_from_10_flag are two syntax elements which may be signalled in slice header.

Figure 6:
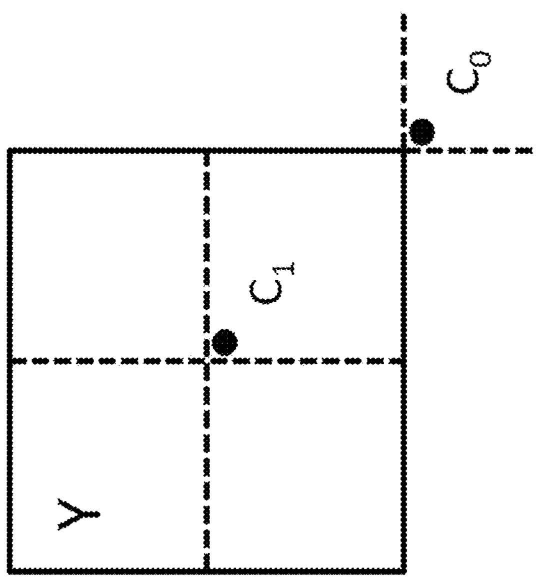
FIG. 6 shows an example of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

Related syntax elements are described as follows:

7.3.6.1 General Slice Segment Header Syntax

| | Descriptor |
|---|---|
| slice_segment_header( ) { | |
| **first_slice_segment_in_pic_flag** | u(1) |
| ... | |
| if( slice_type = = P \| \| slice_type = = B ) { | |
| **num_ref_idx_active_override_flag** | u(1) |
| if( num_ref_idx_active_override_flag ) { | |
| **num_ref_idx_l0_active_minus1** | ue(v) |
| if( slice_type = = B ) | |
| **num_ref_idx_l1_active_minus1** | ue(v) |
| } | |
| ... | |
| ***if( slice temporalmvp enabled flag ) {*** | |
| ***if( slice type = = B )*** | |
| ***collocated from 10 flag*** | ***u(1)*** |
| ***if( ( collocated from 10 flag&& num ref idx 10active minus1 > 0 ) \|\|*** | |
| ***( !collocated from l0 flag && num ref idx l1 active minus1 > 0 ) )*** | |
| ***collocated ref idx*** | ***ue(v)*** |
| ***}*** | |
| ... | |
| byte_alignment( ) | |
| } | |

2.1.2.5 Derivation of MVs for the TMVP Candidate

More specifically, the following steps are performed in order to derive the TMVP candidate:

1) set reference picture list X=0, target reference picture to be the reference picture with index equal to 0 (i.e., curr_ref) in list X. Invoke the derivation process for collocated motion vectors to get the MV for list X pointing to curr_ref.
2) if current slice is B slice, set reference picture list X=1, target reference picture to be the reference picture with index equal to 0 (i.e., curr_ref) in list X. Invoke the derivation process for collocated motion vectors to get the MV for list X pointing to curr_ref.

The derivation process for collocated motion vectors is described in the next sub-section 2.1.2.5.1.

2.1.2.5.1 Derivation Process for Collocated Motion Vectors

For the co-located block, it may be intra or inter coded with uni-prediction or bi-prediction. If it is intra coded, TMVP candidate is set to be unavailable.

If it is uni-prediction from list A, the motion vector of list A is scaled to the target reference picture list X.

If it is bi-prediction and the target reference picture list is X, the motion vector of list A is scaled to the target reference picture list X, and A is determined according to the following rules:

If none of reference pictures has a greater POC values compared to current picture, A is set equal to X.

Otherwise, A is set equal to collocated_from_10_flag.

The related working draft in JCTVC-W1005-v4 is described as follows:

8.5.3.2.9 Derivation Process for Collocated Motion Vectors

Inputs to this process are:

a variable currPb specifying the current prediction block, a variable colPb specifying the collocated prediction block inside the collocated picture specified by ColPic, a luma location (xColPb, yColPb) specifying the top-left sample of the collocated luma prediction block specified by colPb relative to the top-left luma sample of the collocated picture specified by ColPic, a reference index refIdxLX, with X being 0 or 1.

Outputs of this process are:

the motion vector prediction mvLXCol, the availability flag availableFlagLXCol.

The variable currPic specifies the current picture.

The arrays predFlagL0Col[x][y], mvL0Col[x][y], and refIdxL0Col[x][y] are set equal to PredFlagL0[x][y], MvL0[x][y], and RefIdxL0[x][y], respectively, of the collocated picture specified by ColPic, and the arrays predFlagL1Col[x][y], mvL1Col[x][y], and refIdxL1Col[x][y] are set equal to PredFlagL1[x][y], MvL1[x][y], and RefIdxL1[x][y], respectively, of the collocated picture specified by ColPic.

The variables mvLXCol and availableFlagLXCol are derived as follows:

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows:

If predFlagL0Col[xColPb][yColPb] is equal to 0, mvCol, refIdxCol, and listCol are set equal to mvL1Col[xColPb][yColPb], refIdxL1Col[xColPb][yColPb], and L1, respectively.

Otherwise, if predFlagL0Col[xColPb][yColPb] is equal to 1 and predFlagL1Col[xColPb][yColPb] is equal to 0, mvCol, refIdxCol, and listCol are set equal to mvL0Col[xColPb][yColPb], refIdxL0Col[xColPb][yColPb], and L0, respectively.

Otherwise (predFlagL0Col[xColPb][yColPb] is equal to 1 and predFlagL1Col[xColPb][yColPb] is equal to 1), the following assignments are made:

If NoBackwardPredFlag is equal to 1, mvCol, refIdxCol, and listCol are set equal to mvLXCol[xColPb][yColPb], refIdxLXCol[xColPb][yColPb], and LX, respectively.

Otherwise, mvCol, refIdxCol, and listCol are set equal to mvLNCol[xColPb][yColPb], refIdxLNCol[xColPb][yColPb], and LN, respectively, with N being the value of collocated_from_10_flag.

and mvLXCol and availableFlagLXCol are derived as follows:

If LongTermRefPic(currPic, currPb, refIdxLX, LX) is not equal to LongTermRefPic(ColPic, colPb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing prediction block colPb in the collocated picture specified by ColPic, and the following applies:

```
colPocDiff = DiffPicOrderCnt( ColPic, refPicListCol[ refIdxCol ] ) (2-1)
currPocDiff = DiffPicOrderCnt( currPic, RefPicListX[ refIdxLX ] ) (2-2)
```

If RefPicListX[refIdxLX] is a long-term reference picture, or colPocDiff is equal to currPocDiff, mvLXCol is derived as follows:

```
mvLXCol=mvCol (2-3)
```

Otherwise, mvLXCol is derived as a scaled version of the motion vector mvCol as follows:

```
tx = ( 16384 + (Abs( td) >> 1 ) ) / td (2-4)
distScaleFactor = Clip3( −4096, 4095, (tb * tx + 32 ) >> 6 ) (2-5)
mvLXCol = Clip3( −32768, 32767, Sign( distScaleFactor *
mvCol ) *
( (Abs( distScaleFactor * mvCol) + 127 ) >> 8 ) )(2-6)
```

where td and tb are derived as follows:

```
td = Clip3( −128, 127, colPocDiff ) (2-7)
tb = Clip3( −128, 127, currPocDiff ) (2-8)
```

Definition of NoBackwardPredFlag is:

The variable NoBackwardPredFlag is derived as follows:

If DiffPicOrderCnt(aPic, CurrPic) is less than or equal to 0 for each picture aPic in RefPicList0 or RefPicList1 of the current slice, NoBackwardPredFlag is set equal to 1.

Otherwise, NoBackwardPredFlag is set equal to 0.

2.1.2.6 Additional Candidates Insertion

Figure 7:
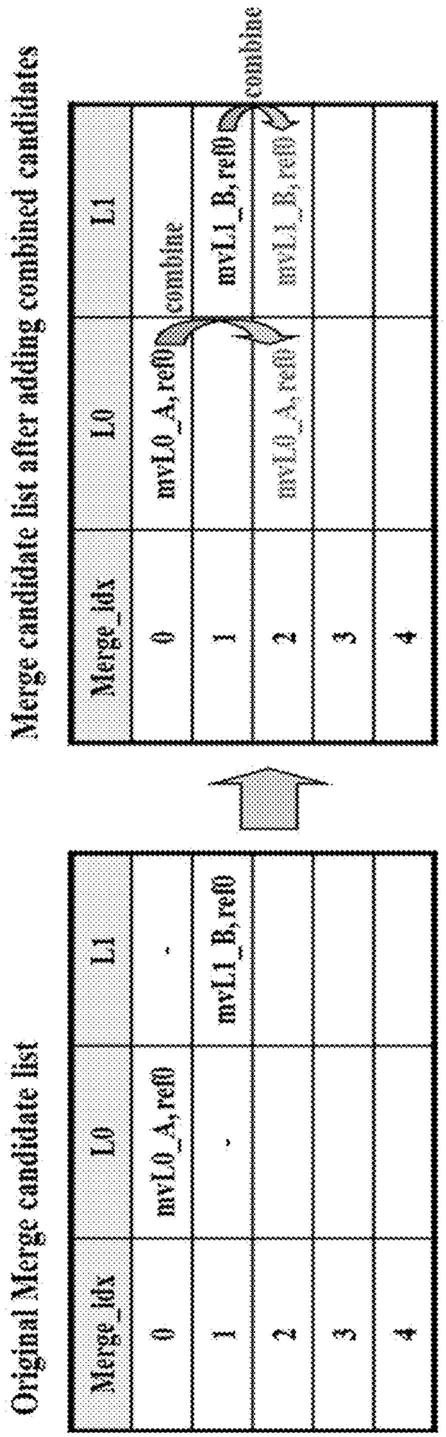
FIG. 7 shows example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates, defined in [1].

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
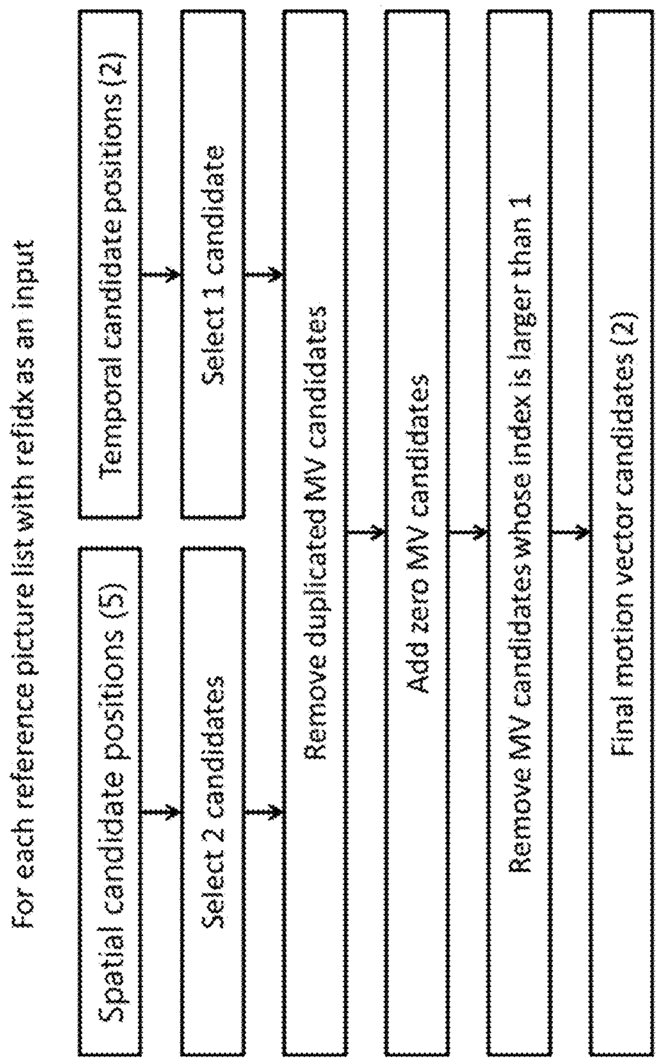
FIG. 8 shows examples of derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
- (1) Same reference picture list, and same reference picture index (same POC)
- (2) Different reference picture list, but same reference picture (same POC)

Spatial scaling
- (3) Same reference picture list, but different reference picture (different POC)
- (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
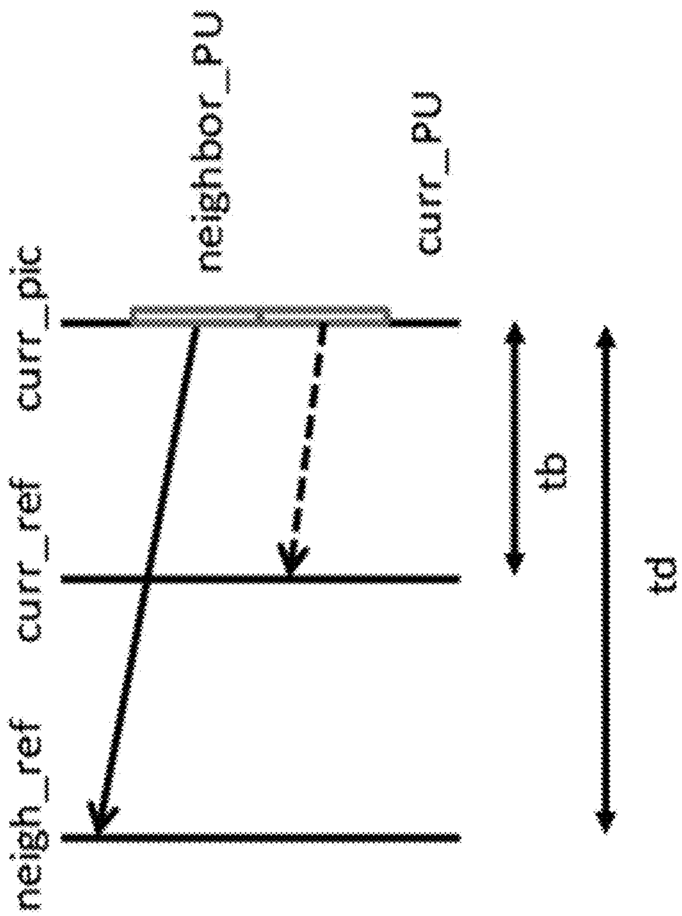
FIG. 9 shows an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
2) Regular merge list: For inter-coded blocks, one merge list construction process is shared. Here, the spatial/temporal merge candidates, HMVP, pairwise merge candidates and zero motion candidates may be inserted in order. Regular merge list size is signaled in slice header, and maximum value is 6. MMVD, TPM, CIIP rely on the regular merge list.
3) IBC merge list: it is done in a similar way as the regular merge list.

Similarly, there are three AMVP lists supported in VVC:

1) Affine AMVP candidate list
2) Regular AMVP candidate list
3) IBC AMVP candidate list: the same construction process as the IBC merge list due to the adoption of JVET-N0843

2.2.1 Coding Block Structure in VVC

In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.2.2 Affine Prediction Mode

Figure 10:
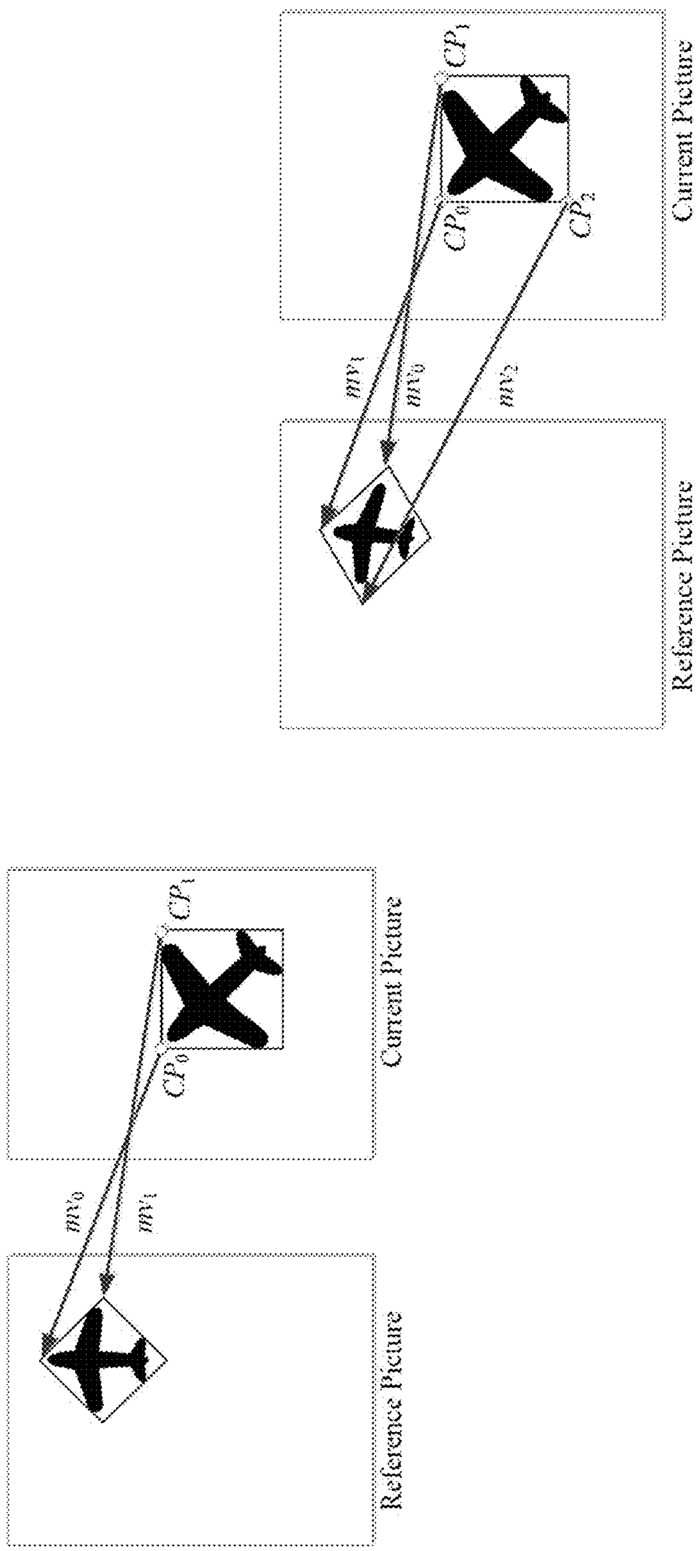
FIG. 10 shows an example simplified affine motion model for 4-parameter affine mode (left) and 6-parameter affine model (right).

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 10, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where ($mv^h_0$, $mv^h_0$) is motion vector of the top-left corner control point, and ($mv^h_1$, $mv^h_1$) is motion vector of the top-right corner control point and ($mv^h_2$, $mv^h_2$) is motion vector of the bottom-left corner control point, all of the three motion vectors are called control point motion vectors (CPMV), (x, y) represents the coordinate of a representative point relative to the top-left sample within current block and ($mv^h$(x,y), $mv^v$(x,y)) is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 11:
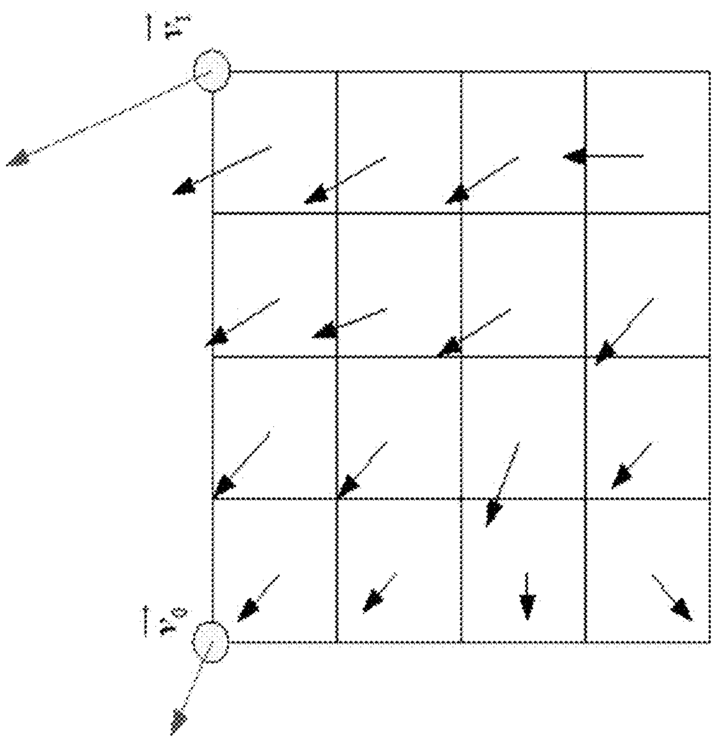
FIG. 11 shows an example of affine motion vector field per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 11, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.2.3 MERGE for Whole Block 2.2.3.1 Merge List Construction of Translational Regular Merge Mode 2.2.3.1.1 History-Based Motion Vector Prediction (HMVP)

Different from the merge list design, in VVC, the history-based motion vector prediction (HMVP) method is employed.

Figure 12:
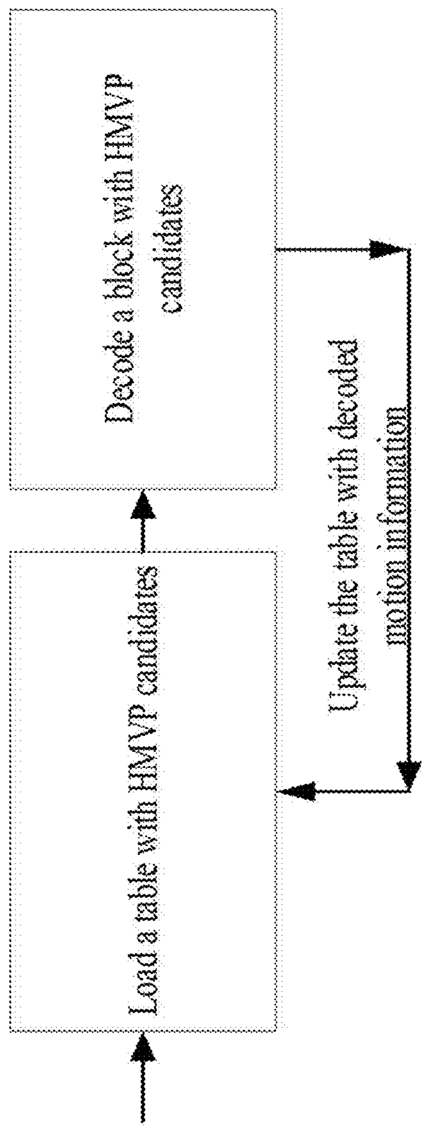
FIG. 12 shows an example Candidates position for affine merge mode.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 12.

2.2.3.1.2 Regular Merge List Construction Process

The construction of the regular merge list (for translational motion) can be summarized according to the following sequence of steps:

Step 1: Derivation of spatial candidates

Step 2: Insertion of HMVP candidates

Step 3: Insertion of pairwise average candidates

Step 4: default motion candidates

Figure 13:
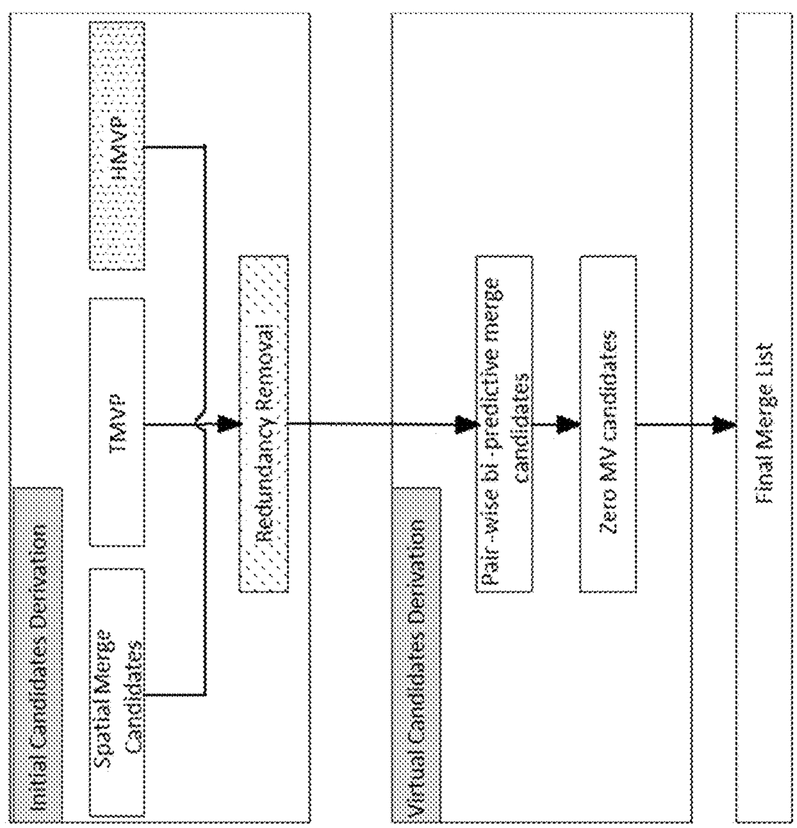
FIG. 13 shows an example of Modified merge list construction process.

HMVP candidates could be used in both AMVP and merge candidate list construction processes. FIG. 13 depicts the modified merge candidate list construction process (shown highlighted in dotted boxes). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.3.1.2.1 Pruning Processes

A candidate is only added to the list if the corresponding candidate used for redundancy check has not the same motion information. Such comparison process is called pruning process.

The pruning process among the spatial candidates is dependent on the usage of TPM for current block.

When current block is coded without TPM mode (e.g., regular merge, MMVD, CIIP), the HEVC pruning process (i.e., five pruning) for the spatial merge candidates is utilized.

2.2.4 Triangular Prediction Mode (TPM)

In VVC, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signalled to indicate whether the triangle partition mode is applied or not.

Figure 14:
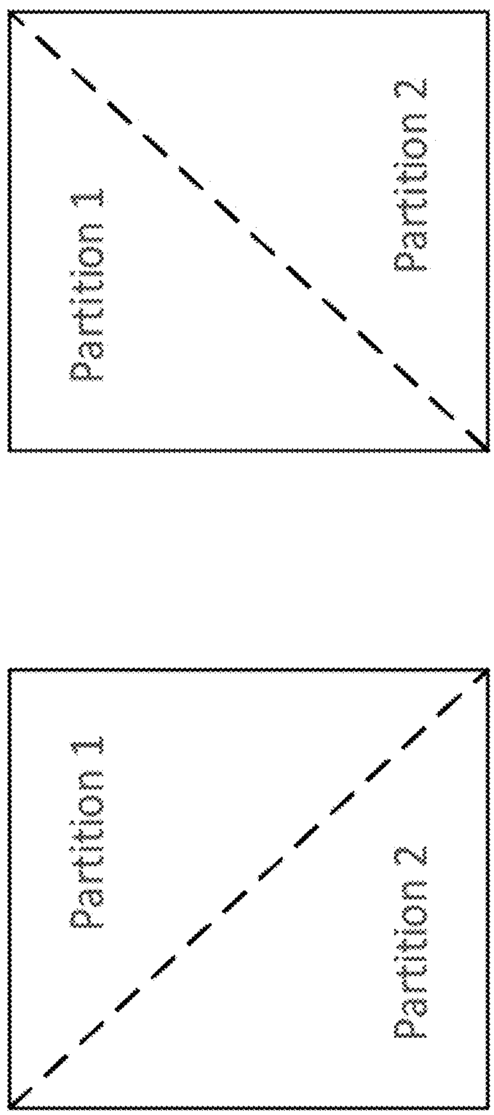
FIG. 14 shows an example of triangle partition based inter prediction.

When this mode is used, a CU is split evenly into two triangle-shaped partitions, using either the diagonal split or the anti-diagonal split, as depicted in FIG. 14. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.4.1 Merge List Construction Process for TPM

Basically, the regular merge list construction process is applied as proposed in JVET-N0340. However, some modifications are added.

Specifically, the followings are applied:

1) How to do the pruning process is dependent on the usage of TPM for current block
   - If the current block is not coded with TPM, the HEVC 5 pruning applied to spatial merge candidates is invoked
   - Otherwise (if the current block is coded with TPM), full pruning is applied when adding a new spatial merge candidates. That is, B1 is compared to A1; B0 is compared to A1 and B1; A0 is compared to A1, B1, and B0; B2 is compared to A1, B1, A0, and B0.
2) The condition on whether to check of motion information from B2 is dependent on the usage of TPM for current block
   - If the current block is not coded with TPM, B2 is accessed and checked only when there are less than 4 spatial merge candidates before checking B2.
   - Otherwise (if the current block is coded with TPM), B2 is always accessed and checked regardless how many available spatial merge candidates before adding B2.

2.2.4.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

1$^{st}$ weighting factor group: {7/8, 6/8, 4/8, 2/8, 1/8} and {7/8, 4/8, 1/8} are used for the luminance and the chrominance samples, respectively;

2$^{nd}$ weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The 2$^{nd}$ weighting factor group is used when any one of the following condition is true:

- the reference pictures of the two triangular prediction units are different from each other
- absolute value of the difference of two motion vectors' horizontal values is larger than 16 pixels.
- absolute value of the difference of two motion vectors' vertical values is larger than 16 pixels.

Figure 15:
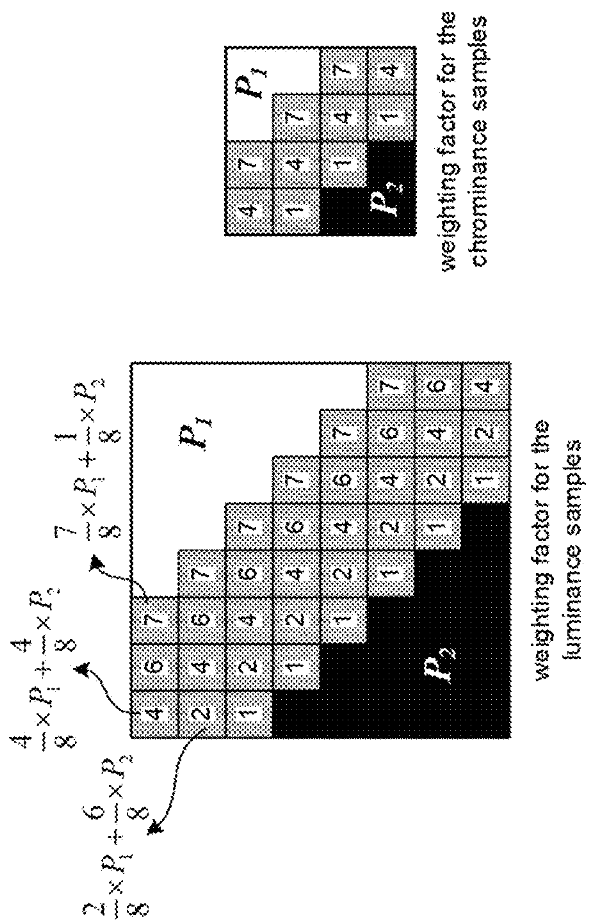
FIG. 15 shows an example of a CU applying the $1^{st}$ weighting factor group.

Otherwise, 1$^{st}$ weighting factor group is used. An example is shown in FIG. 15.

2.2.4.3 Motion Vector Storage

Figure 16:
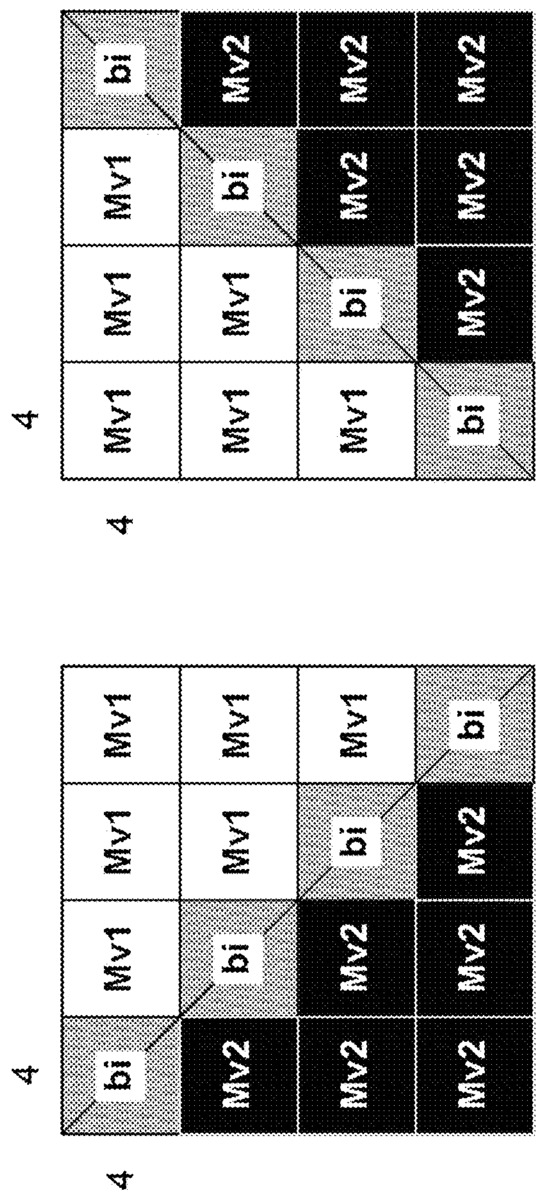
FIG. 16 shows an example of motion vector storage.
Figure 17:
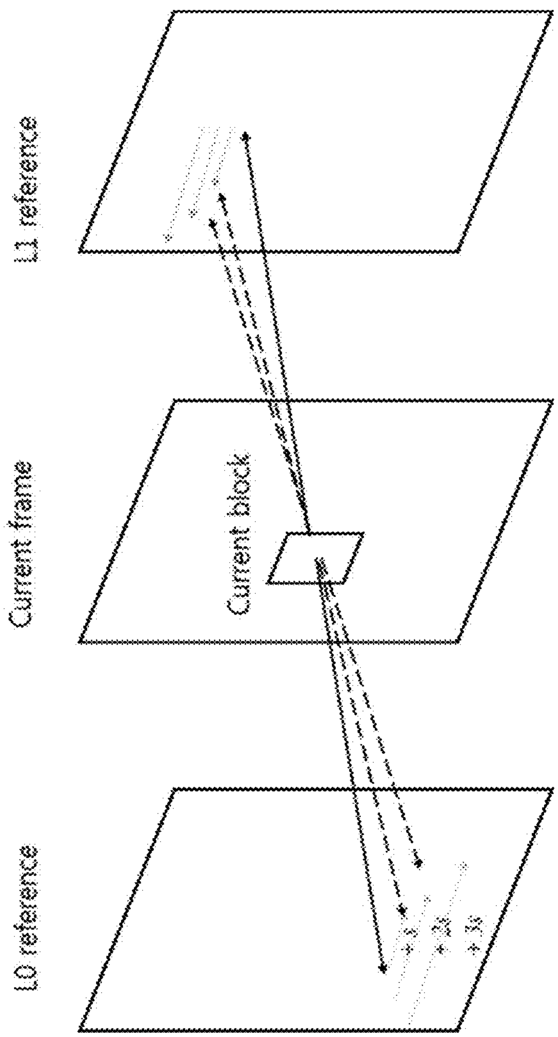
FIG. 17 shows an example of ultimate motion vector expression (UMVE) search process.
Figure 18:
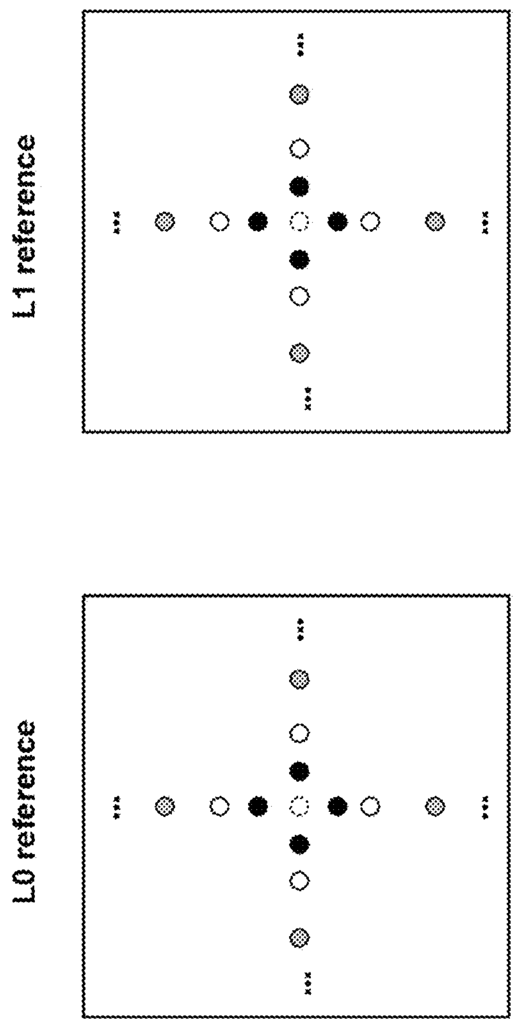
FIG. 18 shows an example of UMVE search points.

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.
2) In the case that both Mv1 and Mv2 are from the same L0 (or L1) direction,
   - If the reference picture of Mv2 is the same as a picture in the L1 (or L0) reference picture list, Mv2 is scaled to the picture. Mv1 and the scaled Mv2 are combined to form the bi-prediction motion vector.
   - If the reference picture of Mv1 is the same as a picture in the L1 (or L0) reference picture list, Mv1 is scaled to the picture. The scaled Mv1 and Mv2 are combined to form the bi-prediction motion vector.
   - Otherwise, only Mv1 is stored for the weighted area.

2.2.4.4 Syntax Tables, Semantics and Decoding Process for Merge Mode 7.3.5.1 General Slice Header Syntax

| | Descriptor |
|---|---|
| slice_header( ) { | |
| **slice_pic_parameter_set_id** | ue(v) |
| if( rect_slice_flag \| \| NumBricksInPic > 1 ) | |
| **slice_address** | u(v) |
| if( !rect_slice_flag && !single_brick_per_slice_flag ) | |
| **num_bricks_in_slice_minus1** | ue(v) |

-continued

<table>
<tr><th></th><th>Descriptor</th></tr>
<tr><td>**slice_type**</td><td>ue(v)</td></tr>
<tr><td>...</td><td></td></tr>
<tr><td>*if ( slice_type != I ) {*</td><td></td></tr>
<tr><td>if( sps_temporal_mvp_enabled_flag )</td><td></td></tr>
<tr><td>**slice_temporal_mvp_enabled_flag**</td><td>u(1)</td></tr>
<tr><td>if( slice_type = = B )</td><td></td></tr>
<tr><td>**mvd_l1_zero_flag**</td><td>u(1)</td></tr>
<tr><td>if( cabac_init_present_flag)</td><td></td></tr>
<tr><td>**cabac_init_flag**</td><td>u(1)</td></tr>
<tr><td>if( slice_temporal_mvp_enabled_flag ) {</td><td></td></tr>
<tr><td>if( slice_type = = B )</td><td></td></tr>
<tr><td>**collocated from_l0_flag**</td><td>u(1)</td></tr>
<tr><td>}</td><td></td></tr>
<tr><td>if( ( weighted_pred_flag && slice_type = = P ) | |</td><td></td></tr>
<tr><td>( weighted_bipred_flag && slice_type = = B ) )</td><td></td></tr>
<tr><td>pred_weight_table( )</td><td></td></tr>
<tr><td>***six minus maxnum merge cand***</td><td>***ue(v)***</td></tr>
<tr><td>***if( sps affineenabled flag )***</td><td></td></tr>
<tr><td>***five minus maxnum subblockmerge cand***</td><td>***ue(v)***</td></tr>
<tr><td>***if( sps fpel mmvdenabled flag )***</td><td></td></tr>
<tr><td>***slice fpel mmvdenabled flag***</td><td>***u(1)***</td></tr>
<tr><td>***if( sps triangleenabled flag && MaxNumMergeCand >= 2 )***</td><td></td></tr>
<tr><td>***max num mergecand minus maxnum triangle cand***</td><td>***ue(v)***</td></tr>
<tr><td>***} else if (spsibc enabled flag )***</td><td></td></tr>
<tr><td>***six minus maxnum merge cand***</td><td>ue(v)</td></tr>
<tr><td>**slice_qp_delta**</td><td>se(v)</td></tr>
<tr><td>if( pps_slice_chroma_qp_offsets_present_flag ) {</td><td></td></tr>
<tr><td>**slice_cb_qp_offset**</td><td>se(v)</td></tr>
<tr><td>**slice_cr_qp_offset**</td><td>se(v)</td></tr>
<tr><td>}</td><td></td></tr>
<tr><td>...</td><td></td></tr>
<tr><td>byte_alignment( )</td><td></td></tr>
<tr><td>}</td><td></td></tr>
</table>

7.3.7.5 Coding Unit Syntax

<table>
<tr><th></th><th>Descriptor</th></tr>
<tr><td>coding_unit( x0, y0, cbWidth, cbHeight, treeType ) {</td><td></td></tr>
<tr><td>if( slice_type != I | | sps_ibc_enabled_flag) {</td><td></td></tr>
<tr><td>if( treeType != DUAL_TREE_CHROMA &&</td><td></td></tr>
<tr><td>!( cbWidth = = 4 && cbHeight = = 4 && !sps_ibc_enabled_flag ) )</td><td></td></tr>
<tr><td>**cu_skip_flag**[ x0 ][ y0 ]</td><td>ae(v)</td></tr>
<tr><td>if( cu_skip_flag[ x0 ][ y0 ] = = 0 && slice_type != I</td><td></td></tr>
<tr><td>&& !( cbWidth = = 4 && cbHeight = = 4 ) )</td><td></td></tr>
<tr><td>**pred_mode_flag**</td><td>ae(v)</td></tr>
<tr><td>if( ( ( slice_type = = I && cu_skip_flag[ x0 ][ y0 ] = =0 ) | |</td><td></td></tr>
<tr><td>( slice_type != I && ( CuPredMode[ x0 ][ y0 ] != MODE_INTRA | |</td><td></td></tr>
<tr><td>( cbWidth = = 4 && cbHeight = = 4 && cu_skip_flag[ x0 ][ y0 ] = = 0 ) ) ) )<br>&&</td><td></td></tr>
<tr><td>sps_ibc_enabled_flag && ( cbWidth != 128 | | cbHeight != 128 ) )</td><td></td></tr>
<tr><td>**pred_mode_ibc_flag**</td><td>ae(v)</td></tr>
<tr><td>}</td><td></td></tr>
<tr><td>if( CuPredMode[ x0 ][ y0 ] = = MODE_INTRA ) {</td><td></td></tr>
<tr><td>...</td><td></td></tr>
<tr><td>}</td><td></td></tr>
<tr><td>} else if( treeType != DUAL_TREE_CHROMA ) { /* MODE_INTER or<br>MODE_IBC */</td><td></td></tr>
<tr><td>if( cu_skip_flag[ x0 ][ y0 ] = = 0 )</td><td></td></tr>
<tr><td>**general_merge_flag**[ x0 ][ y0 ]</td><td>ae(v)</td></tr>
<tr><td>if( general_merge_flag[ x0 ][ y0 ] ) {</td><td></td></tr>
<tr><td>merge_data( x0, y0, cbWidth, cbHeight )</td><td></td></tr>
<tr><td>***} else if ( CuPredMode[x0 ][ y0 ] = =MODE IBC ) {***</td><td></td></tr>
<tr><td>***mvd_coding( x0, y0, 0, 0 )***</td><td></td></tr>
<tr><td>***mvp l0 flag[ x0 ][y0 ]***</td><td>***ae(v)***</td></tr>
<tr><td>***if( sps amvrenabled flag &&***</td><td></td></tr>
<tr><td>***( MvdL0[ x0 ][( MvdL0[ x0 ][MvdL0[ x0 ][ y0][ 1 ] != 0 ) ) {***</td><td></td></tr>
<tr><td>***amvr_precisionflag[ x0 ][ y0 ]***</td><td>***ae(v)***</td></tr>
<tr><td>***}***</td><td></td></tr>
<tr><td>} else {</td><td></td></tr>
<tr><td>if( slice_type = = B )</td><td></td></tr>
<tr><td>**inter_pred_idc**[ x0 ][ y0 ]</td><td>ae(v)</td></tr>
<tr><td>if( sps_affine_enabled_flag && cbWidth >= 16 && cbHeight >= 16 ) {</td><td></td></tr>
<tr><td>**inter_affine_flag**[ x0 ][ y0 ]</td><td>ae(v)</td></tr>
</table>

-continued

| | Descriptor |
|---|---|
| if( sps_affine_type_flag && inter_affine_flag[ x0 ][ y0 ] ) | |
| **cu_affine_type_flag**[ x0 ][ y0 ] | ae(v) |
| } | |
| if( sps_smvd_enabled_flag && inter_pred_idc[ x0 ][ y0 ] = = PRED_BI && !inter_affine_flag[ x0 ][ y0 ] && RefIdxSymL0 > −1 && RefIdxSymL1 > −1 ) | |
| **sym_mvd_flag**[ x0 ][ y0 ] | ae(v) |
| ... | |
| } | |
| } | |

7.3.7.7 Merge Data Syntax

| | Descriptor |
|---|---|
| merge_data( x0, y0, cbWidth, cbHeight ) { | |
| ***<u>if ( CuPredMode[x0 ][ y0 ] = =MODE_IBC ) {</u>*** | |
| ***<u>if( MaxNumMergeCand > 1 )</u>*** | |
| ***<u>merge_idx[x0 ][ y0 ]</u>*** | ***<u>ae(v)</u>*** |
| ***<u>} else {</u>*** | |
| if( sps_mmvd_enabled_flag \| \| cbWidth * cbHeight != 32 ) | |
| **regular_merge_flag**[ x0 ][ y0 ] | ae(v) |
| if ( regular_merge_flag[ x0 ][ y0 ] = = 1 ){ | |
| if( MaxNumMergeCand > 1 ) | |
| **merge_idx**[ x0 ][ y0 ] | ae(v) |
| } else { | |
| if( sps_mmvd_enabled_flag && cbWidth * cbHeight != 32 ) | |
| **mmvd_merge_flag**[ x0 ][ y0 ] | ae(v) |
| if( mmvd_merge_flag[ x0 ][ y0 ] = = 1 ) { | |
| if( MaxNumMergeCand > 1 ) | |
| **mmvd_cand_flag**[ x0 ][ y0 ] | ae(v) |
| **mmvd_distance_idx**[ x0 ][ y0 ] | ae(v) |
| **mmvd_direction_idx**[ x0 ][ y0 ] | ae(v) |
| } else { | |
| if( MaxNumSubblockMergeCand > 0 && cbWidth >= 8 && cbHeight >= 8 ) | |
| **merge_subblock_flag**[ x0 ][ y0 ] | ae(v) |
| if( merge_subblock_flag[ x0 ][ y0 ] = = 1 ) { | |
| if( MaxNumSubblockMergeCand > 1 ) | |
| **merge_subblock_idx**[ x0 ][ y0 ] | ae(v) |
| } else { | |
| if( sps_ciip_enabled_flag && cu_skip_flag[ x0 ][ y0 ] = = 0 && ( cbWidth * cbHeight ) >= 64 && cbWidth < 128 && cbHeight < 128 ) { | |
| **ciip_flag**[ x0 ][ y0 ] | ae(v) |
| if( ciip_flag[ x0 ][ y0 ] && MaxNumMergeCand > 1 ) | |
| **merge_idx**[ x0 ][ y0 ] | ae(v) |
| } | |
| if( MergeTriangleFlag[ x0 ][ y0 ] ) { | |
| **merge_triangle_split_dir**[ x0 ][ y0 ] | ae(v) |
| **merge_triangle_idx0**[ x0 ][ y0 ] | ae(v) |
| **merge_triangle_idx1**[ x0 ][ y0 ] | ae(v) |
| } | |
| } | |
| } | |
| } | |
| } | |
| } | |

7.4.6.1 General Slice Header Semantics six_minus_max_num_merge_cand specifies the maximum number of merging motion vector prediction (MVP) candidates supported in the slice subtracted from 6. The maximum number of merging MVP candidates, MaxNumMergeCand is derived as follows:

$$MaxNumMergeCand=6-six\_minus\_max\_num\_merge\_cand \quad (7\text{-}57)$$

The value of MaxNumMergeCand shall be in the range of 1 to 6, inclusive.

five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

$$MaxNumSubblockMergeCand=5-five\_minus\_max\_num\_subblock\_merge\_cand \quad (7\text{-}58)$$

The value of MaxNumSubblockMergeCand shall be in the range of 0 to 5, inclusive.

7.4.8.5 Coding Unit Semantics pred_mode_flag equal to 0 specifies that the current coding unit is coded in inter prediction mode.

pred_mode_flag equal to 1 specifies that the current coding unit is coded in intra prediction mode.

When pred_mode_flag is not present, it is inferred as follows:

If cbWidth is equal to 4 and cbHeight is equal to 4, pred_mode_flag is inferred to be equal to 1.

Otherwise, pred_mode_flag is inferred to be equal to 1 when decoding an I slice, and equal to 0 when decoding a P or B slice, respectively.

The variable CuPredMode[x][y] is derived as follows for x=x0 . . . x0+cbWidth−1 and y=y0 . . . y0+cbHeight−1:

If pred_mode_flag is equal to 0, CuPredMode[x][y] is set equal to MODE_INTER.

Otherwise (pred_mode_flag is equal to 1), CuPredMode [x][y] is set equal to MODE_INTRA.

pred_mode_ibc_flag equal to 1 specifies that the current coding unit is coded in IBC prediction mode.

pred_mode_ibc_flag equal to 0 specifies that the current coding unit is not coded in IBC prediction mode.

When pred_mode_ibc_flag is not present, it is inferred as follows:

If cu_skip_flag[x0][y0] is equal to 1, and cbWidth is equal to 4, and cbHeight is equal to 4, pred_mode_ibc_flag is inferred to be equal 1.

Otherwise, if both cbWidth and cbHeight are equal to 128, pred_mode_ibc_flag is inferred to be equal to 0.

Otherwise, pred_mode_ibc_flag is inferred to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0 . . . x0+cbWidth−1 and y=y0 . . . y0+cbHeight−1.

general_merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When general_merge_flag[x0][y0] is not present, it is inferred as follows:

If cu_skip_flag[x0][y0] is equal to 1, general_merge_flag [x0][y0] is inferred to be equal to 1.

Otherwise, general_merge_flag[x0][y0] is inferred to be equal to 0.

mvp_10_flag[x0][y0] specifies the motion vector predictor index of list 0 where x0, y0 specify the location (x0, y0) of the top-left luma sample of the considered coding block relative to the top-left luma sample of the picture.

When mvp_10_flag[x0][y0] is not present, it is inferred to be equal to 0.

mvp_11_flag[x0][y0] has the same semantics as mvp_10_flag, with 10 and list 0 replaced by 11 and list 1, respectively.

inter_pred_idc[x0][y0] specifies whether list0, list1, or bi-prediction is used for the current coding unit according to Table 7-10. The array indices x0, y0 specify the location (x0, y0) of the top-left luma sample of the considered coding block relative to the top-left luma sample of the picture.

TABLE 7-10

Name association to inter prediction mode

| inter_pred_idc | Name of inter_pred_idc<br>( cbWidth + cbHeight ) > 12 | <br>( cbWidth + cbHeight ) = = 12 | <br>( cbWidth + cbHeight ) = = 8 |
|---|---|---|---|
| 0 | PRED_L0 | PRED_L0 | n.a. |
| 1 | PRED_L1 | PRED_L1 | n.a. |
| 2 | PRED_BI | n.a. | n.a. |

When inter_pred_idc[x0][y0] is not present, it is inferred to be equal to PRED_L0.

7.4.8.7 Merge Data Semantics regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

When regular_merge_flag[x0][y0] is not present, it is inferred as follows:

If all the following conditions are true, regular_merge_flag[x0][y0] is inferred to be equal to 1:
sps_mmvd_enabled_flag is equal to 0.
general_merge_flag[x0][y0] is equal to 1.
cbWidth*cbHeight is equal to 32.

Otherwise, regular_merge_flag[x0][y0] is inferred to be equal to 0.

mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows:

If all the following conditions are true, mmvd_merge_flag [x0][y0] is inferred to be equal to 1:
sps_mmvd_enabled_flag is equal to 1.
general_merge_flag[x0][y0] is equal to 1.
cbWidth*cbHeight is equal to 32.
regular_merge_flag[x0][y0] is equal to 0.

Otherwise, mmvd_merge_flag[x0][y0] is inferred to be equal to 0.

mmvd_cand_flag[x0][y0] specifies whether the first (0) or the second (1) candidate in the merging candidate list is used with the motion vector difference derived from mmvd_distance_idx[x0][y0] and mmvd_direction_idx [x0][y0]. The array indices x0, y0 specify the location (x0, y0) of the top-left luma sample of the considered coding block relative to the top-left luma sample of the picture.

When mmvd_cand_flag[x0][y0] is not present, it is inferred to be equal to 0.

mmvd_distance_idx[x0][y0] specifies the index used to derive MmvdDistance[x0][y0] as specified in Table 7-12. The array indices x0, y0 specify the location (x0, y0) of the top-left luma sample of the considered coding block relative to the top-left luma sample of the picture.

TABLE 7-12

Specification of MmvdDistance[ x0 ][ y0 ] based on mmvd_distance_idx[ x0 ][ y0 ].

| mmvd_distance_idx [ x0 ][ y0 ] | MmvdDistance[ x0 ][ y0 ] slice_fpel_mmvd_ enabled_flag = = 0 | MmvdDistance[ x0 ][ y0 ] slice_fpel_mmvd_ enabled_flag = = 1 |
|---|---|---|
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

mmvd_direction_idx[x0][y0] specifies index used to derive MmvdSign[x0][y0] as specified in Table 7-13. The array indices x0, y0 specify the location (x0, y0) of the top-left luma sample of the considered coding block relative to the top-left luma sample of the picture.

TABLE 7-13

Specification of MmvdSign[ x0 ][ y0 ] based on mmvd_direction_idx[ x0 ][ y0 ]

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

MmvdOffset[ x0 ][ y0 ][ 0 ] = ( MmvdDistance[ x0 ][ y0 ] << 2 ) * MmvdSign[ x0 ][ y0 ][0] (7-124)

MmvdOffset[ x0 ][ y0 ][ 1 ] = ( MmvdDistance[ x0 ][ y0 ] << 2 ) * MmvdSign[ x0 ][ y0 ][1] (7-125)

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

When ciip_flag[x0][y0] is equal to 1, the variable IntraPredModeY[x][y] with x=xCb . . . xCb+cbWidth−1 and y=yCb . . . yCb+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice. is derived as follows:

If all the following conditions are true, MergeTriangleFlag[x0][y0] is set equal to 1:

sps_triangle_enabled_flag is equal to 1.

slice_type is equal to B.

general_merge_flag[x0][y0] is equal to 1.

MaxNumTriangleMergeCand is greater than or equal to 2.

cbWidth*cbHeight is greater than or equal to 64.

regular_merge_flag[x0][y0] is equal to 0.

mmvd_merge_flag[x0][y0] is equal to 0.

merge_subblock_flag[x0][y0] is equal to 0.

ciip_flag[x0][y0] is equal to 0.

Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:

If mmvd_merge_flag[x0][y0] is equal to 1, merge_idx [x0][y0] is inferred to be equal to mmvd_cand_flag [x0][y0].

Otherwise (mmvd_merge_flag[x0][y0] is equal to 0), merge_idx[x0][y0] is inferred to be equal to 0.

2.2.4.4.1 Decoding Process

The decoding process as provided in the JVET-N0340 is defined as follows:

8.5.2.2 Derivation Process for Luma Motion Vectors for Merge Mode

This process is only invoked when general_merge_flag [xCb][yCb] is equal to 1, where (xCb, yCb) specify the top-left sample of the current luma coding block relative to the top-left luma sample of the current picture.

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are:

the luma motion vectors in 1/16 fractional-sample accuracy mvL0[0][0] and mvL1[0][0], the reference indices refIdxL0 and refIdxL1, the prediction list utilization flags predFlagL0[0][0] and predFlagL1[0][0], the bi-prediction weight index bcwIdx.

the merging candidate list mergeCandList.

The bi-prediction weight index bcwIdx is set equal to 0.

The motion vectors mvL0[0][0] and mvL1[0][0], the reference indices refIdxL0 and refIdxL1 and the prediction utilization flags predFlagL0[0][0] and predFlagL1[0][0] are derived by the following ordered steps:

1. The derivation process for spatial merging candidates from neighbouring coding units as specified in clause 8.5.2.3 is invoked with the luma coding block location (xCb, yCb), the luma coding block width cbWidth, and the luma coding block height cbHeight as inputs, and the output being the availability flags availableFlagA$_0$, availableFlagA$_1$, availableFlagB$_0$, availableFlagB$_1$ and availableFlagB$_2$, the reference indices refIdxLXA$_0$, refIdxLXA$_1$, refIdxLXB$_0$, refIdxLXB$_1$ and refIdxLXB$_2$, the prediction list utilization flags predFlagLXA$_0$, predFlagLXA$_1$, predFlagLXB$_0$, predFlagLXB$_1$ and predFlagLXB$_2$, and the motion vectors mvLXA$_0$, mvLXA$_1$, mvLXB$_0$, mvLXB$_1$ and mvLXB$_2$, with X being 0 or 1, and the bi-prediction weight indices bcwIdxA$_0$, bcwIdxA$_1$, bcwIdxB$_0$, bcwIdxB$_1$, bcwIdxB$_2$.
2. The reference indices, refIdxLXCol, with X being 0 or 1, and the bi-prediction weight index bcwIdxCol for the temporal merging candidate Col are set equal to 0.
3. The derivation process for temporal luma motion vector prediction as specified in in clause 8.5.2.11 is invoked with the luma location (xCb, yCb), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

```
availableFlagCol = availableFlagL0Col    (8-263)
predFlagL0Col = availableFlagL0Col       (8-264)
predFlagL1Col = 0                        (8-265)
```

4. When slice_type is equal to B, the derivation process for temporal luma motion vector prediction as specified in clause 8.5.2.11 is invoked with the luma location (xCb, yCb), the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:

```
availableFlagCol = availableFlagL0Col | | availableFlagL1Col  (8-266)
predFlagL1Col = availableFlagL1Col                            (8-267)
```

5. The merging candidate list, mergeCandList, is constructed as follows:

```
i = 0
if( availableFlagA1 )
mergeCandList[ i++ ] = A1
if( availableFlagB1 )
mergeCandList[ i++ ] = B1
if( availableFlagB0 )
mergeCandList[ i++ ] = B0(8-268)
if( availableFlagA0 )
mergeCandList[ i++ ] = A0
if( availableFlagB2 )
mergeCandList[ i++ ] = B2
if( availableFlagCol)
mergeCandList[ i++ ] = Col
```

6. The variable numCurrMergeCand and numOrigMergeCand are set equal to the number of merging candidates in the mergeCandList.
7. When numCurrMergeCand is less than (MaxNumMergeCand=1) and NumHmvpCand is greater than 0, the following applies:

The derivation process of history-based merging candidates as specified in 8.5.2.6 is invoked with mergeCandList and numCurrMergeCand as inputs, and modified mergeCandList and numCurrMergeCand as outputs.

numOrigMergeCand is set equal to numCurrMergeCand.

8. When numCurrMergeCand is less than MaxNumMergeCand and greater than 1, the following applies:

The derivation process for pairwise average merging candidate specified in clause 8.5.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0avgCand and refIdxL1avgCand, the prediction list utilization flags predFlagL0avgCand and predFlagL1avgCand and the motion vectors mvL0avgCand and mvL1avgCand of candidate avgCand being added into mergeCandList. The bi-prediction weight index bcwIdx of candidate avgCand being added into mergeCandList is set equal to 0.

numOrigMergeCand is set equal to numCurrMergeCand.

9. The derivation process for zero motion vector merging candidates specified in clause 8.5.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ and mvL1zeroCand$_m$ of every new candidate zeroCand$_m$ being added into mergeCandList. The bi-prediction weight index bcwIdx of every new candidate zeroCand$_m$ being added into mergeCandList is set equal to 0. The number of candidates being added, numZeroMergeCand, is set equal to (numCurrMergeCand−numOrigMergeCand). When numZeroMergeCand is greater than 0, m ranges from 0 to numZeroMergeCand−1, inclusive.

10. The following assignments are made with N being the candidate at position merge_idx[xCb][yCb] in the merging candidate list mergeCandList (N=mergeCandList[merge_idx[xCb][yCb]]) and X being replaced by 0 or 1:

| | |
|---|---|
| refIdxLX = refIdxLXN | (8-269) |
| predFlagLX[ 0 ][ 0 ] = predFlagLXN | (8-270) |
| mvLX[ 0 ][ 0 ][ 0 ] = mvLXN[ 0 ] | (8-271) |
| mvLX[ 0 ][ 0 ][ 1 ] = mvLXN[ 1 ] | (8-272) |
| bcwIdx = bcwIdxN | (8-273) |

11. When mmvd_merge_flag[xCb][yCb] is equal to 1, the following applies:

The derivation process for merge motion vector difference as specified in 8.5.2.7 is invoked with the luma location (xCb, yCb), the reference indices refIdxL0, refIdxL1 and the prediction list utilization flags predFlagL0[0][0] and predFlagL1[0][0] as inputs, and the motion vector differences mMvdL0 and mMvdL1 as outputs.

The motion vector difference mMvdLX is added to the merge motion vectors mvLX for X being 0 and 1 as follows:

| | |
|---|---|
| mvLX[ 0 ][ 0 ][ 0 ] += mMvdLX[ 0 ] | (8-274) |
| mvLX[ 0 ][ 0 ][ 1 ] += mMvdLX[ 1 ] | (8-275) |
| mvLX[ 0 ][ 0 ][ 0 ] = Clip3( $-2^{17}$, $2^{17}-1$, mvLX[ 0 ][ 0 ][ 0 ] ) | (8-276) |
| mvLX[ 0 ][ 0 ][ 1 ] = Clip3( $-2^{17}$, $2^{17}-1$, mvLX[ 0 ][ 0 ][ 1 ] ) | (8-277) |

8.5.2.3 Derivation Process for Spatial Merging Candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags availableFlagA$_0$, availableFlagA$_1$, availableFlagB$_0$, availableFlagB$_1$ and availableFlagB$_2$ of the neighbouring coding units, the reference indices refIdxLXA$_0$, refIdxLXA$_1$, refIdxLXB$_0$, refIdxLXB$_1$ and refIdxLXB$_2$ of the neighbouring coding units, the prediction list utilization flags predFlagLXA$_0$, predFlagLXA$_1$, predFlagLXB$_0$, predFlagLXB$_1$ and predFlagLXB$_2$ of the neighbouring coding units, the motion vectors in 1/16 fractional-sample accuracy mvLXA$_0$, mvLXA$_1$, mvLXB$_0$, mbLXB$_1$ and mvLXB$_2$ of the neighbouring coding units, the bi-prediction weight indices gbiIdxA$_0$, gbiIdxA$_1$, gbiIdxB$_0$, gbiIdxB$_1$, and gbiIdxB$_2$.

For the derivation of availableFlagA$_1$, refIdxLXA$_1$, predFlagLXA$_1$ and mvLXA$_1$ the following applies:

The luma location (xNbA$_1$, yNbA$_1$) inside the neighbouring luma coding block is set equal to (xCb−1, yCb+cbHeight−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_1$, yNbA$_1$) as inputs, and the output is assigned to the block availability flag availableA$_1$.

The variables availableFlagA$_1$, refIdxLXA$_1$, predFlagLXA$_1$ and mvLXA$_1$ are derived as follows:

If availableA$_1$ is equal to FALSE, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, and gbiIdxAi is set equal to 0.

Otherwise, availableFlagA$_1$ is set equal to 1 and the following assignments are made:

| | |
|---|---|
| mvLXA$_1$ = MvLX[ xNbA$_1$ ][ yNbA$_1$ ] | (8-294) |
| refIdxLXA$_1$ = RefIdxLX[ xNbA$_1$ ][ yNbA$_1$ ] | (8-295) |
| predFlagLXA$_1$ = PredFlagLX[ xNbA$_1$ ][ yNbA$_1$ ] | (8-296) |
| gbiIdxA$_1$ = GbiIdx[ xNbA$_1$ ][ yNbA$_1$ ] | (8-297) |

For the derivation of availableFlagB$_1$, refIdxLXB$_1$, predFlagLXB$_1$ and mvLXB$_1$ the following applies:

The luma location (xNbB$_1$, yNbB$_1$) inside the neighbouring luma coding block is set equal to (xCb+cbWidth−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_1$, yNbB$_1$) as inputs, and the output is assigned to the block availability flag availableB$_1$.

The variables availableFlagB$_1$, refIdxLXB$_1$, predFlagLXB$_1$ and mvLXB$_1$ are derived as follows:

If one or more of the following conditions are true, availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, and gbiIdxB$_1$ is set equal to 0:

availableB$_1$ is equal to FALSE.

availableA$_1$ is equal to TRUE and the luma locations (xNbA$_1$, yNbA$_1$) and (xNbB$_1$, yNbB$_1$) have the same motion vectors and the same reference indices.

Otherwise, availableFlagB$_1$ is set equal to 1 and the following assignments are made:

| | |
|---|---|
| mvLXB$_1$ = MvLX[ xNbB$_1$ ][ yNbB$_1$ ] | (8-298) |
| refIdxLXB$_1$ = RefIdxLX[ xNbB$_1$ ][ yNbB$_1$ ] | (8-299) |
| predFlagLXB$_1$ = PredFlagLX[ xNbB$_1$ ][ yNbB$_1$ ] | (8-300) |
| gbiIdxB$_1$ = GbiIdx[ xNbB$_1$ ][ yNbB$_1$ ] | (8-301) |

For the derivation of availableFlagB$_0$, refIdxLXB$_0$, predFlagLXB$_0$ and mvLXB$_0$ the The luma location (xNbB$_0$, yNbB$_0$) inside the neighbouring luma coding block is set equal to (xCb+cbWidth, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_0$, yNbB$_0$) as inputs, and the output is assigned to the block availability flag availableB$_0$.

The variables availableFlagB$_0$, refIdxLXB$_0$, predFlagLXB$_0$ and mvLXB$_0$ are derived as follows:

If one or more of the following conditions are true, availableFlagB$_0$ is set equal to 0, both components of mvLXB$_0$ are set equal to 0, refIdxLXB$_0$ is set equal to −1 and predFlagLXB$_0$ is set equal to 0, with X being 0 or 1, and gbiIdxB$_0$ is set equal to 0:

availableB$_0$ is equal to FALSE.

availableB$_1$ is equal to TRUE and the luma locations (xNbB$_1$, yNbB$_1$) and (xNbB$_0$, yNbB$_0$) have the same motion vectors and the same reference indices.

availableA$_1$ is equal to TRUE, the luma locations (xNbA$_1$, yNbA$_1$) and (xNbB$_0$, yNbB$_0$) have the same motion vectors and the same reference indices and merge_triangle_flag[xCb][yCb] is equal to 1.

Otherwise, availableFlagB$_0$ is set equal to 1 and the following assignments are made:

| | |
|---|---|
| mvLXB$_0$ = MvLX[ xNbB$_0$ ][ yNbB$_0$ ] | (8-302) |
| refIdxLXB$_0$ = RefIdxLX[ xNbB$_0$ ][ yNbB$_0$ ] | (8-303) |
| predFlagLXB$_0$ = PredFlagLX[ xNbB$_0$ ][ yNbB$_0$ ] | (8-304) |
| gbiIdxB$_0$ = GbiIdx[ xNbB$_0$ ] [ yNbB$_0$ ] | (8-305) |

For the derivation of availableFlagA$_0$, refIdxLXA$_0$, predFlagLXA$_0$ and mvLXA$_0$ the following applies:

The luma location (xNbA$_0$, yNbA$_0$) inside the neighbouring luma coding block is set equal to (xCb−1, yCb+cbWidth).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_0$, yNbA$_0$) as inputs, and the output is assigned to the block availability flag availableA$_0$.

The variables availableFlagA$_0$, refIdxLXA$_0$, predFlagLXA$_0$ and mvLXA$_0$ are derived as follows:

If one or more of the following conditions are true, availableFlagA$_0$ is set equal to 0, both components of mvLXA$_0$ are set equal to 0, refIdxLXA$_0$ is set equal to −1 and predFlagLXA$_0$ is set equal to 0, with X being 0 or 1, and gbiIdxA$_0$ is set equal to 0:

availableA$_0$ is equal to FALSE.

availableA$_1$ is equal to TRUE and the luma locations (xNbA$_1$, yNbA$_1$) and (xNbA$_0$, yNbA$_0$) have the same motion vectors and the same reference indices.

availableB$_1$ is equal to TRUE, the luma locations (xNbB$_1$, yNbB$_1$) and (xNbA$_0$, yNbA$_0$) have the same motion vectors and the same reference indices and merge_triangle_flag[xCb][yCb] is equal to 1.

availableB$_0$ is equal to TRUE, the luma locations (xNbB$_0$, yNbB$_0$) and (xNbA$_0$, yNbA$_0$) have the same motion vectors and the same reference indices and merge_triangle_flag[xCb][yCb] is equal to 1.

Otherwise, availableFlagA$_0$ is set equal to 1 and the following assignments are made:

| | |
|---|---|
| mvLXA$_0$ = MvLX[ xNbA$_0$ ][ yNbA$_0$ ] | (8-306) |
| refIdxLXA$_0$ = RefIdxLX[ xNbA$_0$ ][ yNbA$_0$ ] | (8-307) |
| predFlagLXA$_0$ = PredFlagLX[ xNbA$_0$ ][ yNbA$_0$ ] | (8-308) |
| gbiIdxA$_0$ = GbiIdx[ xNbA$_0$ ][ yNbA$_0$ ] | (8-309) |

For the derivation of availableFlagB$_2$, refIdxLXB$_2$, predFlagLXB$_2$ and mvLXB$_2$ the following applies:

The luma location (xNbB$_2$, yNbB$_2$) inside the neighbouring luma coding block is set equal to (xCb−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_2$, yNbB$_2$) as inputs, and the output is assigned to the block availability flag availableB$_2$.

The variables availableFlagB$_2$, refIdxLXB$_2$, predFlagLXB$_2$ and mvLXB$_2$ are derived as follows:

If one or more of the following conditions are true, availableFlagB$_2$ is set equal to 0, both components of mvLXB$_2$ are set equal to 0, refIdxLXB$_2$ is set equal to −1 and predFlagLXB$_2$ is set equal to 0, with X being 0 or 1, and gbiIdxB$_2$ is set equal to 0:

availableB$_2$ is equal to FALSE.

availableA$_1$ is equal to TRUE and the luma locations (xNbA$_1$, yNbA$_1$) and (xNbB$_2$, yNbB$_2$) have the same motion vectors and the same reference indices.

availableB$_1$ is equal to TRUE and the luma locations (xNbB$_1$, yNbB$_1$) and (xNbB$_2$, yNbB$_2$) have the same motion vectors and the same reference indices.

availableB$_0$ is equal to TRUE, the luma locations (xNbB$_0$, yNbB$_0$) and (xNbB$_2$, yNbB$_2$) have the same motion vectors and the same reference indices and merge_triangle_flag[xCb][yCb] is equal to 1.

availableA$_0$ is equal to TRUE, the luma locations (xNbA$_0$, yNbA$_0$) and (xNbB$_2$, yNbB$_2$) have the same motion vectors and the same reference indices and merge_triangle_flag[xCb][yCb] is equal to 1.

$availableFlagA_0+availableFlagA_1+availableFlagB_0+availableFlagB_1$ is equal to 4 and merge_triangle_flag[xCb][yCb] is equal to 0.

Otherwise, $availableFlagB_2$ is set equal to 1 and the following assignments are made:

| | |
|---|---|
| $mvLXB_2 = MvLX[\ xNbB_2\ ][\ yNbB_2\ ]$ | (8-310) |
| $refIdxLXB_2 = RefIdxLX[\ xNbB_2\ ][\ yNbB_2\ ]$ | (8-311) |
| $predFlagLXB_2 = PredFlagLX[\ xNbB_2\ ][\ yNbB_2\ ]$ | (8-312) |
| $gbiIdxB_2 = GbiIdx[\ xNbB_2\ ][\ yNbB_2\ ]$ | (8-313) |

2.2.5 MMVD

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 4

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 5

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 6

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.2.6 Combined Intra-Inter Prediction (CIIP)

In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighboring blocks (A1 and B1).

2.2.7 MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:

a. ATMVP candidate (maybe available or unavailable);
b. Affine merge lists (including Inherited Affine candidates; and Constructed Affine candidates)
c. Padding as zero MV 4-parameter affine model 2.2.7.1.1 ATMVP (aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

In current design, ATMVP predicts the motion vectors of the sub-CUs within a CU in two steps which are described in the following two sub-sections 2.2.7.1.1.1 and 2.2.7.1.1.2, respectively.

2.2.7.1.1.1 Derivation of Initialized Motion Vector

Denote the initialized motion vector by tempMv. When block A1 is available and non-intra coded (i.e., coded with inter or IBC mode), the following is applied to derive the initialized motion vector.

If all of the following conditions are true, tempMv is set equal to the motion vector of block A1 from list 1, denoted by $mvL1A_1$:

Reference picture index of list 1 is available (not equal to −1), and it has the same POC value as the collocated picture (i.e., DiffPicOrderCnt(ColPic, RefPicList[1][$refIdxL1A_1$]) is equal to 0), All reference pictures are with no larger POC compared to the current picture (i.e., DiffPicOrderCnt(aPic, currPic) is less than or equal to 0 for every picture aPic in every reference picture list of the current slice), Current slice is equal to B slice, collocated_from_10_flag is equal to 0.

Otherwise if all of the following conditions are true, tempMv is set equal to the motion vector of block A1 from list 0, denoted by mvL0A1:

Reference picture index of list 0 is available (not equal to −1), it has the same POC value as the collocated picture (i.e., DiffPicOrderCnt(ColPic, RefPicList[0][refIdxL0A1]) is equal to 0).

Otherwise, zero motion vector is used as the initialized MV.

A corresponding block (with center position of current block plus the rounded MV, clipped to be in certain ranges in necessary) is identified in the collocated picture signaled at the slice header with the initialized motion vector.

If the block is inter-coded, then go to the $2^{nd}$ step. Otherwise, the ATMVP candidate is set to be NOT available.

2.2.7.1.1.2 Sub-CU Motion Derivation

The second step is to split the current CU into sub-CUs and obtain the motion information of each sub-CU from the block corresponding to each sub-CU in the collocated picture.

If the corresponding block for a sub-CU is coded with inter mode, the motion information is utilized to derive the final motion information of current sub-CU by invoking the derivation process for collocated MVs which is not different with the process for conventional TMVP process. Basically, if the corresponding block is predicted from the target list X for uni-prediction or bi-prediction, the motion vector is utilized; otherwise, if it is predicted from list Y (Y=1−X) for uni or bi-prediction and NoBackwardPredFlag is equal to 1, MV for list Y is utilized. Otherwise, no motion candidate could be found.

If the block in the collocated picture identified by the initialized MV and location of current sub-CU is intra or IBC coded, or no motion candidate could be found as described aforementioned, the following further apply:

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

The related decoding process for collocated motion vectors derivation process in JVET-N1001 is described as follows, with the parts related to ATMVP highlighted in bolded, underlined text:

8.5.2.12 Derivation Process for Collocated Motion Vectors

Inputs to this process are:

a variable currCb specifying the current coding block, a variable colCb specifying the collocated coding block inside the collocated picture specified by ColPic, a luma location (xColCb, yColCb) specifying the top-left sample of the collocated luma coding block specified by colCb relative to the top-left luma sample of the collocated picture specified by ColPic, a reference index refIdxLX, with X being 0 or 1, a flag indicating a subblock temporal merging candidate sbFlag.

Outputs of this process are:

the motion vector prediction mvLXCol in 1/16 fractional-sample accuracy, the availability flag availableFlagLXCol.

The variable currPic specifies the current picture.

The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvDmvrL1[x][y] and RefIdxL1[x][y], respectively, of the collocated picture specified by ColPic.

The variables mvLXCol and availableFlagLXCol are derived as follows:

If colCb is coded in an intra or IBC prediction mode, both components of mvLXCol are set equal to 0 and availableFlagLXCol is set equal to 0.

Otherwise, the motion vector mvCol, the reference index refIdxCol and the reference list identifier listCol are derived as follows:

If sbFlag is equal to 0, availableFlagLXCol is set to 1 and the following applies:

If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.

Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.

Otherwise (predFlagL0Col[xColCb][yColCb] is equal to 1 and predFlagL1Col[xColCb][yColCb] is equal to 1), the following assignments are made:

If NoBackwardPredFlag is equal to 1, mvCol, refIdxCol and listCol are set equal to mvLXCol[xColCb][yColCb], refIdxLXCol[xColCb][yColCb] and LX, respectively.

Otherwise, mvCol, refIdxCol and listCol are set equal to mvLNCol[xColCb][yColCb], refIdxLNCol[xColCb][yColCb] and LN, respectively, with N being the value of collocated_from_10_flag.

Otherwise (sbFlag is equal to 1), the following applies:

If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.

Otherwise (PredFlagLXCol[xColCb][yColCb] is equal to 0), the following applies:

If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set to 1.

Both the components of mvLXCol are set to 0 and availableFlagLXCol is set equal to 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:

| | |
|---|---|
| colPocDiff = DiffPicOrderCnt( ColPic, refPicList[ listCol ] [ refIdxCol ] ) | (8-402) |
| currPocDiff = DiffPicOrderCnt( currPic, RefPicList[ X ] [ refIdxLX ] ) | (8-403) |

The temporal motion buffer compression process for collocated motion vectors as specified in clause 8.5.2.15 is invoked with mvCol as input, and the modified mvCol as output.

If RefPicList[X][refIdxLX] is a long-term reference picture, or colPocDiff is equal to currPocDiff, mvLXCol is derived as follows:

mvLXCol=mvCol (8-404)

Otherwise, mvLXCol is derived as a scaled version of the motion vector mvCol as follows:

| | |
|---|---|
| tx = ( 16384 + (Abs( td ) >> 1 ) ) / td | (8-405) |
| distScaleFactor = Clip3( −4096, 4095, (tb * tx + 32 ) >> 6 ) | (8-406) |
| mvLXCol = Clip3( −131072, 131071, (distScaleFactor * mvCol + 128 − ( distScaleFactor * mvCol >= 0 )) >> 8 ) ) | (8-407) |

where td and tb are derived as follows:

| | |
|---|---|
| td = Clip3( −128, 127, colPocDiff ) | (8-408) |
| tb = Clip3( −128, 127, currPocDiff ) | (8-409) |

2.2.8 Regular Inter Mode (AMVP)

2.2.8.1 AMVP Motion Candidate List

Similar to the AMVP design in HEVC, up to 2 AMVP candidates may be derived. However, the HMVP candidates may also be added after the TMVP candidate. The HMVP candidates in the HMVP table are traversed in an ascending order of index (i.e., from index equal to 0, the oldest one). Up to 4 HMVP candidates may be checked to find whether its reference picture is the same as the target reference picture (i.e., same POC value).

2.2.8.2 AMVR

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.2.8.3 Symmetric Motion Vector Difference in JVET-N1001-v2

In JVET-N1001-v2, symmetric motion vector difference (SMVD) is applied for motion information coding in bi-prediction.

Firstly, in slice level, variables RefIdxSymL0 and RefIdxSymL1 to indicate the reference picture index of list 0/1 used in SMVD mode, respectively, are derived with the following steps as specified in N1001-v2. When at least one of the two variables are equal to −1, SMVD mode shall be disabled.

2.2.9 Refinement of Motion Information 2.2.9.1 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 19:
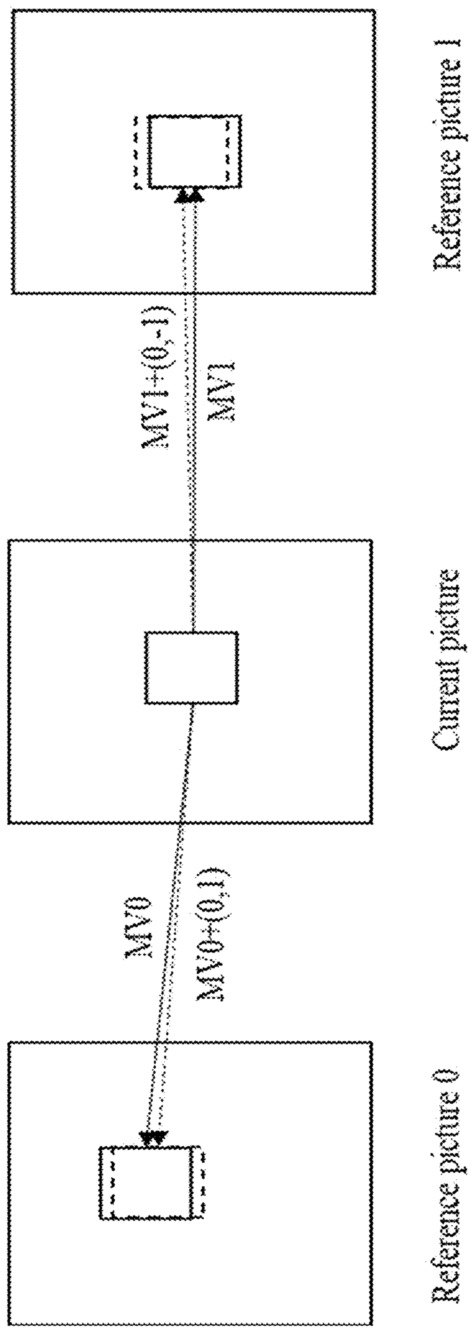
FIG. 19 shows an example of MVD (0, 1) mirrored between list 0 and list 1 in DMVR.

For DMVR in VVC, MVD mirroring between list 0 and list 1 is assumed as shown in FIG. 19 and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

Figure 20:
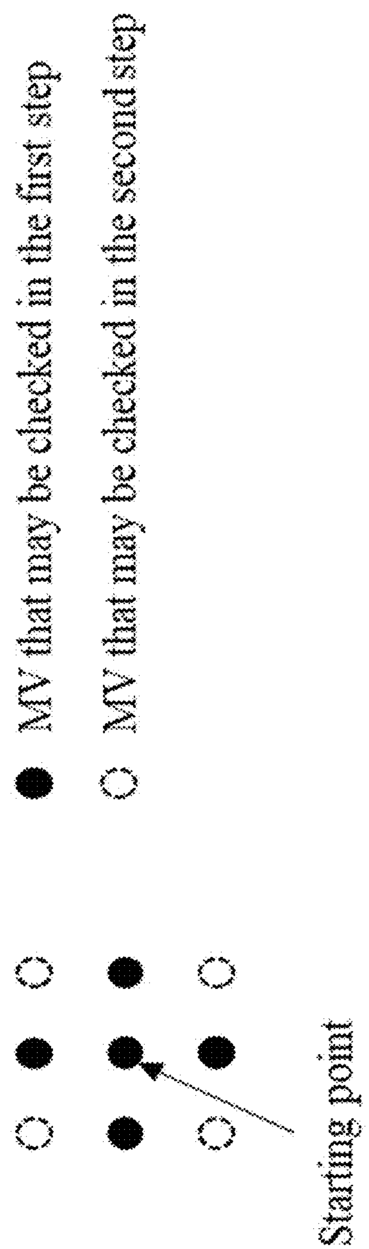
FIG. 20 shows MVs that may be checked in one iteration.

The motion vector refinement process may iterate twice. In each iteration, at most 6 MVDs (with integer-pel precision) may be checked in two steps, as shown in FIG. 20. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

```
MvdX= -1;
MvdY = -1;
If(Sad(1, 0) < Sad(-1, 0))
   MvdX= 1;
If(Sad(0, 1) < Sad(0, -1))
   MvdY= 1;
```

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

To further simplify the process of DMVR, JVET-M0147 proposed several changes to the design in JEM. More specifically, the adopted DMVR design to VTM-4.0 (to be released soon) has the following main features:

Early termination when (0,0) position SAD between list0 and list1 is smaller than a threshold.

Early termination when SAD between list0 and list1 is zero for some position.

Block sizes for DMVR: W*H>=64 && H>=8, wherein W and H are the width and height of the block.

Split the CU into multiple of 16×16 sub-blocks for DMVR of CU size>16*16. If only width or height of the CU is larger than 16, it is only split in vertical or horizontal direction.

Reference block size (W+7)*(H+7) (for luma).

25 points SAD-based integer-pel search (i.e. (+−) 2 refinement search range, single stage)

Bilinear-interpolation based DMVR.

"Parametric error surface equation" based sub-pel refinement. This procedure is performed only when the minimum SAD cost is not equal to zero and the best MVD is (0, 0) in the last MV refinement iteration.

Luma/chroma MC w/reference block padding (if needed).

Refined MVs used for MC and TMVPs only.

2.2.9.1.1 Usage of DMVR

When the following conditions are all true, DMVR may be enabled:

DMVR enabling flag in the SPS (i.e., sps_dmvr_enabled_flag) is equal to 1

TPM flag, inter-affine flag and subblock merge flag (either ATMVP or affine merge), MMVD flag are all equal to 0

Merge flag is equal to 1

Current block is bi-predicted, and POC distance between current picture and reference picture in list 1 is equal to the POC distance between reference picture in list 0 and current picture The current CU height is greater than or equal to 8

Number of luma samples (CU width*height) is greater than or equal to 64

2.2.9.1.2 "Parametric Error Surface Equation" Based Sub-Pel Refinement

The method is summarized below:

1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0, y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2((E(0,-1)+E(0,1)-2E(0,0)))$$

$(x_0, y_0)$ can be computed to any required sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast-shifted subtraction-based implementation of the 2 divisions required per CU.

3. The computed $(x_0, y_0)$ are added to the integer distance refinement MV to get the sub-pixel accurate refinement delta MV.

2.3 Intra Block Copy

Figure 21:
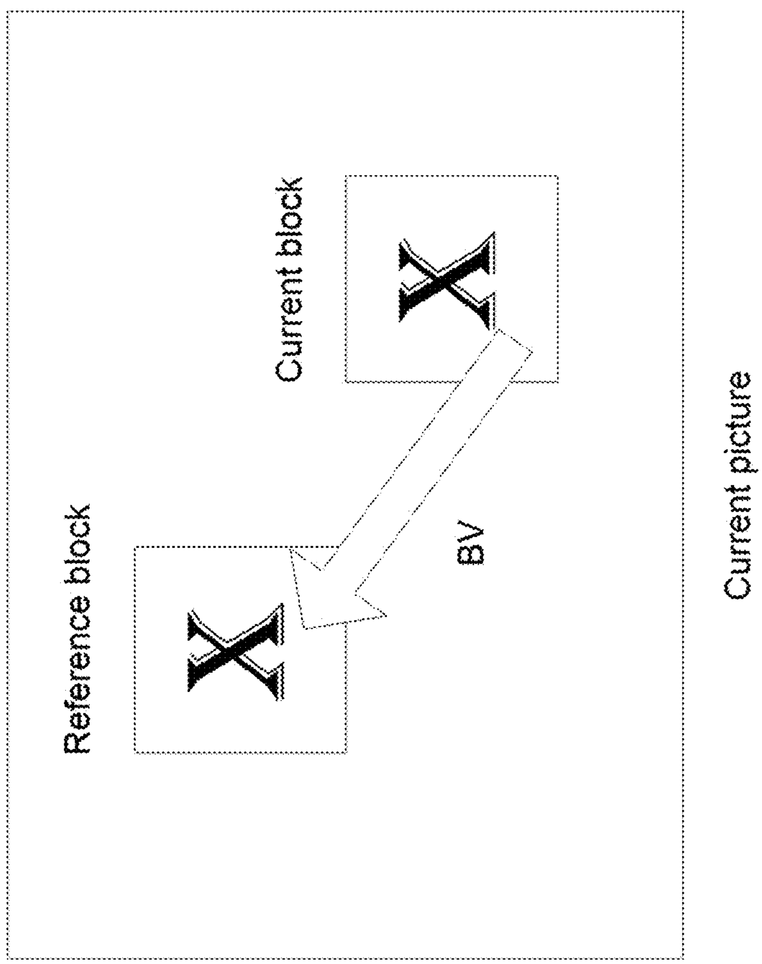
FIG. 21 is an example of intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 21. the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3.1 IBC in VVC Test Model (VTM4.0)

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates

Step 2: Insertion of HMVP candidates

Step 3: Insertion of pairwise average candidates

In the derivation of spatial merge candidates, a maximum of four merge candidates are selected among candidates located in the positions depicted in $A_1$, $B_1$, $B_0$, $A_0$ and $B_2$ as depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.1.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates

Check $A_0$, $A_1$ until an available candidate is found.

Check $B_0$, $B_1$, $B_2$ until an available candidate is found.

Step 2: Insertion of HMVP candidates

Step 3: Insertion of zero candidates

After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.1.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma my derivation then the block copy process.

1) The chroma block will be first partitioned into (N>>1)*(M>>1) sub blocks.
2) Each sub block with a top left sample coordinated at (x, y) fetches the corresponding luma block covering the same top-left sample which is coordinated at (2x, 2y).
3) The encoder checks the block vector(bv) of the fetched luma block. If one of the following conditions is satisfied, the by is considered as invalid.
   a. A by of the corresponding luma block is not existing.
   b. The prediction block identified by a by is not reconstructed yet.
   c. The prediction block identified by a by is partially or fully overlapped with the current block.
4) The chroma motion vector of a sub block is set to the motion vector of the corresponding luma sub block.

The IBC mode is allowed at the encoder when all sub blocks find a valid bv.

2.3.2 Single BV List for IBC (in VTM5.0)

JVET-N0843 is adopted to the VVC. In the JVET-N0843, the BV predictors for merge mode and AMVP mode in IBC will share a common predictor list, which consist of the following elements:

2 spatial neighboring positions (A1, B1 as in FIG. 2)

5 HMVP entries

Zero vectors by default

The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, JVET-N0843 also proposed to simplify the pruning operations between HMVP candidates and the existing merge candidates (A1, B1). In the simplification there will be up to 2 pruning operations since it only compares the first HMVP candidate with spatial merge candidate(s).

3. Problems

The current design of merge modes may have the following problems:

1. The regular merge list construction process depends on the usage of TPM for the current block.
   a. For TPM-coded blocks, full pruning is applied among spatial merge candidates.
   b. For non-TPM-coded blocks, partial pruning is applied among spatial merge candidates.
2. According to current design, all merge related tools (including IBC merge, regular merge, MMVD, sub-block merge, CIIP, TPM) are signalled by one flag, named general_merge_flag. However, it is possible that when this flag is true, all merge related tools are signaled or to be derived to be disabled. How to handle this case is unknown. In addition, it is disallowed to turn off the merge mode, that is the maximum number of merge candidate shall be unequal to 0. However, for high throughput encoder/decoder, it may need to force disabling the merge mode.
3. The decision of initialized MV for ATMVP process is dependent on slice type, all reference pictures' POC values, collocated_from_10_flag, etc. al, which delays the throughput of MVs.
4. Derivation process of collocated MVs is dependent on the usage of sub-block technology, such as the conventional TMVP process or ATMVP process which requires additional logic.
5. For a sub-CU in ATMVP coded block, even its corresponding collocated block is inter coded, it is possible the sub-CU's motion information couldn't be derived from the corresponding collocated block, but filled with other motion information. Such design is sub-optimal for both coding efficiency and throughput.

6. The HEVC specification defines the availability of one neighbouring block in current or reference picture based on whether the block is constructed or in a different CTU row/slice etc. al. However, in VVC, multiple coding methods have been introduced. Different definitions of a block's availability may need to be defined.
7. JVET-O0545 proposes to signal the indication of maximum transform block size by sending sps_sbt_max_size_64_flag.
   sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.
   MaxSbtSize=sps_sbt_max_size_64_flag?64:32 (7 31)
   To support maximum transform size (indicated by MaxTransformSize) smaller than 64, the derivation of MaxSbtSize is modified as below,
   MaxSbtSize=min(MaxTransformSize, sps_sbt_max_size_64_flag?64:32)
8. ALF coefficients are restricted to be within a fixed range. For example: chroma ALF filter coefficients, denoted by AlfCoeffc, and luma ALF filter coefficients, denoted by $AlfCoeff_L$, shall be in the range of $-2^7$ to $2^7-1$, inclusive. Such restriction is based on the assumption of 8-bit depth.
9. Indication of predictors of ALF filters is signalled as follows:

| | |
|---|---|
| if( slice_alf_enabled_flag ){ | |
| **alf_ctb_flag**[ 0 ][ xCtb >> Log2CtbSize ][ yCtb >> Log2CtbSize ] | ae(v) |
| if( alf_ctb_flag[ 0 ][ xCtb >> Log2CtbSize ][ yCtb >> Log2CtbSize ] ) { | |
| if( slice_num_alf_aps_ids_luma > 0) | |
| **alf_ctb_use_first_aps_flag** | ae(v) |
| if( !alf_ctb_use_first_aps_flag ) { | |
| if( slice_num_alf_aps_ids_luma > 1 ) | |
| **alf_use_aps_flag** | ae(v) |
| if( alf_use_aps_flag ) | |
| if( slice_num_alf_aps_ids_luma > 2 ) | |
| **alf_luma_prev_filter_idx_minus1** | ae(v) |
| else | |
| **alf_luma_fixed_filter_idx** | ae(v) |
| } | |
| } | |

It can be seen that such a method needs to parse multiple syntax elements to determine to use filters from which APS sets or from fixed filters.

10. Merge related coding tools are as follows:

| | Descriptor |
|---|---|
| merge_data( x0, y0, cbWidth, cbHeight ) { | |
| if ( CuPredMode[ x0 ][ y0 ] = = MODE_IBC ) { | |
| if( MaxNumMergeCand > 1 ) | |
| **merge_idx**[ x0 ][ y0 ] | ae(v) |
| } else { | |
| if( MaxNumSubblockMergeCand> 0 && cbWidth >= 8 && cbHeight >= 8 ) | |
| **merge_subblock_flag**[ x0 ][ y0 ] | ae(v) |
| if( merge_subblock_flag[ x0 ][ y0 ] = = 1 ) { | |
| if( MaxNumSubblockMergeCand > 1 ) | |
| **merge_subblock_idx**[ x0 ][ y0 ] | ae(v) |
| } else { | |
| if( ( cbWidth * cbHeight ) >= 64 && ((sps_ciip_enabled_flag && cu_skip_flag[ x0 ][ y0 ] = = 0 && cbWidth < 128 && cbHeight < 128) \|\| (sps_triangle_enabled_flag && slice_type = = B) ) { | |
| **regular_merge_flag**[ x0 ][ y0 ] | ae(v) |
| } | |
| if( regular_merge_flag[ x0 ][ y0 ] ) { | |
| if( sps_mmvd_enabled_flag ) | |
| { | |
| **mmvd_merge_flag**[ x0 ] [ y0 ] | ae(v) |
| if(mmvd_merge_flag[ x0 ][ y0 ] = = 1 ) { | |
| if( MaxNumMergeCand > 1 ) | |
| **mmvd_cand_flag**[ x0 ][ y0 ] | ae(v) |
| **mmvd_distance_idx**[ x0 ][y0 ] | ae(v) |
| **mmvd_direction_idx**[ x0 ][ y0 ] | ae(v) |
| } else { | |
| if( MaxNumMergeCand > 1 ) | |
| **merge_idx**[ x0 ][ y0 ] | ae(v) |
| } | |
| } | |

-continued

| | Descriptor |
|---|---|
| } else { | |
| if(sps_ciip_enabled_flag && cu_skip_flag[ x0 ][ y0 ] = = 0 && cbWidth < 128 && cbHeight < 128 && sps_triangle_enabled_flag && slice_type = = B) { | |
| **ciip_flag**[ x0 ][ y0 ] | ae(v) |
| if( ciip_flag[ x0 ][ y0 ] && MaxNumMergeCand > 1 ) | |
| **merge_idx**[ x0 ][ y0 ] | ae(v) |
| } | |
| if( ! ciip_flag[ x0 ][ y0 ] ) { | |
| **merge_triangle_split_dir**[ x0 ][ y0 ] | ae(v) |
| **merge_triangle_idx0**[ x0 ][ y0 ] | ae(v) |
| **merge_triangle_idx1**[ x0 ][ y0 ] | ae(v) |
| } | |
| } | |
| } | |
| } | |
| } | |

It is noted that the sub-block merge related syntax elements are firstly signalled; followed by the indication of regular merge mode (which controls both MMVP and conventional merge like in HEVC). When such indication is false, additional bits may be further signalled to indicate whether it is CIIP or TPM mode.

However, such information doesn't take into consideration of the case that number of allowed TPM candidates is less than 2.

Figure 24:
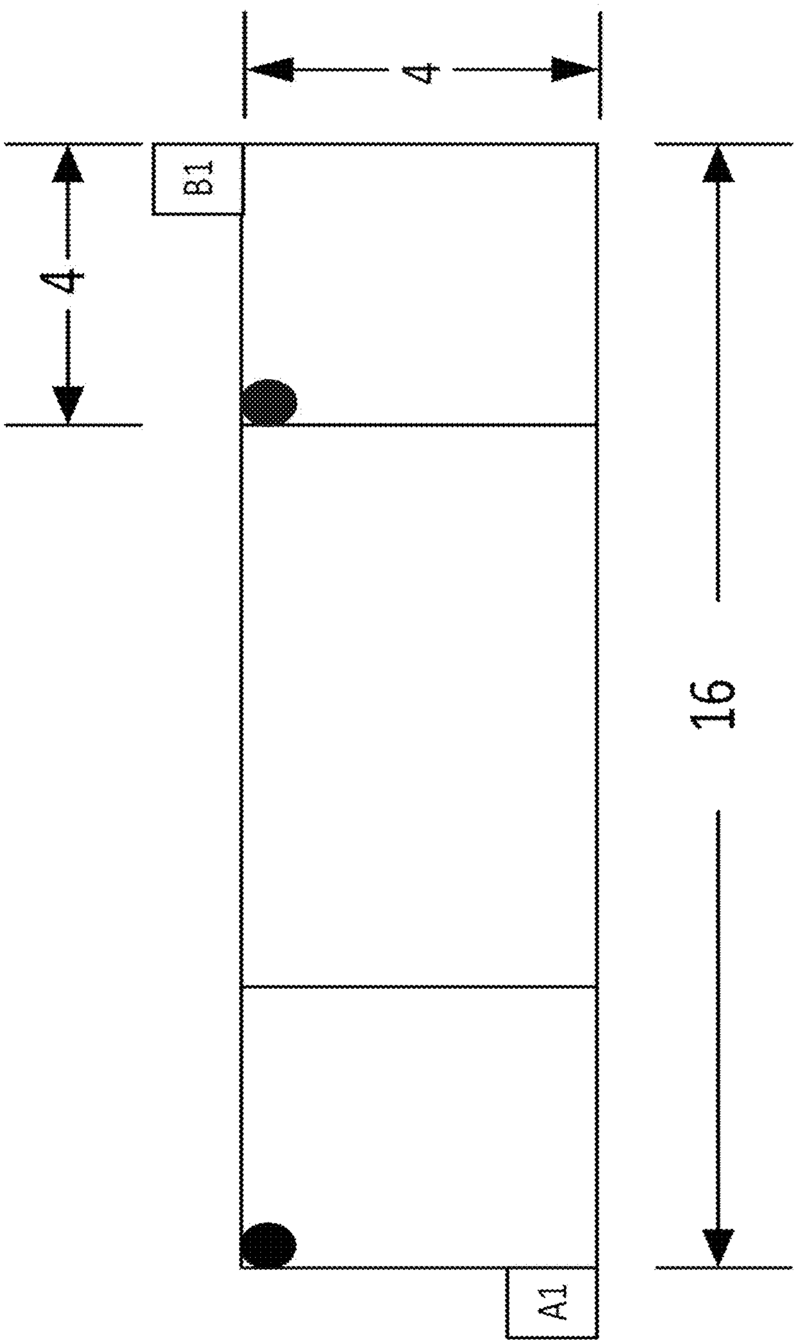
FIG. 24 shows an example of a share merge region (SMR, with 16×4 size) and 3 CUs under the SMR.

11. In the latest VVC specification, the availability check of a 2nd block relative to a first block is further dependent on the block coded mode in addition to other conditions, such as in same slice. However, it may result in issues when handling shared merge list. Taking 16×4 block as an example, when it is further split using vertical TT, three CUs will be generated as 4×4, 8×4 and 4×4. When deriving the spatial merge candidate for the last 4×4, the two spatial candidates are derived from the A1 and B1 of the shared merge region (SMR) as shown in FIG. 24. Therefore, for IBC coded blocks, whether A1/B1 (neighboring to the shared 16×4 region) are coded with IBC mode shall be checked. That's the intention of share merge list.

However, when sub-clause 8.6.2.2 invokes the process of derivation of spatial merge candidate, the top-left sample's coordinate has been changed from the current one (covering the green circle) to the one covering the black circle (i.e., top-left position of the shared merge region), and block width/height are also modified to be that for the shared merge region.

Then, in sub-clause 8.6.2.3 on Derivation process for IBC spatial block vector candidates, it has to check whether A1/B1 is available by invoking 6.4.4 with checkPredModeY set equal to TRUE. Here, it may cause problem since it needs to check whether the prediction mode of the CU covering the top-left sample of the shared region (i.e., the left 4×4 CU instead of current 4×4 CU) is equal to that of A1/B1.

For example:

if the left 4×4 CU is not IBC, and A1/B1 are IBC, then A1/B1 is marked as unavailable which seems to be not the intention.

If the left 4×4 CU is not IBC, and A1/B1 are not IBC either, then A1/B1 is marked as available. In this case, wrong motion will be used as BV candidate.

Therefore, it will be problematic if purely adding mode checking to the availability check process.

12. In weight derivation process of CIIP, if a neighbouring block's prediction mode is IBC/Intra/Palette, they are always treated as unavailable, and the weight of the inter/intra prediction signal is assigned with the same value for all three cases.

4. Examples of Techniques and Embodiments

The detailed listing below should be considered as examples to explain general concepts. These embodiments should not be interpreted in a narrow way. Furthermore, these techniques can be combined in any manner.

The neighbouring blocks denoted as A0, A1, B0, B1, B2 etc. are shown in FIG. 2.

1. The regular merge list construction process for conventional merge and TPM coded blocks is decoupled from the coding method of the current block.
   a. In one example, partial pruning is applied to spatial merge candidates when TPM is applied to one block.
      i. In one example, whether two candidates are compared with each other are determined in the same way as that used for a non-TPM merge coded blocks.
      ii. In one example, B1 is compared to A1, B0 is compared to B1, A0 is compared to A1, B2 is compared to B1 and A1.
      iii. Alternatively, full pruning is applied to spatial merge candidates even TPM is not used for one block.
      iv. Alternatively, furthermore, full pruning may be applied to some specific block dimensions.
         1. For example, full pruning may be applied to block dimensions wherein TPM is allowed.
         2. For example, when a block size contains less than M*H samples, e.g., 16 or 32 or 64 luma samples, full pruning is not allowed.
         3. For example, when a block's width>th1 or >=th1 and/or a block's height>th2 or >=th2, full pruning is not allowed.
   b. In one example, whether to check B2 is based on the number of available merge candidates before checking B2 when TPM is applied to one block.
      i. Alternatively, B2 is always checked regardless the number of available merge candidates for non-TPM merge coded blocks.
2. The initialized MV used for identifying a block to determine whether ATMVP is available or not may just rely on the list X information of a spatial neighbouring block (e.g., A1), and X is set to where the collocated picture used for temporal motion vector prediction is derived from (e.g., collocated_from_10_flag).

a. Alternatively, X is decided according to whether all reference pictures in all reference lists are with smaller POC values or no greater POC values compared to the current picture.

i. In on example, if it is true, X is set to 1. Otherwise, X is set to 0.

b. Alternatively, if the reference picture associated with list X of a spatial neighbouring block (e.g., A1) is available and has the same POC value as the collocated picture, the initialized MV is set to the MV associated with list X of the spatial neighbouring block. Otherwise, a default MV (e.g., (0, 0)) is utilized.

c. Alternatively, motion information stored in HMVP table may be used as the initialized MV in ATMVP.

i. For example, the first available motion information stored in HMVP table may be used.

ii. For example, the first available motion information stored in HMVP table that is associated with certain reference picture (e.g., collocated picture) may be used.

d. Alternatively, X is a fixed number, such as 0 or 1.

3. The derivation process of collocated MVs used for sub-block based coding tools and non-sub-block based coding tools may be aligned, i.e., the process is independent from the usage of a certain coding tool.

a. In one example, the whole or partial of the derivation process of collocated MVs for sub-block based coding tools is aligned to that used for TMVP.

i. In one example, if it is uni-prediction from list Y, the motion vector of list Y is scaled to a target reference picture list X;

ii. In one example, if it is bi-prediction and the target reference picture list is X, the motion vector of list Y is scaled to the target reference picture list X, and Y may be determined according to the following rules:

If none of reference pictures has a greater POC values or all reference pictures have smaller POC values compared to current picture, Y is set equal to X.

Otherwise, Y is set equal to collocated_from_10_flag.

b. In one example, the whole or partial of the derivation process of collocated MVs for TMVP is aligned to that used for sub-block-based coding tools.

4. The motion candidate list construction process (e.g., regular merge list, IBC merge/AMVP list) may depend on the block dimensions and/or merge sharing conditions. Denote a block's width and height as W and H, respectively. Condition C may depend on W and H and/or merge sharing conditions.

a. In one example, derivation of spatial merge candidates is skipped if condition C is satisfied.

b. In one example, derivation of HMVP candidates is skipped if condition C is satisfied.

c. In one example, derivation of pairwise merge candidates is skipped if condition C is satisfied.

d. In one example, number of maximum pruning operations is reduced or set to 0 if condition C is satisfied.

e. In one example, condition C is satisfied when W*H is smaller or no larger than a threshold (e.g., 64 or 32).

f. In one example, condition C is satisfied when W and/or H is smaller or no larger than a threshold (e.g., 4 or 8).

g. In one example, condition C is satisfied when the current block is under a shared node.

5. The maximum number of allowed regular merge candidates/maximum number of allowed IBC candidates/maximum number of allowed sub-block merge candidates may be set to 0. Therefore, certain tools may be disabled, and related syntax elements are not needed to be signalled.

a. In one example, when the maximum number of allowed regular merge candidates is equal to 0, a coding tool which relies on regular merge list may be disabled. The coding tool may be regular merge, MMVD, CIIP, TPM, DMVR etc. al.

b. In one example, when the maximum number of allowed IBC candidates is equal to 0, IBC AMVP and/or IBC merge may be disabled.

c. In one example, when the maximum number of allowed sub-block based merge candidates is equal to 0, sub-block based technologies, e.g., ATMVP, affine merge mode may be disabled.

d. When a tool is disabled according to the maximum number of allowed candidates, signaling of related syntax elements is skipped.

i. Alternatively, furthermore, the signalling of merge related tools may need to check whether the maximum number of allowed candidates is unequal to 0.

ii. Alternatively, furthermore, invoking of a process for the merge related tools may need to check whether the maximum number of allowed candidates is unequal to 0.

6. The signalling of general_merge_flag and/or cu_skip_flag may depend on the maximum number of allowed regular merge candidates/maximum number of allowed IBC candidates/maximum number of allowed sub-block merge candidates/usage of merge related coding tools.

a. In one example, merge related coding tools may include IBC merge, regular merge, MMVD, sub-block merge, CIIP, TPM, DMVR and etc.

b. In one example, when the maximum number of allowed regular merge candidates, the maximum number of allowed IBC merge/AMVP candidates, the maximum number of allowed sub-block merge candidate are equal to 0, the general_merge_flag and/or cu_skip_flag is not signaled.

i. Alternatively, furthermore, general_merge_flag and/or cu_skip_flag is inferred to be 0.

7. A conformance bitstream shall satisfy that at least one of the merge related tools including IBC merge, regular merge, MMVD, sub-block merge, CIIP, TPM, DMVR and etc. is enabled when the general_merge_flag or cu_skip_flag of the current block is true.

8. A conformance bitstream shall satisfy that at least one of the merge related tools including regular merge, MMVD, sub-block merge, CIIP, TPM, DMVR and etc. is enabled when the (general_merge_flag or cu_skip_flag) of the current block is true and IBC is disabled for one slice/tile/brick/picture/current block.

9. A conformance bitstream shall satisfy that at least one of the merge related tools including IBC merge, regular merge, sub-block merge, CIIP, TPM is enabled when the (general_merge_flag or cu_skip_flag) of the current block is true and MMVD is disabled for one slice/tile/brick/picture/current block.

10. A conformance bitstream shall satisfy that at least one of the merge related tools including IBC merge, regular merge, MMVD, sub-block merge, TPM is enabled when the (general_merge_flag or cu_skip_flag) of the current block is true and CIIP is disabled for one slice/tile/brick/picture/current block.
11. A conformance bitstream shall satisfy that at least one of the merge related tools including IBC merge, regular merge, MMVD, sub-block merge, CIIP is enabled when the (general_merge_flag or cu_skip_flag) of the current block is true and TPM is disabled for one slice/tile/brick/picture/current block.
12. A conformance bitstream shall satisfy that at least one of the enabled merge related tools including IBC merge, regular merge, MMVD, sub-block merge, CIIP, TPM is applied when the general_merge_flag or cu_skip_flag of the current block is true.

Regarding Availability Check

13. When coding a first block, the check of availability of a $2^{nd}$ block may depend on the coded mode information of the first block, for example, if different modes are used in the $1^{st}$ and $2^{nd}$ block, the $2^{nd}$ block may be treated as unavailable even regardless of other condition checking results (e.g., has been constructed).
    a. In one example, when $1^{st}$ block is inter coded and $2^{nd}$ block is IBC code, $2^{nd}$ block is marked as unavailable.
    b. In one example, when $1^{st}$ block is IBC coded and $2^{nd}$ block is inter code, $2^{nd}$ block is marked as unavailable.
    c. When the $2^{nd}$ is marked as unavailable, the related coded information (e.g., motion information) is disallowed to be utilized for coding the $1^{st}$ block.
    d. In one example, the mode information of current block may be added as an input parameter to the availability check process.
14. It is proposed to introduce two positions (e.g., coordinates) in the availability check process of a $2^{nd}$ block regarding the current $1^{st}$ block.
    a. In one example, a first position is corresponding to the top-left position relative to the current coding block (e.g., CU).
        i. In one example, the first position is utilized to identify a coding block and the coding block's prediction mode is compared to that associated with a $2^{nd}$ block.
    b. In one example, a second position is corresponding to the top-left position relative to the shared merge region.
        i. In one example, the second position is utilized to identify a coding block and the coding block's prediction mode is NOT compared to that associated with a $2^{nd}$ block.
        ii. In one example, the second position may be used to check whether the coding block covering the second position is in the same video unit as the first block (e.g., slice/tile/brick/subpicture).
15. It is proposed to introduce two positions (e.g., coordinates) in the IBC motion list construction process regarding the current $1^{st}$ block.
    a. In one example, a first position is corresponding to the top-left position relative to the shared merge region.
        i. In one example, the first position may be used to derive a $2^{nd}$ block (e.g., spatial neighboring blocks).
    b. In one example, a second position is corresponding to the top-left position relative to the current coding block (e.g., CU).
        i. In one example, the second position is utilized to identify a coding block and the coding block's prediction mode is compared to that associated with the $2^{nd}$ block during the availability check process.
16. The availability check of neighbouring blocks in the weight derivation of CIIP (combined intra-inter prediction) process may be decoupled from the checking of current block's mode being identical to a neighbouring block's mode.
    a. In one example, even a neighbouring block is coded as Intra Mode, or IBC mode or Palette Mode, it may still be marked as available.
    b. Alternatively, furthermore, the weights of the inter/intra prediction signal may be assigned differently when the neighbouring block is available and coded with different modes.
17. The signalling of syntax elements unrelated to TPM side information may be also under the condition check of number of allowed TPM candidates.
    a. In one example, the signalling of CIIP related syntax elements (e.g., ciip_flag) may dependent on number of allowed TPM candidate is greater than a threshold K.
    b. In one example, the signalling of regular merge mode flag (e.g., regular_merge_flag) may dependent on number of allowed TPM candidate is greater than a threshold K.
    c. In one example, K is set to 1.
    d. Alternatively, furthermore, certain syntax elements may be not signalled when the number of allowed TPM candidate is no greater than a threshold K.
18. A conformance bitstream shall satisfy that the maximum transform block sizes shall not exceed the maximum CTU sizes.
    a. Alternatively, when the indication of maximum transform block size may be conditionally signalled under the maximum CTU sizes or vice versa.
        i. In one example, if the maximum CTU size is no greater than or equal to M×N (e.g., M=N=32), there is no need to signal the indication of maximum transform block size.
19. The ALF filter coefficients range may be dependent on the sample depth (e.g., internal bit-depth or input bit-depth) instead of being in a fixed range.
20. One flag may be directly signalled to indicate whether to use ALF filters in ALF APS to fixed filters.
    a. In addition, such a flag may be signalled under the condition that number of available ALF APS is greater than 0.
    b. Alternatively, furthermore, when ALF filters from APS is signalled, one additional syntax may be further signalled to indicate the index of ALF APS. Such an index may be coded with Fixed-length coding, unary coding, truncated unary coding, truncated binary coding, exp-golomb coding.

5. Embodiment

The suggested changes on top of the latest VVC working draft (JVET-N1001_v7) are given as follows. The deleted text is marked with bolded, capitalized text. The newly added parts are highlighted in bolded, underlined text.

5.1 Embodiment #1

This embodiment is to align the pruning process for non-TPM coded block to that for TPM coded blocks i.e., full pruning operations for non-TPM coded blocks.

8.5.2.3 Derivation Process for Spatial Merging Candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags $availableFlagA_0$, $availableFlagA_1$, $availableFlagB_0$, $availableFlagB_1$ and $availableFlagB_2$ of the neighbouring coding units, the reference indices $refIdxLXA_0$, $refIdxLXA_1$, $refIdxLXB_0$, $refIdxLXB_1$ and $refIdxLXB_2$ of the neighbouring coding units, the prediction list utilization flags $predFlagLXA_0$, $predFlagLXA_1$, $predFlagLXB_0$, $predFlagLXB_1$ and $predFlagLXB_2$ of the neighbouring coding units, the motion vectors in 1/16 fractional-sample accuracy $mvLXA_0$, $mvLXA_1$, $mvLXB_0$, $mvLXB_1$ and $mvLXB_2$ of the neighbouring coding units, the bi-prediction weight indices $gbiIdxA_0$, $gbiIdxA_1$, $gbiIdxB_0$, $gbiIdxB_1$, and $gbiIdxB_2$.

For the derivation of $availableFlagA_1$, $refIdxLXA_1$, $predFlagLXA_1$ and $mvLXA_1$ the following applies:

The luma location ($xNbA_1$, $yNbA_1$) inside the neighbouring luma coding block is set equal to (xCb−1, yCb+cbHeight−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbA_1$, $yNbA_1$) as inputs, and the output is assigned to the block availability flag $availableA_1$.

The variables $availableFlagA_1$, $refIdxLXA_1$, $predFlagLXA_1$ and $mvLXA_1$ are derived as follows:

If $availableA_1$ is equal to FALSE, $availableFlagA_1$ is set equal to 0, both components of $mvLXA_1$ are set equal to 0, $refIdxLXA_1$ is set equal to −1 and $predFlagLXA_1$ is set equal to 0, with X being 0 or 1, and $gbiIdxA_1$ is set equal to 0.

Otherwise, $availableFlagA_1$ is set equal to 1 and the following assignments are made:

| | |
|---|---|
| $mvLXA_1 = MvLX[ xNbA_1 ][ yNbA_1 ]$ | (8-294) |
| $refIdxLXA_1 = RefIdxLX[ xNbA_1 ][ yNbA_1 ]$ | (8-295) |
| $predFlagLXA_1 = PredFlagLX[ xNbA_1 ][ yNbA_1 ]$ | (8-296) |
| $gbiIdxA_1 = GbiIdx[ xNbA_1 ][ yNbA_1 ]$ | (8-297) |

For the derivation of $availableFlagB_1$, $refIdxLXB_1$, $predFlagLXB_1$ and $mvLXB_1$ the following applies:

The luma location ($xNbB_1$, $yNbB_1$) inside the neighbouring luma coding block is set equal to (xCb+cbWidth−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbB_1$, $yNbB_1$) as inputs, and the output is assigned to the block availability flag $availableB_1$.

The variables $availableFlagB_1$, $refIdxLXB_1$, $predFlagLXB_1$ and $mvLXB_1$ are derived as follows:

If one or more of the following conditions are true, $availableFlagB_1$ is set equal to 0, both components of $mvLXB_1$ are set equal to 0, $refIdxLXB_1$ is set equal to −1 and $predFlagLXB_1$ is set equal to 0, with X being 0 or 1, and $gbiIdxB_1$ is set equal to 0:

$availableB_1$ is equal to FALSE.

$availableA_1$ is equal to TRUE and the luma locations ($xNbA_1$, $yNbA_1$) and ($xNbB_1$, $yNbB_1$) have the same motion vectors and the same reference indices.

Otherwise, $availableFlagB_1$ is set equal to 1 and the following assignments are made:

| | |
|---|---|
| $mvLXB_1 = MvLX[ xNbB_1 ][ yNbB_1 ]$ | (8-298) |
| $refIdxLXB_1 = RefIdxLX[ xNbB_1 ][ yNbB_1 ]$ | (8-299) |
| $predFlagLXB_1 = PredFlagLX[ xNbB_1 ][ yNbB_1 ]$ | (8-300) |
| $gbiIdxB_1 = GbiIdx[ xNbB_1 ][ yNbB_1 ]$ | (8-301) |

For the derivation of $availableFlagB_0$, $refIdxLXB_0$, $predFlagLXB_0$ and $mvLXB_0$ the following applies:

The luma location ($xNbB_0$, $yNbB_0$) inside the neighbouring luma coding block is set equal to (xCb+cbWidth, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbB_0$, $yNbB_0$) as inputs, and the output is assigned to the block availability flag $availableB_0$.

The variables $availableFlagB_0$, $refIdxLXB_0$, $predFlagLXB_0$ and $mvLXB_0$ are derived as follows:

If one or more of the following conditions are true, $availableFlagB_0$ is set equal to 0, both components of $mvLXB_0$ are set equal to 0, $refIdxLXB_0$ is set equal to −1 and $predFlagLXB_0$ is set equal to 0, with X being 0 or 1, and $gbiIdxB_0$ is set equal to 0:

$availableB_0$ is equal to FALSE.

$availableB_1$ is equal to TRUE and the luma locations ($xNbB_1$, $yNbB_1$) and ($xNbB_0$, $yNbB_0$) have the same motion vectors and the same reference indices.

$availableA_1$ is equal to TRUE, the luma locations ($xNbA_1$, $yNbA_1$) and ($xNbB_0$, $yNbB_0$) have the same motion vectors and the same reference indices AND MERGE_TRIANGLE_FLAG[XCB][YCB] IS EQUAL TO 1.

Otherwise, $availableFlagB_0$ is set equal to 1 and the following assignments are made:

| | |
|---|---|
| $mvLXB_0 = MvLX[ xNbB_0 ][ yNbB_0 ]$ | (8-302) |
| $refIdxLXB_0 = RefIdxLX[ xNbB_0 ][ yNbB_0 ]$ | (8-303) |
| $predFlagLXB_0 = PredFlagLX[ xNbB_0 ][ yNbB_0 ]$ | (8-304) |
| $gbiIdxB_0 = GbiIdx[ xNbB_0 ] [ yNbB_0 ]$ | (8-305) |

For the derivation of $availableFlagA_0$, $refIdxLXA_0$, $predFlagLXA_0$ and $mvLXA_0$ the following applies:

The luma location ($xNbA_0$, $yNbA_0$) inside the neighbouring luma coding block is set equal to (xCb−1, yCb+cbWidth).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbA_0$, $yNbA_0$) as inputs, and the output is assigned to the block availability flag $availableA_0$.

The variables $availableFlagA_0$, $refIdxLXA_0$, $predFlagLXA_0$ and $mvLXA_0$ are derived as follows:

If one or more of the following conditions are true, $availableFlagA_0$ is set equal to 0, both components of $mvLXA_0$ are set equal to 0, $refIdxLXA_0$ is set equal to −1 and $predFlagLXA_0$ is set equal to 0, with X being 0 or 1, and $gbiIdxA_0$ is set equal to 0:

$availableA_0$ is equal to FALSE.

$availableA_1$ is equal to TRUE and the luma locations ($xNbA_1$, $yNbA_1$) and ($xNbA_0$, $yNbA_0$) have the same motion vectors and the same reference indices.

$availableB_1$ is equal to TRUE, the luma locations ($xNbB_1$, $yNbB_1$) and ($xNbA_0$, $yNbA_0$) have the same motion vectors and the same reference indices AND MERGE_TRIANGLE_FLAG[XCB][YCB] IS EQUAL TO 1.

$availableB_0$ is equal to TRUE, the luma locations ($xNbB_0$, $yNbB_0$) and ($xNbA_0$, $yNbA_0$) have the same motion vectors and the same reference indices AND MERGE_TRIANGLE_FLAG[XCB][YCB] IS EQUAL TO 1.

Otherwise, $availableFlagA_0$ is set equal to 1 and the following assignments are made:

| | |
|---|---|
| $mvLXA_0$ = MvLX[ $xNbA_0$ ][ $yNbA_0$ ] | (8-306) |
| $refIdxLXA_0$ = RefIdxLX[ $xNbA_0$ ][ $yNbA_0$ ] | (8-307) |
| $predFlagLXA_0$ = PredFlagLX[ $xNbA_0$ ][ $yNbA_0$ ] | (8-308) |
| $gbiIdxA_0$ = GbiIdx[ $xNbA_0$ ] [ $yNbA_0$ ] | (8-309) |

For the derivation of $availableFlagB_2$, $refIdxLXB_2$, $predFlagLXB_2$ and $mvLXB_2$ the following applies:

The luma location ($xNbB_2$, $yNbB_2$) inside the neighbouring luma coding block is set equal to (xCb−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbB_2$, $yNbB_2$) as inputs, and the output is assigned to the block availability flag $availableB_2$.

The variables $availableFlagB_2$, $refIdxLXB_2$, $predFlagLXB_2$ and $mvLXB_2$ are derived as follows:

If one or more of the following conditions are true, $availableFlagB_2$ is set equal to 0, both components of $mvLXB_2$ are set equal to 0, $refIdxLXB_2$ is set equal to −1 and $predFlagLXB_2$ is set equal to 0, with X being 0 or 1, and $gbiIdxB_2$ is set equal to 0:

$availableB_2$ is equal to FALSE.

$availableA_1$ is equal to TRUE and the luma locations ($xNbA_1$, $yNbA_1$) and ($xNbB_2$, $yNbB_2$) have the same motion vectors and the same reference indices.

$availableB_1$ is equal to TRUE and the luma locations ($xNbB_1$, $yNbB_1$) and ($xNbB_2$, $yNbB_2$) have the same motion vectors and the same reference indices.

$availableB_0$ is equal to TRUE, the luma locations ($xNbB_0$, $yNbB_0$) and ($xNbB_2$, $yNbB_2$) have the same motion vectors and the same reference indices AND MERGE_TRIANGLE_FLAG[XCB][YCB] IS EQUAL TO 1.

$availableA_0$ is equal to TRUE, the luma locations ($xNbA_0$, $yNbA_0$) and ($xNbB_2$, $yNbB_2$) have the same motion vectors and the same reference indices AND MERGE_TRIANGLE_FLAG[XCB][YCB] IS EQUAL TO 1.

$availableFlagA_0$+$availableFlagA_1$+$availableFlagB_0$+$availableFlagB_1$ is equal to 4 and merge_triangle_flag[xCb][yCb] is equal to 0.

Otherwise, $availableFlagB_2$ is set equal to 1 and the following assignments are made:

| | |
|---|---|
| $mvLXB_2$ = MvLX[ $xNbB_2$ ][ $yNbB_2$ ] | (8-310) |
| $refIdxLXB_2$ = RefIdxLX[ $xNbB_2$ ][ $yNbB_2$ ] | (8-311) |
| $predFlagLXB_2$ = PredFlagLX[ $xNbB_2$ ][ $yNbB_2$ ] | (8-312) |
| $gbiIdxB_2$ = GbiIdx[ $xNbB_2$ ][ $yNbB_2$ ] | (8-313) |

5.2 Embodiment #2

This embodiment is to align the pruning process for TPM coded block to that for non-TPM coded blocks, i.e., limited pruning operations for TPM coded blocks.

8.5.2.3 Derivation Process for Spatial Merging Candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags $availableFlagA_0$, $availableFlagA_1$, $availableFlagB_0$, $availableFlagB_1$ and $availableFlagB_2$ of the neighbouring coding units, the reference indices $refIdxLXA_0$, $refIdxLXA_1$, $refIdxLXB_0$, $refIdxLXB_1$ and $refIdxLXB_2$ of the neighbouring coding units, the prediction list utilization flags $predFlagLXA_0$, $predFlagLXA_1$, $predFlagLXB_0$, $predFlagLXB_1$ and $predFlagLXB_2$ of the neighbouring coding units, the motion vectors in 1/16 fractional-sample accuracy $mvLXA_0$, $mvLXA_1$, $mvLXB_0$, $mvLXB_1$ and $mvLXB_2$ of the neighbouring coding units, the bi-prediction weight indices $gbiIdxA_0$, $gbiIdxA_1$, $gbiIdxB_0$, $gbiIdxB_1$, and $gbiIdxB_2$.

For the derivation of $availableFlagA_1$, $refIdxLXA_1$, $predFlagLXA_1$ and $mvLXA_1$ the following applies:

The luma location ($xNbA_1$, $yNbA_1$) inside the neighbouring luma coding block is set equal to (xCb−1, yCb+cbHeight−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbA_1$, $yNbA_1$) as inputs, and the output is assigned to the block availability flag $availableA_1$.

The variables $availableFlagA_1$, $refIdxLXA_1$, $predFlagLXA_1$ and $mvLXA_1$ are derived as follows:

If $availableA_1$ is equal to FALSE, $availableFlagA_1$ is set equal to 0, both components of $mvLXA_1$ are set equal to 0, $refIdxLXA_1$ is set equal to −1 and predFlagLX$A_1$ is set equal to 0, with X being 0 or 1, and gbiIdx$A_1$ is set equal to 0.

Otherwise, availableFlag$A_1$ is set equal to 1 and the following assignments are made:

| | |
|---|---|
| mvLX$A_1$ = MvLX[ xNb$A_1$ ][ yNb$A_1$ ] | (8-294) |
| refIdxLX$A_1$ = RefIdxLX[ xNb$A_1$ ][ yNb$A_1$ ] | (8-295) |
| predFlagLX$A_1$ = PredFlagLX[ xNb$A_1$ ][ yNb$A_1$ ] | (8-296) |
| gbiIdx$A_1$ = GbiIdx[ xNb$A_1$ ][ yNb$A_1$ ] | (8-297) |

For the derivation of availableFlag$B_1$, refIdxLX$B_1$, predFlagLX$B_1$ and mvLX$B_1$ the following applies:

The luma location (xNb$B_1$, yNb$B_1$) inside the neighbouring luma coding block is set equal to (xCb+cbWidth−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_1$, yNb$B_1$) as inputs, and the output is assigned to the block availability flag available$B_1$.

The variables availableFlag$B_1$, refIdxLX$B_1$, predFlagLX$B_1$ and mvLX$B_1$ are derived as follows:

If one or more of the following conditions are true, availableFlag$B_1$ is set equal to 0, both components of mvLX$B_1$ are set equal to 0, refIdxLX$B_1$ is set equal to −1 and predFlagLX$B_1$ is set equal to 0, with X being 0 or 1, and gbiIdx$B_1$ is set equal to 0:

available$B_1$ is equal to FALSE.

available$A_1$ is equal to TRUE and the luma locations (xNb$A_1$, yNb$A_1$) and (xNb$B_1$, yNb$B_1$) have the same motion vectors and the same reference indices.

Otherwise, availableFlag$B_1$ is set equal to 1 and the following assignments are made:

| | |
|---|---|
| mvLX$B_1$ = MvLX[ xNb$B_1$ ][ yNb$B_1$ ] | (8-298) |
| refIdxLX$B_1$ = RefIdxLX[ xNb$B_1$ ][ yNb$B_1$ ] | (8-299) |
| predFlagLX$B_1$ = PredFlagLX[ xNb$B_1$ ][ yNb$B_1$ ] | (8-300) |
| gbiIdx$B_1$ = GbiIdx[ xNb$B_1$ ][ yNb$B_1$ ] | (8-301) |

For the derivation of availableFlag$B_0$, refIdxLX$B_0$, predFlagLX$B_0$ and mvLX$B_0$ the following applies:

The luma location (xNb$B_0$, yNb$B_0$) inside the neighbouring luma coding block is set equal to (xCb+cbWidth, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$B_0$, yNb$B_0$) as inputs, and the output is assigned to the block availability flag available$B_0$.

The variables availableFlag$B_0$, refIdxLX$B_0$, predFlagLX$B_0$ and mvLX$B_0$ are derived as follows:

If one or more of the following conditions are true, availableFlag$B_0$ is set equal to 0, both components of mvLX$B_0$ are set equal to 0, refIdxLX$B_0$ is set equal to −1 and predFlagLX$B_0$ is set equal to 0, with X being 0 or 1, and gbiIdx$B_0$ is set equal to 0:

available$B_0$ is equal to FALSE.

available$B_1$ is equal to TRUE and the luma locations (xNb$B_1$, yNb$B_1$) and (xNb$B_0$, yNb$B_0$) have the same motion vectors and the same reference indices.

availableA1 is equal to TRUE, the luma locations (xNbA1, yNbA1) and (xNbB0, yNbB0) have the same motion vectors and the same reference indices and merge_triangle_flag[xCb][yCb] is equal to 1.

Otherwise, availableFlag$B_0$ is set equal to 1 and the following assignments are made:

| | |
|---|---|
| mvLX$B_0$ = MvLX[ xNb$B_0$ ][ yNb$B_0$ ] | (8-302) |
| refIdxLX$B_0$ = RefIdxLX[ xNb$B_0$ ][ yNb$B_0$ ] | (8-303) |
| predFlagLX$B_0$ = PredFlagLX[ xNb$B_0$ ][ yNb$B_0$ ] | (8-304) |
| gbiIdx$B_0$ = GbiIdx[ xNb$B_0$ ] [ yNb$B_0$ ] | (8-305) |

For the derivation of availableFlag$A_0$, refIdxLX$A_0$, predFlagLX$A_0$ and mvLX$A_0$ the following applies:

The luma location (xNb$A_0$, yNb$A_0$) inside the neighbouring luma coding block is set equal to (xCb−1, yCb+cbWidth).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNb$A_0$, yNb$A_0$) as inputs, and the output is assigned to the block availability flag available$A_0$.

The variables availableFlag$A_0$, refIdxLX$A_0$, predFlagLX$A_0$ and mvLX$A_0$ are derived as follows:

If one or more of the following conditions are true, availableFlag$A_0$ is set equal to 0, both components of mvLX$A_0$ are set equal to 0, refIdxLX$A_0$ is set equal to −1 and predFlagLX$A_0$ is set equal to 0, with X being 0 or 1, and gbiIdx$A_0$ is set equal to 0:

available$A_0$ is equal to FALSE.

available$A_1$ is equal to TRUE and the luma locations (xNb$A_1$, yNb$A_1$) and (xNb$A_0$, yNb$A_0$) have the same motion vectors and the same reference indices.

AVAILABLEB1 IS EQUAL TO TRUE, THE LUMA LOCATIONS (XNBB1, YNBB1) AND (XNBA0, YNBA0) HAVE THE SAME MOTION VECTORS AND THE SAME REFERENCE INDICES AND MERGE_TRIANGLE_FLAG [XCB][YCB] IS EQUAL TO 1.

AVAILABLEB0 IS EQUAL TO TRUE, THE LUMA LOCATIONS (XNBB0, YNBB0) AND (XNBA0, YNBA0) HAVE THE SAME MOTION VECTORS AND THE SAME REFERENCE INDICES AND MERGE_TRIANGLE_FLAG [XCB][YCB] IS EQUAL TO 1.

Otherwise, availableFlag$A_0$ is set equal to 1 and the following assignments are made:

| | |
|---|---|
| mvLX$A_0$ = MvLX[ xNb$A_0$ ][ yNb$A_0$ ] | (8-306) |
| refIdxLX$A_0$ = RefIdxLX[ xNb$A_0$ ][ yNb$A_0$ ] | (8-307) |
| predFlagLX$A_0$ = PredFlagLX[ xNb$A_0$ ][ yNb$A_0$ ] | (8-308) |
| gbiIdx$A_0$ = GbiIdx[ xNb$A_0$ ] [ yNb$A_0$ ] | (8-309) |

For the derivation of availableFlag$B_2$, refIdxLX$B_2$, predFlagLX$B_2$ and mvLX$B_2$ the following applies:

The luma location (xNb$B_2$, yNb$B_2$) inside the neighbouring luma coding block is set equal to (xCb−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbB_2$, $yNbB_2$) as inputs, and the output is assigned to the block availability flag $availableB_2$.

The variables $availableFlagB_2$, $refIdxLXB_2$, $predFlagLXB_2$ and $mvLXB_2$ are derived as follows:

If one or more of the following conditions are true, $availableFlagB_2$ is set equal to 0, both components of $mvLXB_2$ are set equal to 0, $refIdxLXB_2$ is set equal to −1 and $predFlagLXB_2$ is set equal to 0, with X being 0 or 1, and $gbiIdxB_2$ is set equal to 0:

$availableB_2$ is equal to FALSE.

$availableA_1$ is equal to TRUE and the luma locations ($xNbA_1$, $yNbA_1$) and ($xNbB_2$, $yNbB_2$) have the same motion vectors and the same reference indices.

$availableB_1$ is equal to TRUE and the luma locations ($xNbB_1$, $yNbB_1$) and ($xNbB_2$, $yNbB_2$) have the same motion vectors and the same reference indices.

AVAILABLEB0 IS EQUAL TO TRUE, THE LUMA LOCATIONS (XNBB0, YNBB0) AND (XNBB2, YNBB2) HAVE THE SAME MOTION VECTORS AND THE SAME REFERENCE INDICES AND MERGE_TRIANGLE_FLAG [XCB][YCB] IS EQUAL TO 1.

AVAILABLEA0 IS EQUAL TO TRUE, THE LUMA LOCATIONS (XNBA0, YNBA0) AND (XNBB2, YNBB2) HAVE THE SAME MOTION VECTORS AND THE SAME REFERENCE INDICES AND MERGE_TRIANGLE_FLAG [XCB][YCB] IS EQUAL TO 1.

$availableFlagA_0$+$availableFlagA_1$+$availableFlagB_0$+$availableFlagB_1$ is equal to 4 and merge_triangle_flag[xCb][yCb] is equal to 0.

Otherwise, $availableFlagB_2$ is set equal to 1 and the following assignments are made:

| | |
|---|---|
| $mvLXB_2$ = MvLX[ $xNbB_2$ ][ $yNbB_2$ ] | (8-310) |
| $refIdxLXB_2$ = RefIdxLX[ $xNbB_2$ ][ $yNbB_2$ ] | (8-311) |
| $predFlagLXB_2$ = PredFlagLX[ $xNbB_2$ ][ $yNbB_2$ ] | (8-312) |
| $gbiIdxB_2$ = GbiIdx[ $xNbB_2$ ] [ $yNbB_2$ ] | (8-313) |

5.3 Embodiment #3

This embodiment is to align the conditions for invoking the checking of B2.

8.5.2.3 Derivation Process for Spatial Merging Candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags $availableFlagA_0$, $availableFlagA_1$, $availableFlagB_0$, $availableFlagB_1$ and $availableFlagB_2$ of the neighbouring coding units, the reference indices $refIdxLXA_0$, $refIdxLXA_1$, $refIdxLXB_0$, $refIdxLXB_1$ and $refIdxLXB_2$ of the neighbouring coding units, the prediction list utilization flags $predFlagLXA_0$, $predFlagLXA_1$, $predFlagLXB_0$, $predFlagLXB_1$ and $predFlagLXB_2$ of the neighbouring coding units, the motion vectors in 1/16 fractional-sample accuracy $mvLXA_0$, $mvLXA_1$, $mvLXB_0$, $mvLXB_1$ and $mvLXB_2$ of the neighbouring coding units, the bi-prediction weight indices $gbiIdxA_0$, $gbiIdxA_1$, $gbiIdxB_0$, $gbiIdxB_1$, and $gbiIdxB_2$.

For the derivation of $availableFlagA_1$, $refIdxLXA_1$, $predFlagLXA_1$ and $mvLXA_1$ the following applies:

The luma location ($xNbA_1$, $yNbA_1$) inside the neighbouring luma coding block is set equal to (xCb−1, yCb+cbHeight−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbA_1$, $yNbA_1$) as inputs, and the output is assigned to the block availability flag $availableA_1$.

The variables $availableFlagA_1$, $refIdxLXA_1$, $predFlagLXA_1$ and $mvLXA_1$ are derived as follows:

For the derivation of $availableFlagB_1$, $refIdxLXB_1$, $predFlagLXB_1$ and $mvLXB_1$ the following applies:

The luma location ($xNbB_1$, $yNbB_1$) inside the neighbouring luma coding block is set equal to (xCb+cbWidth−1, yCb−1).

For the derivation of $availableFlagB_0$, $refIdxLXB_0$, $predFlagLXB_0$ and $mvLXB_0$ the following applies:

The luma location ($xNbB_0$, $yNbB_0$) inside the neighbouring luma coding block is set equal to (xCb+cbWidth, yCb−1).

For the derivation of $availableFlagA_0$, $refIdxLXA_0$, $predFlagLXA_0$ and $mvLXA_0$ the following applies:

The luma location ($xNbA_0$, $yNbA_0$) inside the neighbouring luma coding block is set equal to (xCb−1, yCb+cbWidth).

For the derivation of $availableFlagB_2$, $refIdxLXB_2$, $predFlagLXB_2$ and $mvLXB_2$ the following applies:

The luma location ($xNbB_2$, $yNbB_2$) inside the neighbouring luma coding block is set equal to (xCb−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location ($xNbB_2$, $yNbB_2$) as inputs, and the output is assigned to the block availability flag $availableB_2$.

The variables $availableFlagB_2$, $refIdxLXB_2$, $predFlagLXB_2$ and $mvLXB_2$ are derived as follows:

If one or more of the following conditions are true, $availableFlagB_2$ is set equal to 0, both components of $mvLXB_2$ are set equal to 0, $refIdxLXB_2$ is set equal to −1 and $predFlagLXB_2$ is set equal to 0, with X being 0 or 1, and $gbiIdxB_2$ is set equal to 0:

$availableB_2$ is equal to FALSE.

$availableA_1$ is equal to TRUE and the luma locations ($xNbA_1$, $yNbA_1$) and ($xNbB_2$, $yNbB_2$) have the same motion vectors and the same reference indices.

$availableB_1$ is equal to TRUE and the luma locations ($xNbB_1$, $yNbB_1$) and ($xNbB_2$, $yNbB_2$) have the same motion vectors and the same reference indices.

$availableB_0$ is equal to TRUE, the luma locations ($xNbB_0$, $yNbB_0$) and ($xNbB_2$, $yNbB_2$) have the same motion vectors and the same reference indices and merge_triangle_flag[xCb][yCb] is equal to 1.

availableA$_0$ is equal to TRUE, the luma locations (xNbA$_0$, yNbA$_0$) and (xNbB$_2$, yNbB$_2$) have the same motion vectors and the same reference indices and merge_triangle_flag[xCb][yCb] is equal to 1.

availableFlagA$_0$+availableFlagA$_1$+availableFlagB$_0$+availableFlagBi is equal to 4 AND MERGE_TRIANGLE_FLAG[XCB][YCB] IS EQUAL TO 0.

Otherwise, availableFlagB$_2$ is set equal to 1 and the following assignments are made:

| | |
|---|---|
| $mvLXB_2 = MvLX[ xNbB_2 ][ yNbB_2 ]$ | (8-310) |
| $refIdxLXB_2 = RefIdxLX[ xNbB_2 ][ yNbB_2 ]$ | (8-311) |
| $predFlagLXB_2 = PredFlagLX[ xNbB_2 ][ yNbB_2 ]$ | (8-312) |
| $gbiIdxB_2 = GbiIdx[ xNbB_2 ] [ yNbB_2 ]$ | (8-313) |

5.4 Embodiment #4

This embodiment is to align the conditions for invoking the checking of B2.

8.5.2.3 Derivation Process for Spatial Merging Candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags availableFlagA$_0$, availableFlagA$_1$, availableFlagB$_0$, availableFlagB$_1$ and availableFlagB$_2$ of the neighbouring coding units, the reference indices refIdxLXA$_0$, refIdxLXA$_1$, refIdxLXB$_0$, refIdxLXB$_1$ and refIdxLXB$_2$ of the neighbouring coding units, the prediction list utilization flags predFlagLXA$_0$, predFlagLXA$_1$, predFlagLXB$_0$, predFlagLXB$_1$ and predFlagLXB$_2$ of the neighbouring coding units, the motion vectors in 1/16 fractional-sample accuracy mvLXA$_0$, mvLXA$_1$, mvLXB$_0$, mvLXB$_1$ and mvLXB$_2$ of the neighbouring coding units, the bi-prediction weight indices gbiIdxA$_0$, gbiIdxA$_1$, gbiIdxB$_0$, gbiIdxB$_1$, and gbiIdxB$_2$.

For the derivation of availableFlagA$_1$, refIdxLXA$_1$, predFlagLXA$_1$ and mvLXA$_1$ the following applies:

The luma location (xNbA$_1$, yNbA$_1$) inside the neighbouring luma coding block is set equal to (xCb−1, yCb+cbHeight−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_1$, yNbA$_1$) as inputs, and the output is assigned to the block availability flag availableA$_1$.

The variables availableFlagA$_1$, refIdxLXA$_1$, predFlagLXA$_1$ and mvLXA$_1$ are derived as follows:

For the derivation of availableFlagB$_1$, refIdxLXB$_1$, predFlagLXB$_1$ and mvLXB$_1$ the following applies:

The luma location (xNbB$_1$, yNbB$_1$) inside the neighbouring luma coding block is set equal to (xCb+cbWidth−1, yCb−1).

For the derivation of availableFlagB$_0$, refIdxLXB$_0$, predFlagLXB$_0$ and mvLXB$_0$ the following applies:

The luma location (xNbB$_0$, yNbB$_0$) inside the neighbouring luma coding block is set equal to (xCb+cbWidth, yCb−1).

For the derivation of availableFlagA$_0$, refIdxLXA$_0$, predFlagLXA$_0$ and mvLXA$_0$ the following applies:

The luma location (xNbA$_0$, yNbA$_0$) inside the neighbouring luma coding block is set equal to (xCb−1, yCb+cbWidth).

For the derivation of availableFlagB$_2$, refIdxLXB$_2$, predFlagLXB$_2$ and mvLXB$_2$ the following applies:

The luma location (xNbB$_2$, yNbB$_2$) inside the neighbouring luma coding block is set equal to (xCb−1, yCb−1).

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbB$_2$, yNbB$_2$) as inputs, and the output is assigned to the block availability flag availableB$_2$.

The variables availableFlagB$_2$, refIdxLXB$_2$, predFlagLXB$_2$ and mvLXB$_2$ are derived as follows:

If one or more of the following conditions are true, availableFlagB$_2$ is set equal to 0, both components of mvLXB$_2$ are set equal to 0, refIdxLXB$_2$ is set equal to −1 and predFlagLXB$_2$ is set equal to 0, with X being 0 or 1, and gbiIdxB$_2$ is set equal to 0:

availableB$_2$ is equal to FALSE.

availableA$_1$ is equal to TRUE and the luma locations (xNbA$_1$, yNbA$_1$) and (xNbB$_2$, yNbB$_2$) have the same motion vectors and the same reference indices.

availableB$_1$ is equal to TRUE and the luma locations (xNbB$_1$, yNbB$_1$) and (xNbB$_2$, yNbB$_2$) have the same motion vectors and the same reference indices.

availableB$_0$ is equal to TRUE, the luma locations (xNbB$_0$, yNbB$_0$) and (xNbB$_2$, yNbB$_2$) have the same motion vectors and the same reference indices and merge_triangle_flag[xCb][yCb] is equal to 1.

availableA$_0$ is equal to TRUE, the luma locations (xNbA$_0$, yNbA$_0$) and (xNbB$_2$, yNbB$_2$) have the same motion vectors and the same reference indices and merge_triangle_flag[xCb][yCb] is equal to 1.

AVAILABLEFLAGA0+AVAILABLEFLAGA1+AVAILABLEFLAGB0+AVAIL ABLEFLAGB1 IS EQUAL TO 4 AND MERGE_TRIANGLE_FLAG[XCB][YCB] IS EQUAL TO 0.

Otherwise, availableFlagB$_2$ is set equal to 1 and the following assignments are made:

| | |
|---|---|
| $mvLXB_2 = MvLX[ xNbB_2 ][ yNbB_2 ]$ | (8-310) |
| $refIdxLXB_2 = RefIdxLX[ xNbB_2 ][ yNbB_2 ]$ | (8-311) |
| $predFlagLXB_2 = PredFlagLX[ xNbB_2 ][ yNbB_2 ]$ | (8-312) |
| $gbiIdxB_2 = GbiIdx[ xNbB_2 ] [ yNbB_2 ]$ | (8-313) |

5.5 Embodiment #5

This embodiment is to simplify the decision of initialized MV in ATMVP process.

8.5.5.4 Derivation Process for Subblock-Based Temporal Merging Base Motion Data

Inputs to this process are:

the location (xCtb, yCtb) of the top-left sample of the luma coding tree block that contains the current coding block, the location (xColCtrCb, yColCtrCb) of the top-left sample of the collocated luma coding block that covers the below-right center sample.

the availability flag availableFlag$A_1$ of the neighbouring coding unit, the reference index refIdxLX$A_1$ of the neighbouring coding unit, the prediction list utilization flag predFlagLX$A_1$ of the neighbouring coding unit, the motion vector in 1/16 fractional-sample accuracy mvLX$A_1$ of the neighbouring coding unit.

Outputs of this process are:

the motion vectors ctrMvL0 and ctrMvL1, the prediction list utilization flags ctrPredFlagL0 and ctrPredFlagL1, the temporal motion vector tempMv.

The variable tempMv is set as follows:

| | |
|---|---|
| tempMv[ 0 ] = 0 | (8-529) |
| tempMv[ 1 ] = 0 | (8-530) |

The variable currPic specifies the current picture.

When availableFlag$A_1$ is equal to TRUE, the following applies:

*Set a variable X to collocated from l0 flag.*

*If predFlagLXA1 is equal to 1 and DiffPicOrderCnt(ColPic, RefPicList[ X ][refIdxLXA1]) is equal to 0 are true, tempMv is set equal to mvLXA1.*

IF ALL OF THE FOLLOWING CONDITIONS ARE TRUE, TEMPMV IS SET EQUAL TO MVL1A1:

PREDFLAGL1A1 IS EQUAL TO 1,

DIFFPICORDERCNT(COLPIC, REFPICLIST[1][REFIDXL1A1]) IS EQUAL TO 0,

DIFFPICORDERCNT(APIC, CURRPIC) IS LESS THAN OR EQUAL TO 0 FOR EVERY PICTURE APIC IN EVERY REFERENCE PICTURE LIST OF THE CURRENT SLICE,

SLICE_TYPE IS EQUAL TO B,

COLLOCATED_FROM_L0_FLAG IS EQUAL TO 0.

OTHERWISE IF ALL OF THE FOLLOWING CONDITIONS ARE TRUE, TEMPMV IS SET EQUAL TO MVL0A1:

PREDFLAGL0A1 IS EQUAL TO 1,

DIFFPICORDERCNT(COLPIC, REFPICLIST[0][REFIDXL0A1]) IS EQUAL TO 0.

The location (xColCb, yColCb) of the collocated block inside ColPic is derived as follows.

```
xColCb = Clip3( xCtb,
        Min( CurPicWidthInSamplesY − 1, xCtb + ( 1 << CtbLog2SizeY ) + 3 ),
                                                                    (8-531)
        xColCtrCb + ( tempMv[0] >> 4 ) )
yColCb = Clip3( yCtb,
        Min( CurPicHeightInSamplesY − 1, yCtb + ( 1 << CtbLog2SizeY ) − 1 ),
                                                                    (8-532)
        yColCtrCb + ( tempMv[1] >> 4 ) )
```

The array colPredMode is set equal to the prediction mode array CuPredMode of the collocated picture specified by ColPic.

The motion vectors ctrMvL0 and ctrMvL1, and the prediction list utilization flags ctrPredFlagL0 and ctrPredFlagL1 are derived as follows:

5.6 Embodiment #6

Examples for alignment of derivation process of collocated MVs for sub-block and non-sub-block based methods.

8.5.2.12 Derivation Process for Collocated Motion Vectors

Inputs to this process are:

a variable currCb specifying the current coding block, a variable colCb specifying the collocated coding block inside the collocated picture specified by ColPic, a luma location (xColCb, yColCb) specifying the top-left sample of the collocated luma coding block specified by colCb relative to the top-left luma sample of the collocated picture specified by ColPic, a reference index refIdxLX, with X being 0 or 1, a flag indicating a subblock temporal merging candidate sbFlag.

Outputs of this process are:

the motion vector prediction mvLXCol in 1/16 fractional-sample accuracy, the availability flag availableFlagLXCol.

The variable currPic specifies the current picture.

The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvDmvrL1[x][y] and RefIdxL1[x][y], respectively, of the collocated picture specified by ColPic.

The variables mvLXCol and availableFlagLXCol are derived as follows:

If colCb is coded in an intra or IBC prediction mode, both components of mvLXCol are set equal to 0 and availableFlagLXCol is set equal to 0.

Otherwise, the motion vector mvCol, the reference index refIdxCol and the reference list identifier listCol are derived as follows:

If SBFLAG IS EQUAL TO 0, availableFlagLXCol is set to 1 and the following applies:

If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.

Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.

Otherwise (predFlagL0Col[xColCb][yColCb] is equal to 1 and predFlagl1Col[xColCb][yColCb] is equal to 1), the following assignments are made:

If NoBackwardPredFlag is equal to 1, mvCol, refIdxCol and listCol are set equal to mvLXCol[xColCb][yColCb], refIdxLXCol[xColCb][yColCb] and LX, respectively.

Otherwise, mvCol, refIdxCol and listCol are set equal to mvLNCol[xColCb][yColCb], refIdxLNCol[xColCb][yColCb] and LN, respectively, with N being the value of collocated_from_10_flag.

OTHERWISE (SBFLAG IS EQUAL TO 1), THE FOLLOWING APPLIES:

IF PREDFLAGLXCOL[XCOLCB][YCOLCB] IS EQUAL TO 1, MVCOL, REFIDXCOL, AND LISTCOL ARE SET EQUAL TO MVLXCOL [XCOLCB][YCOLCB], REFIDXLXCOL [XCOLCB][YCOLCB], AND LX, RESPECTIVELY, AVAILABLEFLAGLXCOL IS SET TO 1.

OTHERWISE (PREDFLAGLXCOL[XCOLCB][YCOLCB] IS EQUAL TO 0), THE FOLLOWING APPLIES:

IF DIFFPICORDERCNT(APIC, CURRPIC) IS LESS THAN OR EQUAL TO 0 FOR EVERY PICTURE APIC IN EVERY REFERENCE PICTURE LIST OF THE CURRENT SLICE AND PREDFLAGLYCOL[XCOLCB][YCOLCB] IS EQUAL TO 1, MVCOL, REFIDXCOL, AND LISTCOL ARE SET TO MVLYCOL[XCOLCB][YCOLCB], REFIDXLYCOL[XCOLCB][YCOLCB] AND LY, RESPECTIVELY, WITH Y BEING EQUAL TO !X WHERE X BEING THE VALUE OF X THIS PROCESS IS INVOKED FOR. AVAILABLEFLAGLXCOL IS SET TO 1.

BOTH THE COMPONENTS OF MVLXCOL ARE SET TO 0 AND AVAILABLEFLAGLXCOL IS SET EQUAL TO 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:

5.7 Embodiment #7 on IBC Motion List Construction

Two coordinates are used to derive the candidates, one is to identify neighboring blocks, and the other one is used for availability check of the identified neighboring blocks.

8.6.2.2 Derivation Process for IBC Luma Block Vector Prediction

This process is only invoked when CuPredMode[0][xCb][yCb] is equal to MODE_JBC, where (xCb, yCb) specify the top-left sample of the current luma coding block relative to the top-left luma sample of the current picture.

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are:

the luma block vector in 1/16 fractional-sample accuracy bvL.

The variables xSmr, ySmr, smrWidth, and smrHeight are derived as follows:

| | |
|---|---|
| xSmr = IsInSmr[ xCb ][ yCb ] ? SmrX[ xCb ][ yCb ] : xCb | (8-906) |
| ySmr = IsInSmr[ xCb ][ yCb ] ? SmrY[ xCb ][ yCb ] : yCb | (8-907) |
| smrWidth = IsInSmr[ xCb ][ yCb ] ? SmrW[ xCb ][ yCb ] : cbWidth | (8-908) |
| smrHeight = IsInSmr[ xCb ][ yCb ] ? SmrH[ xCb ][ yCb ] : cbHeight | (8-909) |

The luma block vector bvL is derived by the following ordered steps:

1. The derivation process for spatial block vector candidates from neighbouring coding units as specified in clause 8.6.2.3 is invoked with the luma coding block *of shared merge region* *location ( xCb, yCb ) set equal to ( xSmr, ySmr ),* *the luma coding block of current coding* *block location (xCurrCb, yCurrCb ) set equal* *to ( xCb, yCb ),* the luma coding block width cbWidth, and the luma coding block height cbHeight set equal to smrWidth and smrHeight as inputs, and the outputs being the availability flags $availableFlagA_1$, $availableFlagB_1$ and the block vectors $bvA_1$ and $bvB_1$.
2. The block vector candidate list, bvCandList, is constructed as follows:

```
i = 0
if( availableFlagA1 )
  bvCandList [ i++ ] = bvA1                    (8-910)
if( availableFlagB1 )
  bvCandList [ i++ ] = bvB1
```

3. The variable numCurrCand is set equal to the number of merging candidates in the bvCandList.
4. When numCurrCand is less than MaxNumIbcMergeCand and NumHmvpIbcCand is greater than 0, the derivation process of IBC history-based block vector candidates as specified in 8.6.2.4 is invoked with bvCandList, and numCurrCand as inputs, and modified bvCandList and numCurrCand as outputs.
5. When numCurrCand is less than MaxNumIbcMergeCand, the following applies until numCurrCand is equal to MaxNumIbcMergeCand:
   1. bvCandList[numCurrCand][0] is set equal to 0.
   2. bvCandList[numCurrCand][1] is set equal to 0.
   3. numCurrCand is increased by 1.

6. The variable bvIdx is derived as follows:

| | |
|---|---|
| bvIdx = general_merge_flag[ xCb ][ yCb ] ? merge_idx[ xCb ][ yCb ] : mvp_l0_flag[ xCb ] [ yCb ] | (8-911) |

7. The following assignments are made:

| | |
|---|---|
| bvL[ 0 ] = bvCandList[ mvIdx ][ 0 ] | (8-912) |
| bvL[ 1 ] = bvCandList[ mvIdx ][ 1 ] | (8-913) |

4.7.1.1 Derivation Process for IBC Spatial Block Vector Candidates

Inputs to this process are:

a luma location (xCb, yCb) of the top-left sample of the CURRENT luma coding block relative to the top-left luma sample of the current picture, a luma location (xCurrCb, yCurrCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows:

the availability flags $availableFlagA_1$ and $availableFlagB_1$ of the neighbouring coding units, the block vectors in 1/16 fractional-sample accuracy $bvA_1$, and $bvB_1$ of the neighbouring coding units, For the derivation of availableFlagAi and mvAi the following applies:

The luma location ($xNbA_1$, $yNbA_1$) inside the neighbouring luma coding block is set equal to (xCb−1, yCb+cbHeight−1).

The derivation process for neighbouring block availability as specified in clause 6.4.4 is invoked with the current luma location (xCurr, yCurr) set equal to (XCB, YCB) *( xCurrCb, yCurrCb ),* the neighbouring luma location ($xNbA_1$, $yNbA_1$), checkPredModeY set equal to TRUE, and cIdx set equal to 0 as inputs, and the output is assigned to the block availability flag $availableA_1$.

The variables $availableFlagA_1$ and $bvA_1$ are derived as follows:

If $availableA_1$ is equal to FALSE, $availableFlagA_1$ is set equal to 0 and both components of $bvA_1$ are set equal to 0.

Otherwise, $availableFlagA_1$ is set equal to 1 and the following assignments are made:

$$bvA_1 = MvL0[xNbA_1][yNbA_1] \quad (8\text{-}914)$$

For the derivation of $availableFlagB_1$ and $bvB_1$ the following applies:

The luma location ($xNbB_1$, $yNbB_1$) inside the neighbouring luma coding block is set equal to (xCb+cbWidth−1, yCb−1).

The derivation process for neighbouring block availability as specified in clause 6.4.4 is invoked with the current luma location (xCurr, yCurr) set equal to (XCB, YCB)*( xCurrCb, yCurrCb ),* the neighbouring luma location ($xNbB_1$, $yNbB_1$), checkPredModeY set equal to TRUE, and cIdx set equal to 0 as inputs, and the output is assigned to the block availability flag $availableB_1$.

The variables $availableFlagB_1$ and $bvB_1$ are derived as follows:

If one or more of the following conditions are true, $availableFlagB_1$ is set equal to 0 and both components of $bvB_1$ are set equal to 0:

$availableB_1$ is equal to FALSE.

$availableA_1$ is equal to TRUE and the luma locations ($xNbA_1$, $yNbA_1$) and ($xNbB_1$, $yNbB_1$) have the same block vectors.

Otherwise, $availableFlagB_1$ is set equal to 1 and the following assignments are made:

$$bvB_1 = MvL0[xNbB_1][yNbB_1] \quad (8\text{-}915)$$

5.8 Embodiment #7 on CIIP 8.5.6.7 Weighted Sample Prediction Process for Combined Merge and Intra Prediction Inputs to this process are:

a luma location (xCb, yCb) specifying the top-left sample of the current luma coding block relative to the top left luma sample of the current picture, the width of the current coding block cbWidth, the height of the current coding block cbHeight, two (cbWidth)×(cbHeight) arrays predSamplesInter and predSamplesIntra, a variable cIdx specifying the colour component index.

Output of this process is the (cbWidth)×(cbHeight) array predSamplesComb of prediction sample values.

The variable bitDepth is derived as follows:

If cIdx is equal to 0, bitDepth is set equal to $BitDepth_Y$.

Otherwise, bitDepth is set equal to $BitDepth_C$.

The variable scallFact is derived as follows:

$$scallFact = (cIdx == 0) ? 0 : 1. \quad (8\text{-}838)$$

The neighbouring luma locations (xNbA, yNbA) and (xNbB, yNbB) are set equal to (xCb−1, yCb−1+(cbHeight<<scallFact)) and (xCb−1+(cbWidth<<scallFact), yCb−1), respectively.

For X being replaced by either A or B, the variables availableX and isIntraCodedNeighbourX are derived as follows:

The derivation process for neighbouring block availability as specified in clause 6.4.4 is invoked with the location (xCurr, yCurr) set equal to (xCb, yCb), the neighbouring location (xNbY, yNbY) set equal to (xNbX, yNbX), checkPredModeY set equal to *FALSE* TRUE, and cIdx set equal to 0 as inputs, and the output is assigned to availableX.

The variable isIntraCodedNeighbourX is derived as follows:

If availableX is equal to TRUE and CuPredMode[0][xNbX][yNbX] is equal to MODE_INTRA, isIntraCodedNeighbourX is set equal to TRUE.

Otherwise, isIntraCodedNeighbourX is set equal to FALSE.

The weight w is derived as follows:

If isIntraCodedNeighbourA and isIntraCodedNeighbourB are both equal to TRUE, w is set equal to 3.

Otherwise, if isIntraCodedNeighbourA and isIntraCodedNeighbourB are both equal to FALSE, w is set equal to 1.

Otherwise, w is set equal to 2.

When cIdx is equal to 0 and slice_lmcs_enabled_flag is equal to 1, predSamplesInter[x][y] with x=0 . . . cbWidth−1 and y=0 . . . cbHeight−1 are modified as follows:

```
idxY = predSamplesInter[ x ][ y ] >> Log2( OrgCW )
predSamplesInter [ x ][ y ] = Clip1Y( LmcsPivot[ idxY ] +                         (8-839)
        ( ScaleCoeff[ idxY ] * (predSamplesInter[ x ][ y ] − InputPivot[ idxY ] ) +
        ( 1 << 10 ) ) >> 11 )
```

6.4.4 Derivation Process for Neighbouring Block Availability

Inputs to this process are:

the luma location (xCurr, yCurr) of the top-left sample of the current block relative to the top-left luma sample of the current picture, the luma location (xNbY, yNbY) covered by a neighbouring block relative to the top-left luma sample of the current picture, the variable checkPredModeY specifying whether availability depends on the prediction mode.

the variable cIdx specifying the colour component of the current block.

Output of this process is the availability of the neighbouring block covering the location (xNbY, yNbY), denoted as availableN.

The neighbouring block availability availableN is derived as follows:

If one or more of the following conditions are true, availableN is set equal to FALSE:

xNbY is less than 0.

yNbY is less than 0.

xNbY is greater than or equal to pic_width_in_luma_samples.

yNbY is greater than or equal to pic_height_in_luma_samples.

IsAvailable[cIdx][yNbY][xNbY] is equal to FALSE.

The neighbouring block is contained in a different brick than the current block, availableN is set equal to FALSE.

Otherwise, availableN is set equal to TRUE.

When all of the following conditions are true, availableN is set equal to FALSE.

checkPredModeY is equal to TRUE.

availableN is set equal to TRUE.

CuPredMode[0][xNbY][yNbY] is not equal to CuPredMode[0][xCurr][yCurr].

Figure 22:
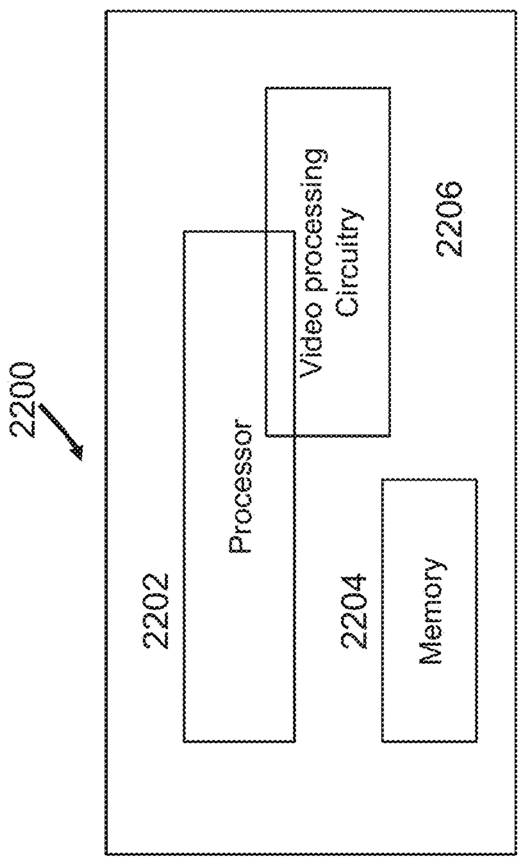
FIG. 22 is a block diagram of an example of a video processing apparatus.

FIG. 22 is a block diagram of a video processing apparatus 2200. The apparatus 2200 may be used to implement one or more of the methods described herein. The apparatus 2200 may be embodied in a smartphone, tablet, computer, Internet of Things (IoT) receiver, and so on. The apparatus 2200 may include one or more processors 2202, one or more memories 2204 and video processing hardware 2206. The processor(s) 2202 may be configured to implement one or more methods described in the present document. The memory (memories) 2204 may be used for storing data and code used for implementing the methods and techniques described herein. The video processing hardware 2206 may be used to implement, in hardware circuitry, some techniques described in the present document. The video processing hardware 2206 may be partially or completely includes within the processor(s) 2202 in the form of dedicated hardware, or graphical processor unit (GPU) or specialized signal processing blocks.

Some embodiments may be described using the following clause-based description.

Figure 23:
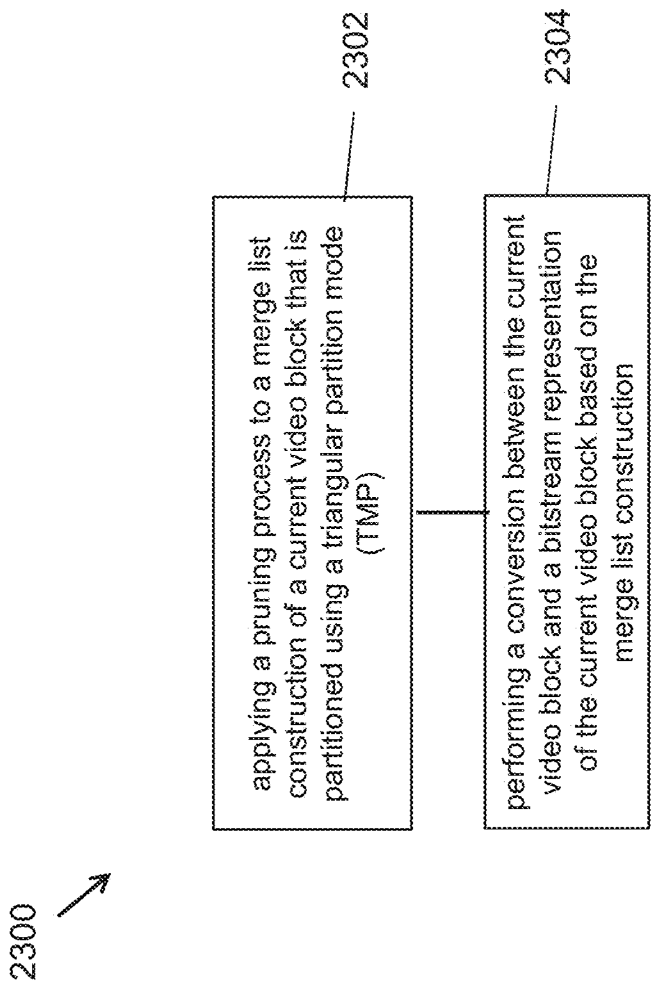
FIG. 23 is a flowchart for an example of a video processing method.

Some example embodiments of techniques described in item 1 of section 4 include:

1. A method of video processing (e.g., method 2300 depicted in FIG. 23), comprising: applying (2302) a pruning process to a merge list construction of a current video block that is partitioned using a triangular partition mode (TMP) in which the current video block is partitioned into at least two non-rectangular sub-blocks, wherein the pruning process is same as another pruning process for another video block that is partitioned using a non-TMP partition; and performing (2304) a conversion between the current video block and a bitstream representation of the current video block based on the merge list construction.
2. The method of claim 1, wherein the pruning process comprises using a partial pruning to spatial merge candidates of the current video block.
3. The method of claim 1, wherein the pruning process comprises applying full or partial pruning to the current video block based on a block dimension rule that specifies to use full or partial pruning based on dimensions of the current video block.
4. The method of claim 1, wherein the pruning process comprises using a different order of neighboring blocks during the merge list construction process.

Some example embodiments of techniques described in item 2 of section 4 include:

1. A method of video processing, comprising: determining, during a conversion between a current video block and a bitstream representation of the current video block, about availability of an alternative temporal motion vector predictor coding (ATMVP) mode for the conversion based on list X of a neighboring block of the current video block, wherein X is an integer and a value of X depends on an encoding condition of the current video block, and performing the conversion based on the availability of the ATMVP mode.
2. The method of claim 1, wherein X indicates a location of a collocated video picture from which a temporal motion vector prediction used for the conversion between the current video block and the bitstream representation is performed.
3. The method of claim 1, wherein X is determined by comparing picture order counts (POCs) of all reference pictures in all reference lists for the current video block with a POC of a current video picture of the current video block.
4. The method of claim 3, wherein in case that the comparing shows that the POCs are <= the POC of the current picture, then setting X=1, otherwise, setting X=0.
5. The method of claim 1, wherein motion information stored in a history-based motion vector predictor table is used for initializing motion vector in the ATMVP mode.

Some example embodiments of techniques described in item 3 of section 4 include:

1. A method of video processing, comprising: determining, during a conversion between a current video block and a bitstream representation of the current video block, that a sub-block based coding technique in which the current video block is partitioned into at least two sub-blocks, wherein each sub-block capable of deriving its own motion information, is used for the conversion; and performing the conversion using a merge list construction process for the current video block that is aligned with a block based derivation process for collocated motion vectors.
2. The method of claim 1, wherein the merge list construction process and the derivation process comprise performing uni-prediction from list Y, and wherein motion vectors of list Y are scaled to a target reference picture list X.
3. The method of claim 1, wherein the merge list construction process and the derivation process comprise performing bi-prediction with target reference picture list X, then motion vectors of list Y are scaled to that of list X, where Y is determined according to a rule.

Some example embodiments of techniques described in item 4 of section 4 include:

1. A method of video processing, comprising: determining, based on dimensions of a current video block of a video picture and/or an enablement of a merge sharing status in which merge candidates from different coding tools are shared, between a condition being met and the condition being not met; and performing a conversion between the current video block and a bitstream representation of the current video block based on the condition.
2. The method of claim 1, wherein the performing the conversion comprises skipping deriving spatial merge candidates in case that the condition is met.
3. The method of claim 1, wherein the performing the conversion comprises skipping deriving history-based motion vector candidates in case that the condition is met.
4. The method of any of claims 1-3, wherein it is determined that the condition is met based on the current video block being under a shared node in the video picture.

Some example embodiments of techniques described in item 5 of section 4 include:

1. A method of video processing, comprising: making a determination, during a conversion between a current video block and a bitstream representation of the current video block, that a coding tool is disabled for the conversion, wherein the bitstream representation is configured to provide an indication that a maximum number of merge candidates for the coding tool is zero; and performing the conversion using the determination that the coding tool is disabled.
2. The method of claim 1, wherein the coding tool corresponds to intra block copy in which pixels of the current video block are coded from other pixels in a video region of the current video block.
3. The method of claim 1, wherein the coding tool is a sub-block coding tool.
4. The method of claim 3, wherein the sub-block coding tool is an affine coding tool or an alternate motion vector predictor tool.
5. The method of any of claims 1-4, wherein the performing the conversion includes processing the bitstream by skipping syntax elements related to the coding tool.

Some example embodiments of techniques described in item 6 of section 4 include:

1. A method of video processing, comprising: making a determination, during a conversion between a current video block and a bitstream representation of the current video block using a rule that specifies that a first syntax element in the bitstream representation is conditionally present based on a second syntax element indicative of a maximum number of merge candidates used by a coding tool used during the conversion; and performing the conversion between the current video block and a bitstream representation of the current video block based on the determination.
2. The method of claim 1, wherein the first syntax element corresponds to a merge flag.
3. The method of claim 1, wherein the first syntax element corresponds to a skip flag.
4. The method of any of claims 1-3, wherein the coding tool is a sub-band coding tool and the second syntax element corresponds to a maximum allowed merge candidates for the sub-band coding tool.

With reference to items 14 to 17 in the previous section, the following clauses describe some technical solutions.

A method of video processing, comprising: determining, for a conversion between a coded representation of a first video block of a video and a second video block, an availability of a second video block during the conversion using an availability check process, wherein the availability check process checks at least at a first position and a second position with respect to the first video block; and performing the conversion based on a result of determining.

The method as above, wherein the first position corresponds to a top-left position.

The method as above, wherein the second position corresponds to a top-left position.

A method of video processing, comprising: determining, for a conversion between a coded representation of a video block of a video and a second video block, a list of intra block copy motion candidates at a first position and a second position with respect to the video block; and performing the conversion based on a result of determining.

The method as above, wherein the first position corresponds to a top left position relative to a shared merge region of the video block.

The method of any of the above clauses, wherein the conversion includes generating the bitstream representation from the current video block.

The method of any of the above clauses, wherein the conversion includes generating samples of the current video block from the bitstream representation.

A video processing apparatus comprising a processor configured to implement a method recited in any one or more of the above clauses.

A computer readable medium having code stored thereon, the code, upon execution, causing a processor to implement a method recited in any one or more of the above clauses.

Figure 25:
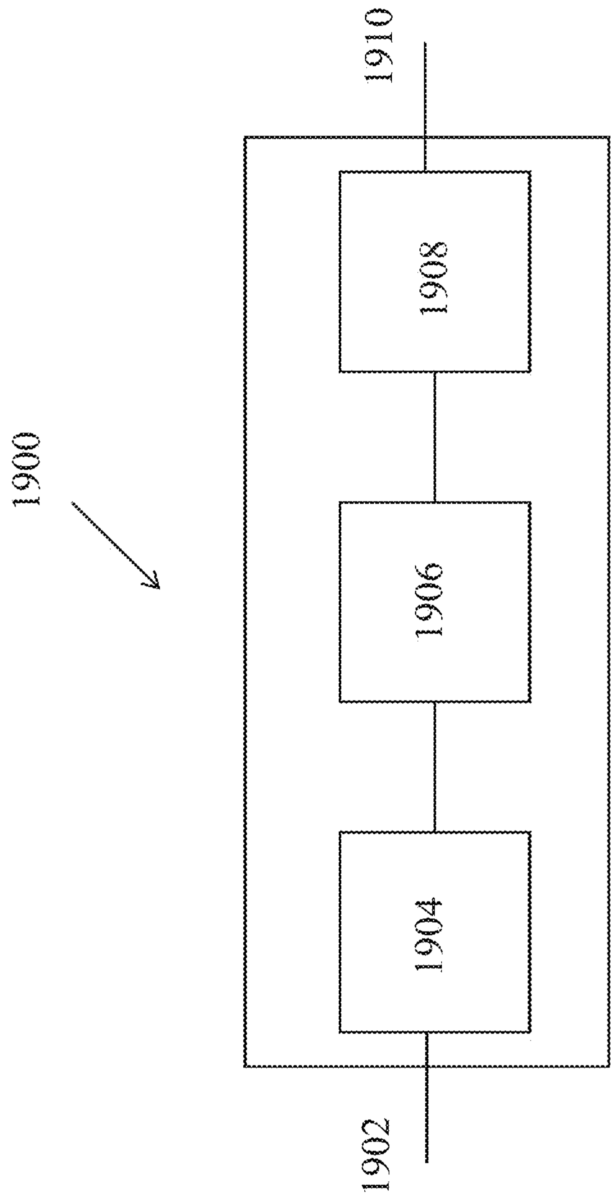
FIG. 25 is a block diagram of an example video processing system in which disclosed techniques may be implemented.

FIG. 25 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 26:
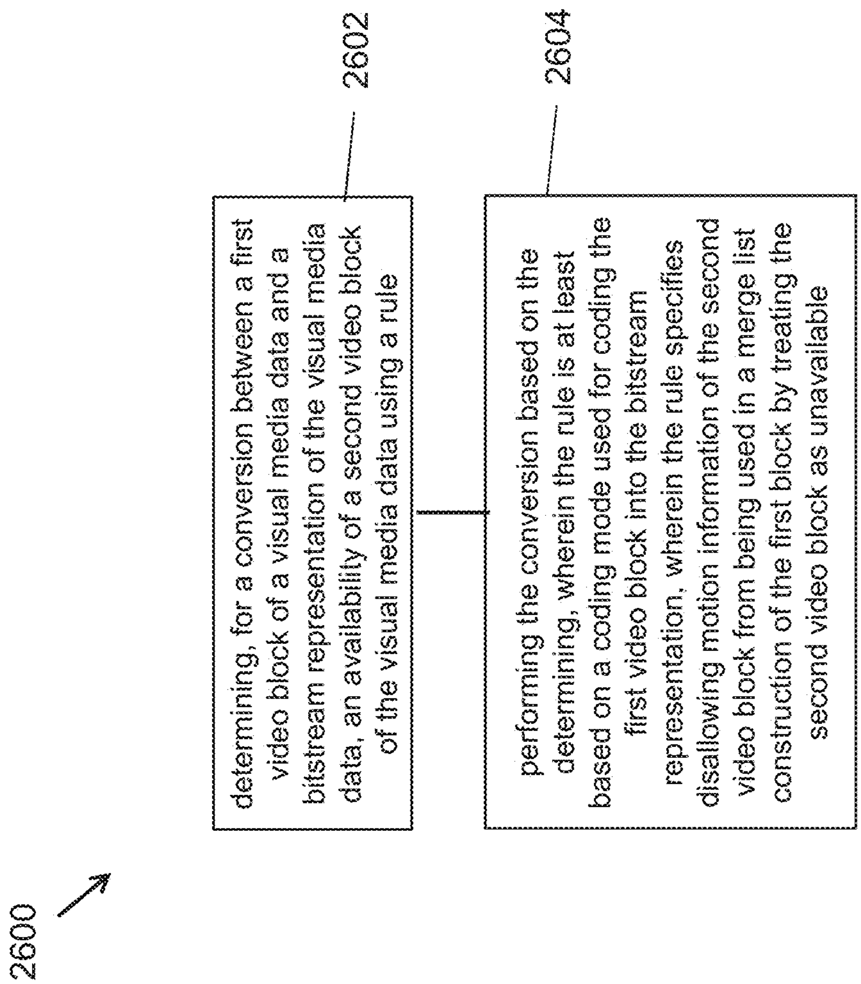
FIG. 26 is a flowchart for an example of a visual media processing method.

FIG. 26 is a flowchart for an example for a visual media processing method. Steps of this flowchart are discussed in connection with embodiment 13 in this document. At step 2602, the process determines, for a conversion between a first video block of a visual media data and a bitstream representation of the visual media data, an availability of a second video block of the visual media data using a rule. At step 2604, the process performs the conversion based on the determining, wherein the rule is at least based on a coding mode used for coding the first video block into the bitstream representation, wherein the rule specifies disallowing motion information of the second video block from being used in a merge list construction of the first block by treating the second video block as unavailable.

Figure 27:
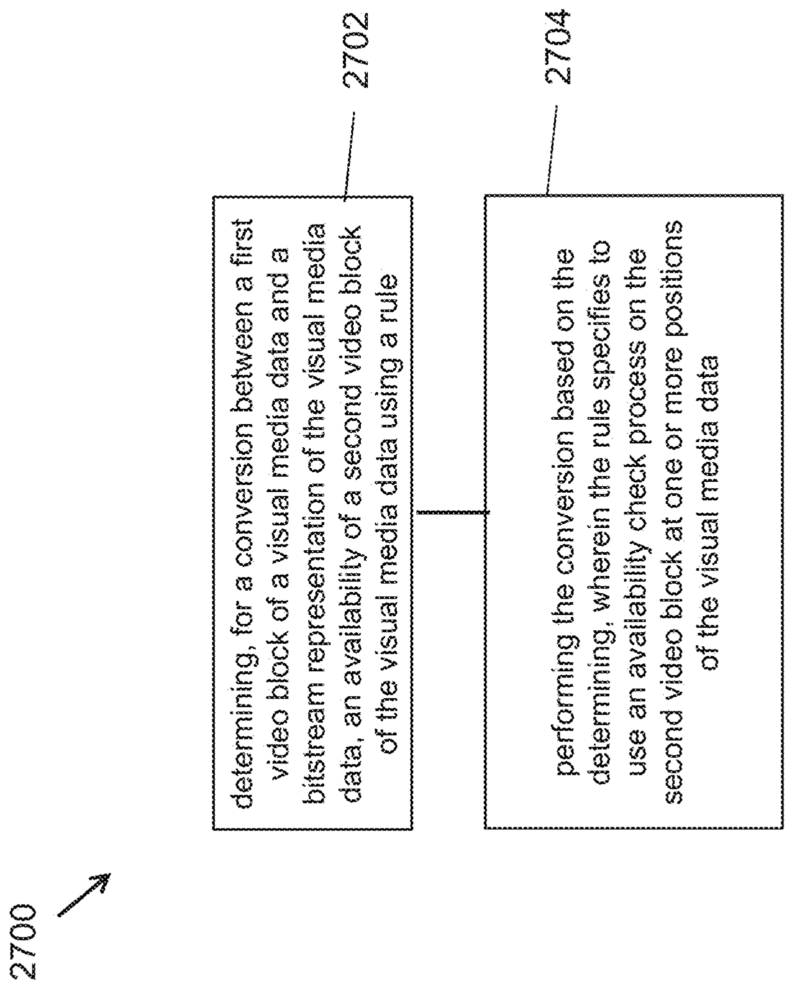
FIG. 27 is a flowchart for an example of a visual media processing method.

FIG. 27 is a flowchart for an example of a visual media processing method. Steps of this flowchart are discussed in connection with embodiment 14 in this document. At step 2702, the process determines, for a conversion between a first video block of a visual media data and a bitstream representation of the visual media data, an availability of a second video block of the visual media data using a rule. At step 2704, the process performs the conversion based on the determining, wherein the rule specifies to use an availability check process on the second video block at one or more positions of the visual media data.

Figure 28:
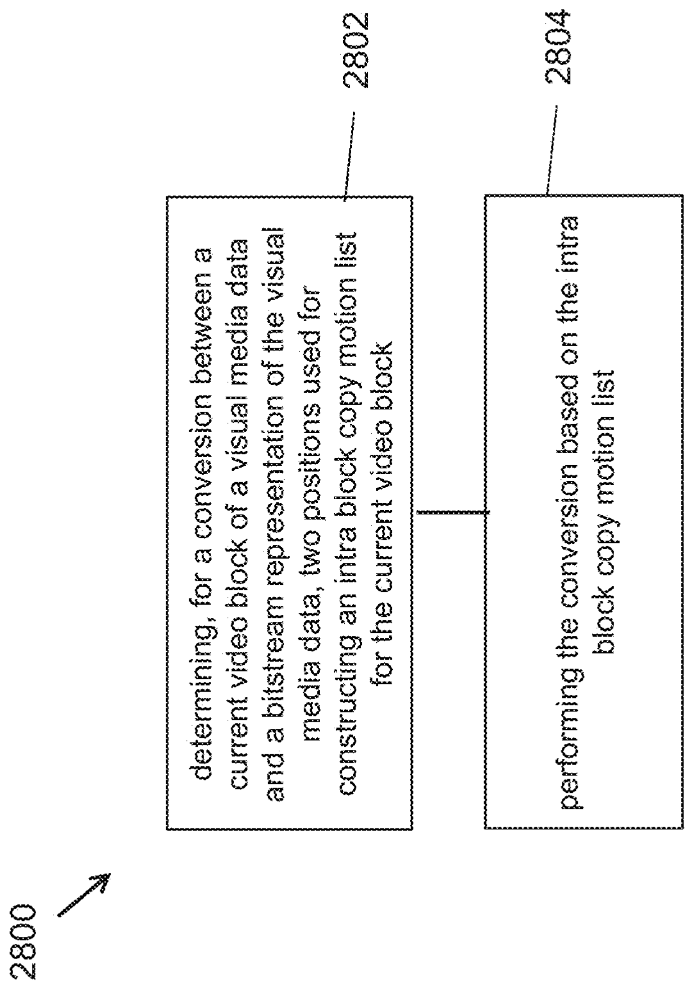
FIG. 28 is a flowchart for an example of a visual media processing method.

FIG. 28 is a flowchart for an example of a visual media processing method. Steps of this flowchart are discussed in connection with embodiment 15 in this document. At step 2802, the process determines, for a conversion between a current video block of a visual media data and a bitstream representation of the visual media data, two positions used for constructing an intra block copy motion list for the current video block. At step 2804, the process performs the conversion based on the intra block copy motion list.

Figure 29:
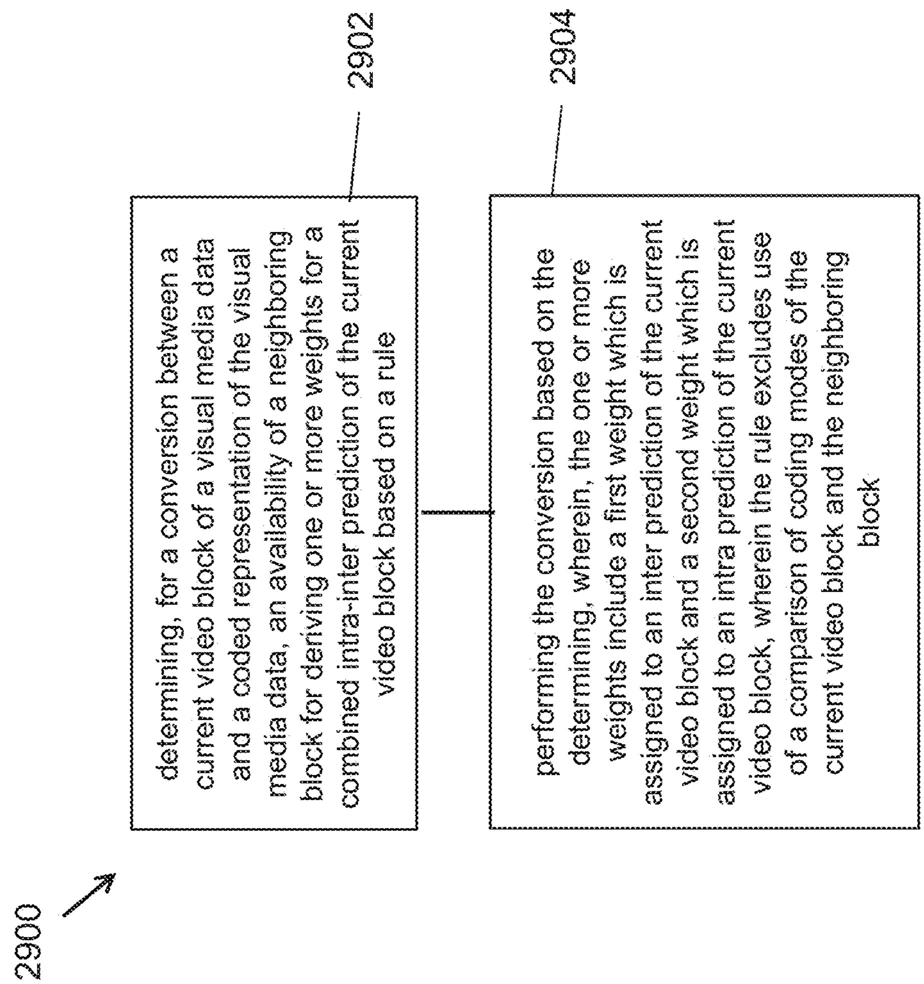
FIG. 29 is a flowchart for an example of a visual media processing method.

FIG. 29 is a flowchart for an example of a visual media processing method. Steps of this flowchart are discussed in connection with embodiment 16 in this document. At step 2902, the process determines, for a conversion between a current video block of a visual media data and a coded representation of the visual media data, an availability of a neighboring block for deriving one or more weights for a combined intra-inter prediction of the current video block based on a rule. At step 2904, the process performs the conversion based on the determining, wherein, the one or more weights include a first weight which is assigned to an inter prediction of the current video block and a second weight which is assigned to an intra prediction of the current video block; wherein the rule excludes use of a comparison of coding modes of the current video block and the neighboring block.

Some embodiments of the present document are now presented in clause-based format.

A1. A visual media processing method, comprising:

determining, for a conversion between a first video block of a visual media data and a bitstream representation of the visual media data, an availability of a second video block of the visual media data using a rule; and performing the conversion based on the determining, wherein the rule is at least based on a coding mode used for coding the first video block into the bitstream representation, wherein the rule specifies disallowing motion information of the second video block from being used in a merge list construction of the first block by treating the second video block as unavailable.

A2. The method of clause A1, wherein the coding mode used for coding the first video block corresponds to inter coding and a coding mode for coding a second video block of the visual media data corresponds to intra block copy.

A3. The method of clause A1, wherein the coding mode used for coding the first video block corresponds to intra block copy and a coding mode for coding the second video block of the visual media data corresponds to inter coding.

A4. The method of clause A1, wherein performing the check:

receiving the coding mode used for coding the first video block as an input parameter for determining the availability of the second video block.

B1. A visual media processing method, comprising:

determining, for a conversion between a first video block of a visual media data and a bitstream representation of the visual media data, an availability of a second video block of the visual media data using a rule; and performing the conversion based on the determining, wherein the rule specifies to use an availability check process on the second video block at one or more positions of the visual media data.

B2. The method of clause B1, wherein the one or more positions corresponds to a top-left position relative to the first video block, and the rule further specifies treating the second video block as unavailable for the conversion in a case that a coding mode of the first video block is not same as a coding mode of the second video block.

B3. The method of clause B1, wherein the one or more positions corresponds to a top-left position relative to a shared merge region, and the rule further specifies not comparing a coding mode of the first video block to a coding mode of the second video block.

B4. The method of clause B3, wherein the rule further specifies checking whether a video region covering the one or more positions is in a same slice and/or tile and/or brick and/or subpicture as the first video block.

C1. A visual media processing method, comprising:

determining, for a conversion between a current video block of a visual media data and a bitstream representation of the visual media data, two positions used for constructing an intra block copy motion list for the current video block; and performing the conversion based on the intra block copy motion list.

C2. The method of clause C1, wherein the two positions comprise a first position corresponding to a top left position relative to a shared merge region of the current video block.

C3. The method of clause C2, wherein the first position is used to determine an availability of neighboring video block of the current video block.

C4. The method of clause C1, wherein the two positions comprise a second position corresponding to a top left position relative to the current video block.

C5. The method of clause C4, wherein the second position is used to determine an availability of a neighboring video block of the current video block.

D1. A visual media processing method, comprising:

determining, for a conversion between a current video block of a visual media data and a coded representation of the visual media data, an availability of a neighboring block for deriving one or more weights for a combined intra-inter prediction of the current video block based on a rule; and performing the conversion based on the determining, wherein, the one or more weights include a first weight which is assigned to an inter prediction of the current video block and a second weight which is assigned to an intra prediction of the current video block;

wherein the rule excludes use of a comparison of coding modes of the current video block and the neighboring block.

D2. The method of clause D1, wherein the neighboring block is determined to be available in a case that a coding mode of the neighboring block is an intra mode, an intra block copy (IBC) mode, or a palette mode.

D3. The method of any one or more of clauses D1 or D2, wherein the first weight is different from the second weight.

E1. The method of any of clauses A1 to D3, wherein the conversion includes generating the bitstream representation from the current video block.

E2. The method of any of clauses A1 to D3, wherein the conversion includes generating samples of the current video block from the bitstream representation.

E3. A video processing apparatus comprising a processor configured to implement a method recited in any one or more of clauses A1 to D3.

E4. A video encoding apparatus comprising a processor configured to implement a method recited in any one or more of clauses A1 to D3.

E5. A video decoding apparatus comprising a processor configured to implement a method recited in any one or more of clauses A1 to D3.

E6. A computer readable medium having code stored thereon, the code, upon execution, causing a processor to implement a method recited in any one or more of clauses A1 to D3.

E7. A method, system or apparatus described herein.

In the present document, the term "video processing" or "visual media processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:

making a first decision, for a conversion between a first block of a video and a bitstream of the video, on an availability of a neighboring block for deriving one or more weights for predicting the first block by an availability checking process based on a rule, wherein the first block is coded with a first prediction mode and in the first prediction mode a prediction of the first block is generated at least based on an inter prediction and an intra prediction; and performing the conversion based on the first decision, wherein the one or more weights include a first weight which is assigned to the inter prediction of the first block and a second weight which is assigned to an intra prediction of the first block; and wherein the rule excludes use of a comparison of a coding mode of the first block and a coding mode of the neighboring block, wherein a value of an input parameter of the availability checking process is set to false, and wherein the value of the input parameter being false indicates that the availability checking process does not depend on the coding mode of the neighboring block.

2. The method of claim 1, wherein the neighboring block is allowed to be determined as available even when the coding mode of the neighboring block is an intra mode, an intra block copy mode, or a palette mode, wherein in the intra block copy mode, prediction samples are derived from blocks of sample values of a same decoded video region as determined by block vectors, and wherein when the neighboring block is available, the one or more weights are assigned depending on the coding mode of the neighboring block.

3. The method of claim 1, further comprising:

making a second decision, for a conversion between a second block of the video and the bitstream of the video, an availability of a third block of the video based on a coding mode of the second block and a coding mode of the third block by the availability checking process, wherein the third block is determined as unavailable in response to the coding mode of the second block being different from the coding mode of the third block; and performing the conversion between the second block and the bitstream based on the second decision, wherein motion information of the third block is disallowed from being used in a list construction of the second block in response to the third block being determined as unavailable.

4. The method of claim 3, wherein the coding mode of the second block corresponds to an inter prediction mode and the coding mode of the third block corresponds to an intra block copy mode, and wherein in the intra block copy mode, prediction samples are derived from blocks of sample values of a same decoded video region as determined by block vectors, or wherein the coding mode of the second block corresponds to an intra block copy mode and the coding mode of the third block corresponds to an inter prediction mode, and wherein in the intra block copy mode, prediction samples are derived from blocks of sample values of a same decoded video region as determined by block vectors.

5. The method of claim 1, further comprising:

making a third decision, during a conversion between a fourth block of the video and the bitstream of the video, that the fourth block is coded with a geometric partitioning mode which is a second prediction mode;

constructing a candidate list for the fourth block, wherein the constructing includes checking an availability of a spatial candidate at a specific neighboring block B2 based on a number of available candidates in the candidate list, wherein the specific neighboring block B2 is at a top left corner of the fourth block;

determining, based on the candidate list, a first motion information for a first geometric partition of the fourth block and a second motion information for a second geometric partition of the fourth block;

applying a weighting process for generating a final prediction for samples of the fourth block based on a weighted sum of prediction samples derived based on the first motion information and the second motion information; and performing the conversion based on the applying.

6. The method of claim 5, wherein when the number of available candidates in the candidate list is 4, the spatial candidate at the specific neighboring block B2 is unavailable, and wherein a spatial candidate corresponding to a neighboring block which is coded with an intra block copy mode is excluded from the candidate list for the fourth block, wherein in the intra block copy mode, prediction samples of the neighboring block are derived from blocks of sample values of the same decoded video region as determined by block vectors.

7. The method of claim 5, wherein the candidate list is constructed based on a pruning process, wherein the pruning process comprises comparing motion information between at least two spatial candidates to avoid identical spatial candidates, wherein the constructing, based on the pruning process, the candidate list for the fourth block includes checking an availability of a spatial candidate at a specific neighboring block A1, wherein the specific neighboring block A1 is adjacent to a lower left corner to the fourth block, the checking comprising:

when the candidate list includes a spatial candidate at a specific neighboring block B1, wherein the specific neighboring block B1 is adjacent to a top right corner to the fourth block, comparing motion information between the spatial candidates at the specific neighboring block A1 and the specific neighboring block B1, and determining that the spatial candidate at the specific neighboring block A1 is unavailable, based on the comparing result indicates that the motion information of the spatial candidate at A1 is identical to that at B1;

wherein the constructing, based on the pruning process, the candidate list for the fourth block includes checking an availability of a spatial candidate at a specific neighboring block B0, wherein the specific neighboring block B0 is at a top right corner of the fourth block, the checking comprising:

when the candidate list includes a spatial candidate at a specific neighboring block B1, wherein the specific neighboring block B1 is adjacent to a top right corner to the fourth block, comparing motion information between the spatial candidates at the specific neighboring block B0 and the specific neighboring block B1; and determining that the spatial candidate at the specific neighboring block B0 is unavailable, based on the comparing result indicates that the motion information of the spatial candidate at B0 is identical to that at B1; or wherein the constructing, based on the pruning process, the candidate list for the fourth block includes checking an availability of a spatial candidate at a specific neighboring block A0, wherein the specific neighboring block A0 is at a lower left corner of the fourth block, the checking comprising:

when the candidate list includes a spatial candidate at a specific neighboring block A1, wherein the specific neighboring block A1 is adjacent to a lower left corner to the fourth block, comparing motion information between the spatial candidates at a specific neighboring block A0 and the specific neighboring block A1; and determining that the spatial candidate at the specific neighboring block A0 is unavailable, based on the comparing result indicates that the motion information of the spatial candidate at A0 is identical to that at A1.

8. The method of claim 7, wherein checking the availability of the spatial candidate at the specific neighboring block B2 further includes:

when the candidate list includes spatial candidates at specific neighboring blocks A1 and B1, wherein the specific neighboring block B1 is adjacent to a top right corner to the fourth block and the specific neighboring block A1 is adjacent to a lower left corner to the fourth block, comparing motion information between the spatial candidates at the specific neighboring block B2 and the specific neighboring blocks A1 and B1, and determining that the spatial candidate at the specific neighboring block B2 is unavailable, based on the comparing result indicates that the motion information of the spatial candidate at B2 is identical to that at A1 or B1.

9. The method of claim 1, further comprising:

making a fourth decision, during a conversion between a fifth block of the video and the bitstream of the video, that the fifth block is coded with a third prediction mode, wherein in the third prediction mode, prediction samples are derived from blocks of sample values of a same decoded video region as determined by block vectors;

determining, based on whether a condition associated with a width and a height of the fifth block is met, a motion candidate list construction process of a motion candidate list for the fifth block, wherein the condition is met when a product of the width and the height of the fifth block is less than or equal to a threshold value; and performing the conversion based on the motion candidate list, wherein a derivation of spatial merge candidates of the motion candidate list construction process is skipped when the condition is met.

10. The method of claim 9, wherein the motion candidate list construction process includes at least one of:

adding at least one spatial candidate to the motion candidate list;

adding at least one history-based motion vector predictor candidate to the motion candidate list; or adding at least one zero candidate to the motion candidate list, and wherein adding at least one spatial candidate to the motion candidate list includes:

checking an availability of a spatial candidate at a specific neighboring block A1, wherein the specific neighboring block A1 is adjacent to a lower left corner to the fourth block;

in response to the specific neighboring block A1 being available, adding the spatial candidate at specific neighboring block A1 to the motion candidate list; and checking an availability of a spatial candidate at a specific neighboring block B1, wherein the specific neighboring block B1 is adjacent to a top right corner to the fifth block, wherein, in response to the specific neighboring block B1 being available, a first redundancy check is performed, which ensures that the spatial candidate at specific neighboring block B1 with same motion information of the spatial candidate at specific neighboring block A1 is excluded from the motion candidate list.

11. The method of claim 10, wherein the motion candidate list construction process includes:

adding the at least one history-based motion vector predictor candidate to the motion candidate list in case that the size of the motion candidate list is smaller than an allowed maximum list size for the third prediction mode after adding the at least one spatial candidate, and wherein a second redundancy check is performed, which ensures that candidates with same motion information are excluded from the motion candidate list is applied when adding the at least one history-based motion vector predictor candidate, or adding the at least one zero candidate to the motion candidate list, in response to the size of the motion candidate list being smaller than an allowed maximum list size for the third prediction mode.

12. The method of claim 9, further comprising:

making a fifth decision, during a conversion between a seventh block in the video and the bitstream of the video, that the seventh block is coded with a fourth prediction mode, wherein in the fourth prediction mode, a signaled motion vector predictor is refined based on an offset which is signaled explicitly in the bitstream;

determining, based on whether a condition associated with a width and a height of the seventh block is met, a second motion candidate list construction process of a second motion candidate list for the seventh block, wherein the condition associated with the width and the height of the seventh block is met when a product of the width and the height of the seventh block is less than or equal to a second threshold value; and performing the conversion based on second the motion candidate list.

13. The method of claim 1, wherein the conversion includes encoding the video into the bitstream.

14. The method of claim 1, wherein the conversion includes decoding the video from the bitstream.

15. An apparatus for processing video data comprising a processor and a non-transitory memory with instructions thereon, wherein the instructions upon execution by the processor, cause the processor to:

make a first decision, for a conversion between a first block of a video and a bitstream of the video, on an availability of a neighboring block for deriving one or more weights for predicting the first block by an availability checking process based on a rule, wherein the first block is coded with a first prediction mode and in the first prediction mode a prediction of the first block is generated at least based on an inter prediction and an intra prediction; and perform the conversion based on the first decision, wherein, the one or more weights include a first weight which is assigned to the inter prediction of the first block and a second weight which is assigned to an intra prediction of the first block; and wherein the rule excludes use of a comparison of a coding mode of the first block and a coding mode of the neighboring block, wherein a value of an input parameter of the availability checking process is set to false, and wherein the value of the input parameter being false indicates that the availability checking process does not depend on the coding mode of the neighboring block.

16. The apparatus of claim 15, wherein the neighboring block is allowed to be determined as available even when the coding mode of the neighboring block is an intra mode, an intra block copy mode, or a palette mode, wherein in the intra block copy mode, prediction samples are derived from blocks of sample values of a same decoded video region as determined by block vectors, and wherein when the neighboring block is available, the one or more weights are assigned depending on the coding mode of the neighboring block.

17. A non-transitory computer-readable storage medium storing instructions that cause a processor to:

make a first decision, for a conversion between a first block of a video and a bitstream of the video, on an availability of a neighboring block for deriving one or more weights for predicting the first block by an availability checking process based on a rule, wherein the first block is coded with a first prediction mode and in the first prediction mode a prediction of the first block is generated at least based on an inter prediction and an intra prediction; and perform the conversion based on the first decision, wherein the one or more weights include a first weight which is assigned to the inter prediction of the first block and a second weight which is assigned to an intra prediction of the first block; and wherein the rule excludes use of a comparison of a coding mode of the first block and a coding mode of the neighboring block, wherein a value of an input parameter of the availability checking process is set to false, and wherein the value of the input parameter being false indicates that the availability checking process does not depend on the coding mode of the neighboring block.

18. The non-transitory computer-readable storage medium of claim 17, wherein the neighboring block is allowed to be determined as available even when the coding mode of the neighboring block is an intra mode, an intra block copy mode, or a palette mode, wherein in the intra block copy mode, prediction samples are derived from blocks of sample values of a same decoded video region as determined by block vectors, and wherein when the neighboring block is available, the one or more weights are assigned depending on the coding mode of the neighboring block.

19. A non-transitory computer-readable recording medium storing a bitstream of a video which is generated by a method performed by a video processing apparatus, wherein the method comprises:

making a first decision on an availability of a neighboring block for deriving one or more weights for predicting a first block of a video by an availability checking process based on a rule, wherein the first block is coded with a first prediction mode and in the first prediction mode a prediction of the first block is generated at least based on an inter prediction and an intra prediction; and generating the bitstream of the video based on the first decision, wherein the one or more weights include a first weight which is assigned to the inter prediction of the first block and a second weight which is assigned to an intra prediction of the first block; and wherein the rule excludes use of a comparison of a coding mode of the first block and a coding mode of the neighboring block, wherein a value of an input parameter of the availability checking process is set to false, and wherein the value of the input parameter being false indicates that the availability checking process does not depend on the coding mode of the neighboring block.

20. The non-transitory computer-readable recording medium of claim 19, wherein the neighboring block is allowed to be determined as available even when the coding mode of the neighboring block is an intra mode, an intra block copy mode, or a palette mode, wherein in the intra block copy mode, prediction samples are derived from blocks of sample values of a same decoded video region as determined by block vectors, and wherein when the neighboring block is available, the one or more weights are assigned depending on the coding mode of the neighboring block.

* * * * *